United States Patent [19]
Kinugasa et al.

[11] Patent Number: 6,047,542
[45] Date of Patent: Apr. 11, 2000

[54] METHOD AND DEVICE FOR PURIFYING EXHAUST GAS OF ENGINE

[75] Inventors: Yukio Kinugasa; Kouhei Igarashi, both of Susono; Takaaki Itou, Mishima; Naoto Suzuki, Susono; Takehisa Yaegashi, Mishima; Kouichi Takeuchi, Susono, all of Japan

[73] Assignee: Toyota Jidosha Kabushiki Kaisha, Aichi, Japan

[21] Appl. No.: 09/068,422

[22] PCT Filed: Nov. 13, 1996

[86] PCT No.: PCT/JP96/03332

§ 371 Date: Jun. 29, 1998

§ 102(e) Date: Jun. 29, 1998

[87] PCT Pub. No.: WO97/19262

PCT Pub. Date: May 29, 1997

[30] Foreign Application Priority Data

Nov. 17, 1995 [JP] Japan ..................... 7-299935
Jan. 24, 1996 [JP] Japan ..................... 8-010152
Apr. 12, 1996 [JP] Japan ..................... 8-091249

[51] Int. Cl.[7] .................................................. F01N 3/00
[52] U.S. Cl. ........................... 60/274; 60/276; 60/285; 60/286; 123/443
[58] Field of Search .............. 60/274, 276, 285, 60/286, 301; 123/443

[56] References Cited

U.S. PATENT DOCUMENTS

| | | |
|---|---|---|
| 3,767,764 | 10/1973 | Dolbear . |
| 3,810,361 | 5/1974 | Weaving et al. . |
| 3,825,654 | 7/1974 | Kobylinski et al. . |
| 3,953,576 | 4/1976 | Meguerian et al. . |
| 4,321,792 | 3/1982 | Achard . |
| 4,393,031 | 7/1983 | Henke . |
| 4,395,875 | 8/1983 | Virk . |
| 4,854,123 | 8/1989 | Inoue . |
| 5,021,227 | 6/1991 | Kobayashi et al. . |
| 5,207,058 | 5/1993 | Sasaki et al. . |
| 5,313,792 | 5/1994 | Katoh et al. ....................... 60/301 |
| 5,367,875 | 11/1994 | Aboujaoude et al. . |
| 5,384,098 | 1/1995 | Morikawa . |
| 5,406,790 | 4/1995 | Hirota et al. . |

(List continued on next page.)

FOREIGN PATENT DOCUMENTS

| | | |
|---|---|---|
| 0 510 498 | 10/1992 | European Pat. Off. . |
| 701 858 | 3/1996 | European Pat. Off. . |
| 4-365920 | 12/1992 | Japan . |
| 6-330741 | 11/1994 | Japan . |
| 08 004 522 | 1/1996 | Japan . |
| 9004441 | 1/1997 | Japan . |
| 1 453 456 | 10/1976 | United Kingdom . |
| WO 93/07363 | 4/1993 | WIPO . |

*Primary Examiner*—Thomas Denion
*Assistant Examiner*—Binh Tran
*Attorney, Agent, or Firm*—Kenyon & Kenyon

[57] ABSTRACT

An engine (1) has first and second cylinder groups (1a) and (1b). The first cylinder group (1a) is connected to a three way (TW) catalyst (8a). The second group (1b) and the TW catalyst (8a) are connected, via an interconnecting duct (13) to an $NH_3$ adsorbing and oxidizing ($NH_3$-AO) catalyst (14a). The first group (1a) performs the rich operation, and the second group (1b) performs the lean operation. In the TW catalyst (8a), $NO_x$ exhausted from the first group (1a) is converted to $NH_3$, and the $NH_3$ reduces the $NO_x$ exhausted from the second group (1b) in the $NH_3$-AO catalyst (14a). A $NO_x$ occluding and reducing ($NO_x$-OR) catalyst (11a) is arranged in the exhaust passage between the second group (1b) and the interconnecting duct (13), to thereby suppress the $NO_x$ amount flowing into the $NH_3$-AO catalyst (14a).

86 Claims, 45 Drawing Sheets

U.S. PATENT DOCUMENTS

| | | |
|---|---|---|
| 5,410,873 | 5/1995 | Tashiro . |
| 5,412,946 | 5/1995 | Oshima et al. ............................ 60/286 |
| 5,461,857 | 10/1995 | Itou et al. . |
| 5,473,887 | 12/1995 | Takeshima et al. . |
| 5,479,775 | 1/1996 | Kraemer et al. . |
| 5,540,047 | 7/1996 | Dahlheim et al. . |
| 5,551,231 | 9/1996 | Tanaka et al. . |
| 5,595,060 | 1/1997 | Togai et al. ............................... 60/276 |
| 5,605,042 | 2/1997 | Stutzenberger . |
| 5,609,026 | 3/1997 | Berriman et al. . |
| 5,628,186 | 5/1997 | Schmelz . |
| 5,657,625 | 8/1997 | Koga et al. ............................... 60/274 |
| 5,661,971 | 9/1997 | Waschatz et al. . |
| 5,740,669 | 4/1998 | Kinugasa et al. . |
| 5,746,052 | 5/1998 | Kinugasa et al. . |
| 5,758,493 | 6/1998 | Asik et al. . |
| 5,778,667 | 7/1998 | Kinugasa et al. ......................... 60/274 |
| 5,782,087 | 7/1998 | Kinugasa et al. . |
| 5,783,160 | 7/1998 | Kinugasa et al. . |
| 5,791,139 | 8/1998 | Atago et al. ............................... 60/285 |
| 5,826,425 | 10/1998 | Rossi Sebastiano et al. . |

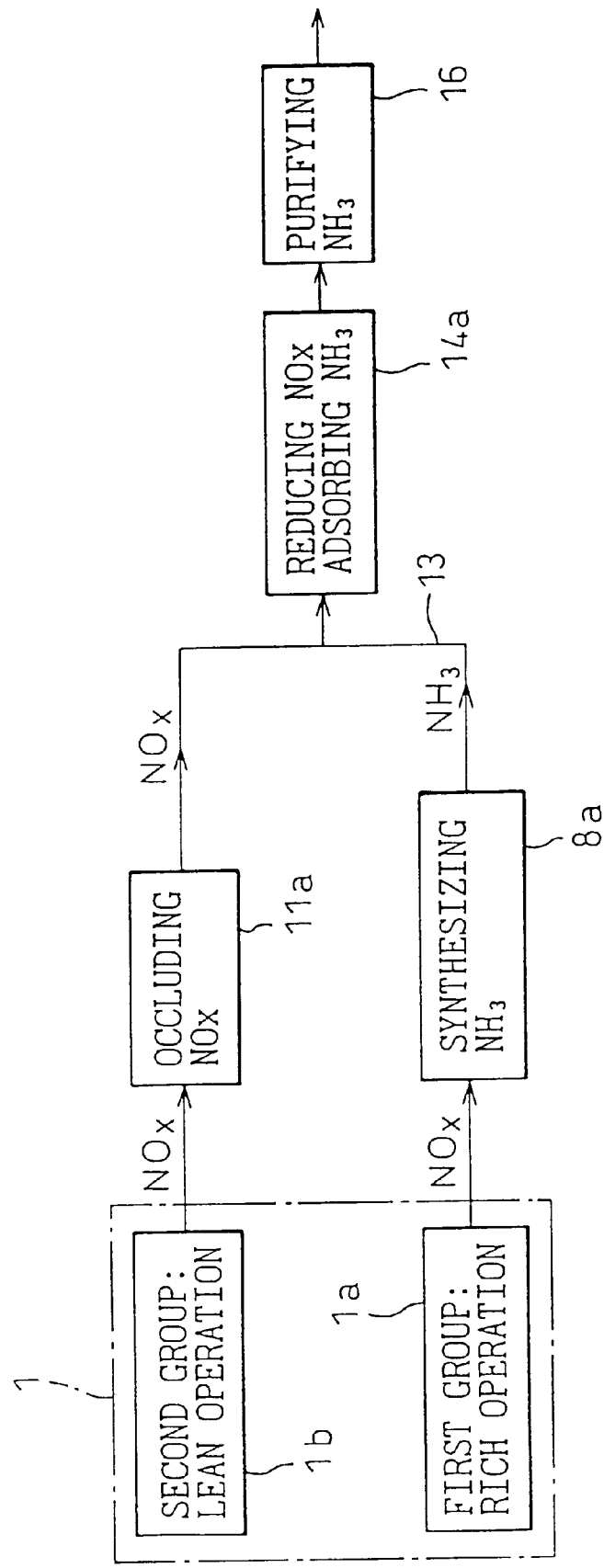

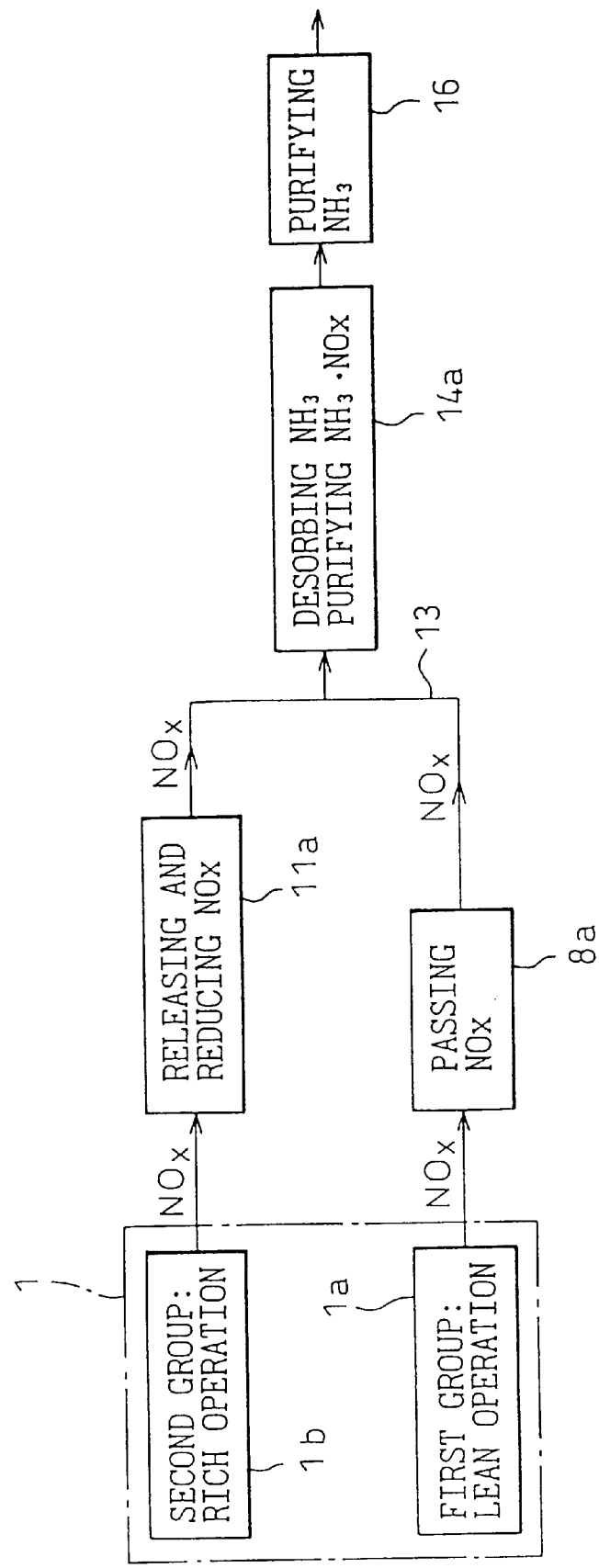

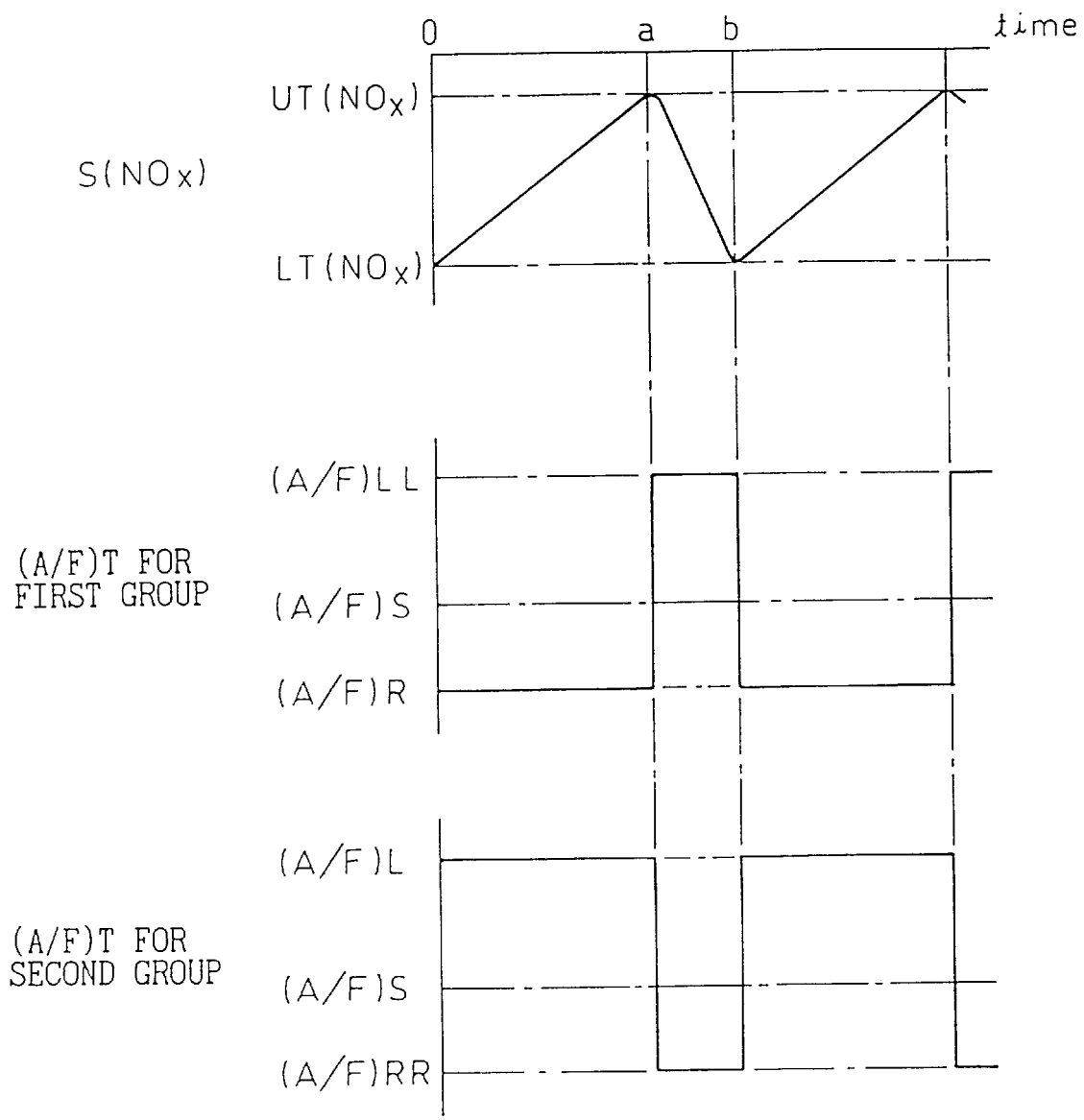

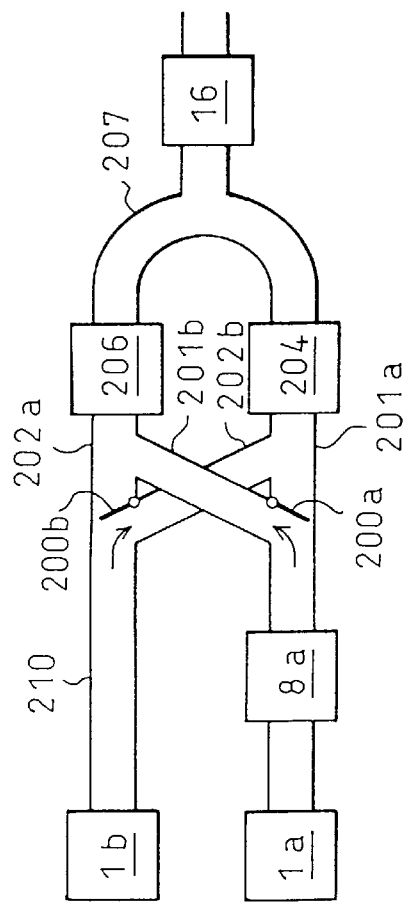
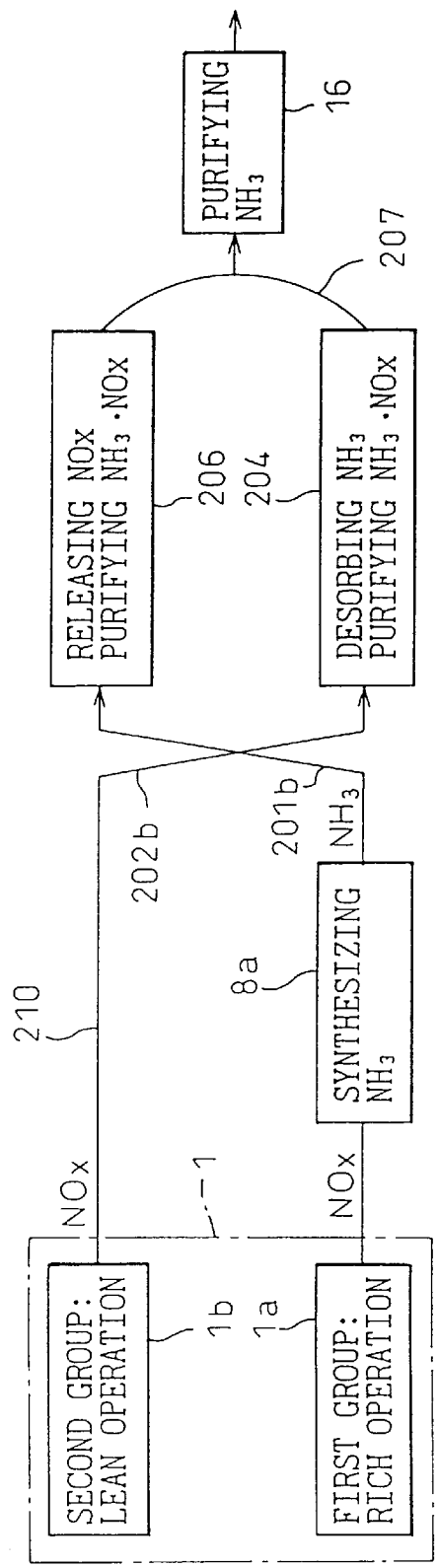
Fig. 44A
Fig. 44B

LIST OF REFERENCE NUMERALS

- 1 ... engine
- 1a ... first cylinder group
- 1b ... second cylinder group
- 5 ... fuel injector
- 7 ... exhaust manifold
- 8 ... $NH_3$ synthesizing catalyst
- 8a ... three way (TW) catalyst
- 11 ... occluding material
- 11a ... $NO_x$ occluding and reducing ($NO_x$-OR) catalyst
- 13 ... interconnecting duct
- 14 ... exhaust gas purifying catalyst
- 14a ... $NH_3$ adsorbing and oxidizing ($NH_3$-AO) catalyst
- 16 ... $NH_3$ purifying catalyst

METHOD AND DEVICE FOR PURIFYING EXHAUST GAS OF ENGINE

TECHNICAL FIELD

The present invention relates to a method and a device for purifying an exhaust gas of an engine.

BACKGROUND ART

If an air-fuel ratio of an air-fuel mixture in a combustion chamber of an internal combustion engine is referred as an engine air-fuel ratio, and if a ratio of the total amount of air fed into the intake passage, the combustion chamber, and the exhaust passage upstream of a certain position in the exhaust passage to the total amount of fuel fed into the intake passage, the combustion chamber, and the exhaust passage upstream of the above-mentioned position is referred to as an exhaust gas air-fuel ratio of the exhaust gas flowing through the certain position, the Japanese Unexamined Patent Publication No. 4-365920 discloses an exhaust gas purifying device for an internal combustion engine with multi-cylinders, the engine having first and second cylinder groups, in which the device is provided with: an engine operation control device to make each cylinder of the first cylinder group a rich engine operation in which the engine air-fuel ratio is rich, and to make each cylinder of the second cylinder group a lean engine operation in which the engine air-fuel ratio is lean; a first exhaust passage connected to each cylinder of the first cylinder group; a second exhaust passage connected to each cylinder of the second cylinder group and different from the first exhaust passage; an $NH_3$ synthesizing catalyst arranged in the first exhaust passage for synthesizing ammonia $NH_3$ from at least a part of $NO_x$ in the inflowing exhaust gas; an interconnecting passage interconnecting the first exhaust passage downstream of the $NH_3$ synthesizing catalyst and the second exhaust passage to each other; and an exhaust gas purifying catalyst arranged in the interconnecting passage to reduce $NO_x$ from the second exhaust passage by $NH_3$ from the first exhaust passage.

In the above engine, the fuel consumption rate is reduced by increasing the numbers of the cylinders of the second cylinder group in which the lean engine operation is performed. However, if the numbers of the cylinders of the first group are decreased and the numbers of the cylinders of the second group are increased, the $NH_3$ amount flowing into the exhaust gas purifying catalyst decreases and the $NO_x$ amount flowing into the catalyst increases. As a result, the $NO_x$ amount flowing into the catalyst may be excessive with respect to the $NH_3$ amount, and thus $NO_x$ may be emitted from the catalyst without being reduced sufficiently.

DISCLOSURE OF THE INVENTION

An object of the present invention is to provide a method and a device for purifying an exhaust gas of an engine which can suppress the amount of $NO_x$ flowing into an exhaust gas purifying catalyst with respect to that of $NH_3$, to thereby purify the exhaust gas sufficiently.

According to one aspect of the present invention, there is provided a method for purifying an exhaust gas of an engine having a plurality of cylinders divided into first and second cylinder groups, the method comprising: making an exhaust gas air-fuel ratio of the exhaust gas of the first cylinder group rich, and introducing the exhaust gas to an $NH_3$ synthesizing catalyst to synthesize $NH_3$, the $NH_3$ synthesizing catalyst synthesizing $NH_3$ from at least a part of $NO_x$ in the inflowing exhaust gas when the exhaust gas air-fuel ratio of the inflowing exhaust gas is rich; introducing the exhaust gas of the first cylinder group including $NH_3$ and the exhaust gas of the second cylinder group including $NO_x$ together to an exhaust gas purifying catalyst; and controlling an amount of $NO_x$ included in the exhaust gas of the second cylinder group and to be introduced to the exhaust gas purifying catalyst to prevent the $NO_x$ amount from being larger than a $NO_x$ amount which can be reduced by the $NH_3$ included in the exhaust gas of the first cylinder group and to be introduced to the exhaust gas purifying catalyst, wherein, on the exhaust gas purifying catalyst, the inflowing $NO_x$ is reduced by the inflowing $NH_3$.

According to another aspect of the present invention, there is provided a device for purifying an exhaust gas of an engine having a plurality of cylinders divided into first and second cylinder groups, and first and second exhaust passage connected to the first and the second cylinder groups, respectively, the device comprising: an $NH_3$ synthesizing catalyst arranged in the first exhaust passage, the $NH_3$ synthesizing catalyst synthesizing $NH_3$ from at least a part of $NO_x$ in the inflowing exhaust gas when the exhaust gas air-fuel ratio of the inflowing exhaust gas is rich; an interconnecting exhaust passage interconnecting the first passage downstream of the $NH_3$ synthesizing catalyst and the second exhaust passage; an exhaust gas purifying catalyst arranged in the interconnecting passage for reducing the inflowing $NO_x$ by the inflowing $NH_3$; first exhaust gas air-fuel ratio control means for controlling the exhaust gas air-fuel ratio of the exhaust gas flowing into the $NH_3$ synthesizing catalyst; means for controlling the first exhaust gas air-fuel ratio control means to make the exhaust gas air-fuel ratio of the exhaust gas flowing into the $NH_3$ synthesizing catalyst rich to synthesize $NH_3$; and $NO_x$ amount control means for controlling an amount of $NO_x$ flowing from the second exhaust passage into the exhaust gas purifying catalyst to prevent the $NO_x$ amount from being larger than a $NO_x$ amount which can be reduced by the $NH_3$ flowing from the first exhaust passage into the exhaust gas purifying catalyst, wherein, on the exhaust gas purifying catalyst, the inflowing $NO_x$ is reduced by the inflowing $NH_3$.

According to another aspect of the present invention, there is provided a method for purifying an exhaust gas of an engine having a plurality of cylinders divided into first and second cylinder groups, the method comprising: making the exhaust gas air-fuel ratio of the exhaust gas of the first cylinder group rich, and introducing the exhaust gas to an $NH_3$ synthesizing catalyst to synthesize $NH_3$, to form the exhaust gas including $NH_3$ of which the exhaust gas air-fuel ratio is rich, the $NH_3$ synthesizing catalyst synthesizing $NH_3$ from at least a part of $NO_x$ in the inflowing exhaust gas when the exhaust gas air-fuel ratio of the inflowing exhaust gas is rich; making the exhaust gas air-fuel ratio of the exhaust gas of the second cylinder group lean, to form the exhaust gas including $NO_x$ of which the exhaust gas air-fuel ratio is lean; performing a first introducing condition where the exhaust gas including $NH_3$ of which the exhaust gas air-fuel ratio is rich is introduced to an $NH_3$ adsorbing and oxidizing ($NH_3$-AO) catalyst and the exhaust gas including $NO_x$ of which the exhaust gas air-fuel ratio is lean is introduced to a $NO_x$ occluding and reducing ($NO_x$-OR) catalyst, the $NH_3$-AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich; performing a second introducing condition where the exhaust gas including $NH_3$ of which the exhaust gas air-fuel ratio is rich is introduced to the $NO_x$-OR catalyst and the exhaust gas including $NO_x$ of which the exhaust gas air-fuel ratio is lean is introduced to the $NH_3$-AO catalyst; and performing the first and the second introducing conditions alternately and repeatedly.

According to further another aspect of the present invention, there is provided a device for purifying an exhaust gas of an engine having a plurality of cylinders divided into first and second cylinder groups, and first and second exhaust passage connected to the first and the second cylinder groups, respectively, the device comprising: an $NH_3$ synthesizing catalyst arranged in the first exhaust passage, the $NH_3$ synthesizing catalyst synthesizing $NH_3$ from at least a part of $NO_x$ in the inflowing exhaust gas when the exhaust gas air-fuel ratio of the inflowing exhaust gas is rich; an $NH_3$ adsorbing and oxidizing ($NH_3$-AO) catalyst selectively connected to one of the first exhaust passage downstream of the $NH_3$ synthesizing catalyst and the second exhaust passage, the $NH_3$-AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower; a $NO_x$ occluding and reducing ($NO_x$-OR) catalyst selectively connected to one of the first exhaust passage downstream of the $NH_3$ synthesizing catalyst and the second exhaust passage, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich; first exhaust gas air-fuel ratio control means for controlling the exhaust gas air-fuel ratio of the exhaust gas flowing into the $NH_3$ synthesizing catalyst; second exhaust gas air-fuel ratio control means for controlling the exhaust gas air-fuel ratio of the exhaust gas flowing through the second exhaust passage; means for controlling the first exhaust gas air-fuel ratio control means to make the exhaust gas air-fuel ratio of the exhaust gas flowing into the $NH_3$ synthesizing catalyst rich to synthesize $NH_3$; means for controlling the second exhaust gas air-fuel ratio control means to make the exhaust gas air-fuel ratio of the exhaust gas flowing through the second exhaust passage lean; first connecting condition performing means for performing a first connecting condition where the first exhaust passage downstream of the $NH_3$ synthesizing catalyst is connected to the $NH_3$-AO catalyst and the second exhaust passage is connected to the $NO_x$-OR catalyst; second connecting condition performing means for performing a second connecting condition where the first exhaust passage downstream of the $NH_3$ synthesizing catalyst is connected to the $NO_x$-OR catalyst and the second exhaust passage is connected to the $NH_3$-AO catalyst; and connecting condition control means for controlling the first and the second connecting condition performing means to perform the first and the second connecting conditions alternately and repeatedly.

According to further another aspect of the present invention, there is provided a method for purifying an exhaust gas of an engine having a plurality of cylinders divided into first and second cylinder groups, the method comprising: introducing the exhaust gas of the first cylinder group to a first $NH_3$ synthesizing catalyst and an $NH_3$ adsorbing and oxidizing ($NH_3$-AO) catalyst, in turn, the $NH_3$ synthesizing catalyst synthesizing $NH_3$ from at least a part of $NO_x$ in the inflowing exhaust gas when the exhaust gas air-fuel ratio of the inflowing exhaust gas is rich, and passing $NO_x$ in the inflowing exhaust gas therethrough when the exhaust gas air-fuel ratio of the inflowing exhaust gas is lean, and the $NH_3$-AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower; introducing the exhaust gas of the second cylinder group to a second $NH_3$ synthesizing catalyst and a $NO_x$ occluding and reducing ($NO_x$-OR) catalyst, in turn, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich; performing a first exhaust gas air-fuel ratio condition where the exhaust gas air-fuel ratio of the exhaust gas flowing into the first $NH_3$ synthesizing catalyst and the $NH_3$-AO catalyst is made rich, and that of the exhaust gas flowing into the second $NH_3$ synthesizing catalyst and the $NO_x$-OR catalyst is made lean; performing a second exhaust gas air-fuel ratio condition where the exhaust gas air-fuel ratio of the exhaust gas flowing into the first $NH_3$ synthesizing catalyst and the $NH_3$-AO catalyst is made lean, and that of the exhaust gas flowing into the second $NH_3$ synthesizing catalyst and the $NO_x$-OR catalyst is made rich; and performing the first and the second exhaust gas air-fuel ratio conditions alternately and repeatedly.

According to another aspect of the present invention, there is provided a device for purifying an exhaust gas of an engine having a plurality of cylinders divided into first and second cylinder groups, and first and second exhaust passage connected to the first and the second cylinder groups, respectively, the device comprising: a first $NH_3$ synthesizing catalyst arranged in the first exhaust passage and a second $NH_3$ synthesizing catalyst arranged in the second exhaust passage, each $NH_3$ synthesizing catalyst synthesizing $NH_3$ from at least a part of $NO_x$ in the inflowing exhaust gas when the exhaust gas air-fuel ratio of the inflowing exhaust gas is rich, and passing $NO_x$ in the inflowing exhaust gas therethrough when the exhaust gas air-fuel ratio of the inflowing exhaust gas is lean; an $NH_3$ adsorbing and oxidizing ($NH_3$-AO) catalyst arranged in the first exhaust passage downstream of the first $NH_3$ synthesizing catalyst, the $NH_3$-AO catalyst adsorbing $NH_3$ in the inflowing exhaust gas therein, and desorbing the adsorbed $NH_3$ therefrom and oxidizing the $NH_3$ when the $NH_3$ concentration in the inflowing exhaust gas becomes lower; a $NO_x$ occluding and reducing ($NO_x$-OR) catalyst arranged in the second exhaust passage downstream of the second $NH_3$ synthesizing catalyst, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich; a first exhaust gas air-fuel ratio control means for controlling the exhaust gas air-fuel ratio of the exhaust gas flowing into the first $NH_3$ synthesizing catalyst and the $NH_3$-AO catalyst; a second exhaust gas air-fuel ratio control means for controlling the exhaust gas air-fuel ratio of the exhaust gas flowing into the second $NH_3$ synthesizing catalyst and the $NO_x$-OR catalyst; first exhaust gas air-fuel ratio condition performing means for controlling the first and the second exhaust gas air-fuel ratio control means to perform a first exhaust gas air-fuel ratio condition where the exhaust gas air-fuel ratio of the exhaust gas flowing into the first $NH_3$ synthesizing catalyst and the $NH_3$-AO catalyst is made rich, and that of the exhaust gas flowing into the second $NH_3$ synthesizing catalyst and the $NO_x$-OR catalyst is made lean; second exhaust gas air-fuel ratio condition performing means for controlling the first and the second exhaust gas air-fuel ratio control means to perform a second exhaust gas air-fuel ratio condition where the exhaust gas air-fuel ratio of the exhaust gas flowing into the first $NH_3$ synthesizing catalyst and the $NH_3$-AO catalyst is made lean, and that of the exhaust gas flowing into the second $NH_3$ synthesizing catalyst and the $NO_x$-OR catalyst is made rich; and exhaust gas air-fuel ratio condition control means for controlling the first and the second exhaust gas air-fuel ratio condition performing means to perform the first and the second exhaust gas air-fuel ratio conditions alternately and repeatedly.

The present invention may be more fully understood from the description of preferred embodiments of the invention set forth below, together with the accompanying drawings.

BRIEF DESCRIPTION OF THE DRAWINGS

FIGS. 3 and 4 schematically illustrate a method for purifying the exhaust gas according to the embodiment shown in FIG. 1;

FIG. 5 is a time chart for explaining the exhaust gas purifying method according to the embodiment shown in FIG. 1;

FIGS. 43A, 43B, 44A, and 44B schematically illustrate the exhaust gas purifying method in the engine shown in FIG. 42;

BEST MODE FOR CARRYING OUT THE INVENTION

In general, nitrogen oxides (NO$_x$) include nitrogen monoxide NO, nitrogen dioxide NO$_2$, dinitrogen tetroxide N$_2$O$_4$, dinitrogen monoxide N$_2$O, etc. The following explanation will be made referring NO$_x$ mainly as nitrogen monoxide NO and/or nitrogen dioxide NO$_2$, but a method and a device for purifying an exhaust gas of an engine according to the present invention can purify the other nitrogen oxides.

Figure 1:
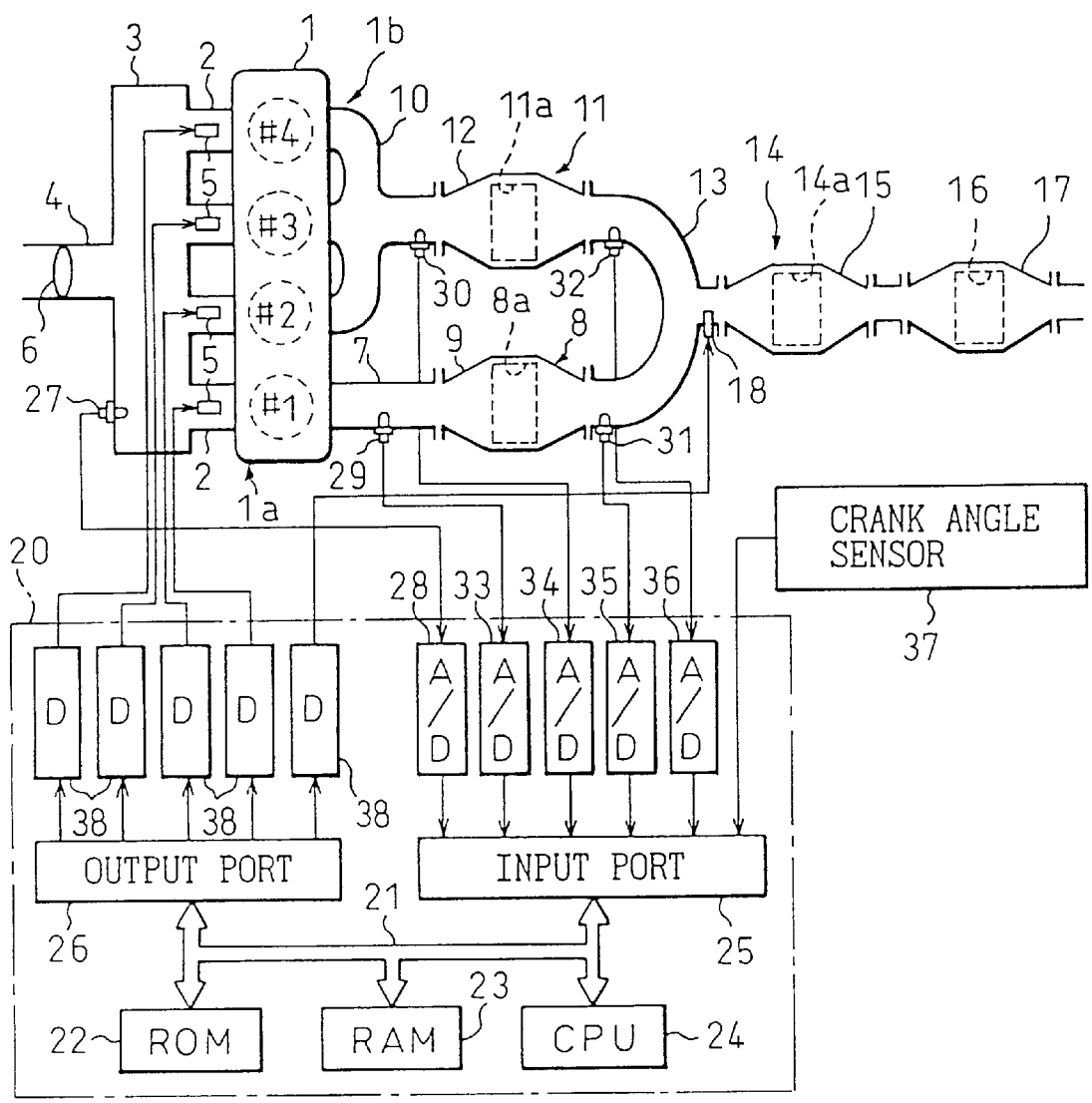
FIG. 1 is a general view of an internal combustion engine.

FIG. 1 shows the case where the present invention is applied to an internal engine of the spark ignition type. However, the present invention may be applied to a diesel engine. Also, the engine shown in FIG. 1 is used for an automobile, for example.

Referring to FIG. 1, an engine body 1 has four cylinders, i.e., a first cylinder #1, a second cylinder #2, a third cylinder #3, a fourth cylinder #4. Each cylinder #1 to #4 is connected to a common surge tank 3, via a corresponding branch 2, and the surge tank 3 is connected to a air-cleaner (not shown) via an intake duct 4. In each branch 2, a fuel injector 5 is arranged to feed fuel to the corresponding cylinder. Further, a throttle valve 6 is arranged in the intake duct 4, an opening of which becomes larger as the depression of the acceleration pedal (not shown) becomes larger. Note that the fuel injectors 5 are controlled in accordance with the output signals from an electronic control unit 20.

On the other hand, the first cylinder #1 is connected to a catalytic converter 9 housing an NH$_3$ synthesizing catalyst 8 therein, via an exhaust duct 7. The second, the third, and the fourth cylinders are connected to a catalytic converter 12 housing an occlusive material therein, via a common exhaust manifold 10. In the engine shown in FIG. 1, the first cylinder constructs a first cylinder group 1a, and the second, the third, and the fourth cylinders construct a second cylinder group 1b. Thus, an exhaust gas of the first cylinder group 1a is introduced to the NH$_3$ synthesizing catalyst 8, and that of the second cylinder group 1b is introduced to the occlusive material 11. The two catalytic converters 9 and 12 are then connected, via a common interconnecting duct 13, to a catalytic converter 15 housing an exhaust gas purifying catalyst 14 therein, and the catalytic converter 15 is connected to a catalytic converter 17 housing an NH$_3$ purifying catalyst 16 therein. As shown in FIG. 1, a secondary air supplying device 18 is arranged in the exhaust passage between the interconnecting passage 13 and the catalytic converter 14, for supplying a secondary air to the exhaust gas, and is controlled in accordance with the output signals from the electronic control unit 20.

The electronic control unit (ECU) 20 comprises a digital computer and is provided with a ROM (read only memory) 22, a RAM (random access memory) 23, a CPU (micro processor) 24, an input port 25, and an output port 26, which are interconnected by a bidirectional bus 21. Mounted in the surge tank 3 is a pressure sensor 27 generating an output voltage proportional to a pressure in the surge tank 3. The output voltage of the sensor 27 is input via an AD converter 28 to the input port 25. The intake air amount Q is calculated in the CPU 24 on the basis of the output signals from the AD converter 28. Further, air-fuel ratio sensors 29, 30, 31, and 32 are mounted in the exhaust duct 7, the collecting portion of the exhaust manifold 10, the interconnecting duct 13 where the exhaust gas from the second group 1b does not flow, that is, the interconnecting duct 13 just downstream of the catalytic converter 9, and the interconnecting duct 13 where the exhaust gas from the first group 1a does not flow, that is, the interconnecting duct 13 just downstream of the catalytic converter 12, respectively, each generating an output voltage proportional to an exhaust gas air-fuel ratio of the exhaust gas flowing through the corresponding portion of the exhaust passage. The output voltages of the sensors 29, 30, 31, and 32 are input via corresponding AD converters 33, 34, 35, and 36 to the input port 25. Further, connected to the input port 25 is a crank angle sensor 37 generating an output pulse whenever the crank shaft of the engine 1 turns by, for example, 30 degrees. The CPU 24 calculates the engine speed N in accordance with the pulse. On the other hand, the output port 26 is connected to the fuel injectors 5 and the secondary supplying device 18, via corresponding drive circuits 38.

In the embodiment shown in FIG. 1, the NH$_3$ synthesizing catalyst 8 is comprised of a three-way catalyst 8a, which is simply expressed as a TW catalyst here. The TW catalyst 8a is comprised of precious metals such as palladium Pd, platinum Pt, iridium Ir, and rhodium Rh, carried on a layer of, for example, alumina, formed on a surface of a substrate.

Figure 2:
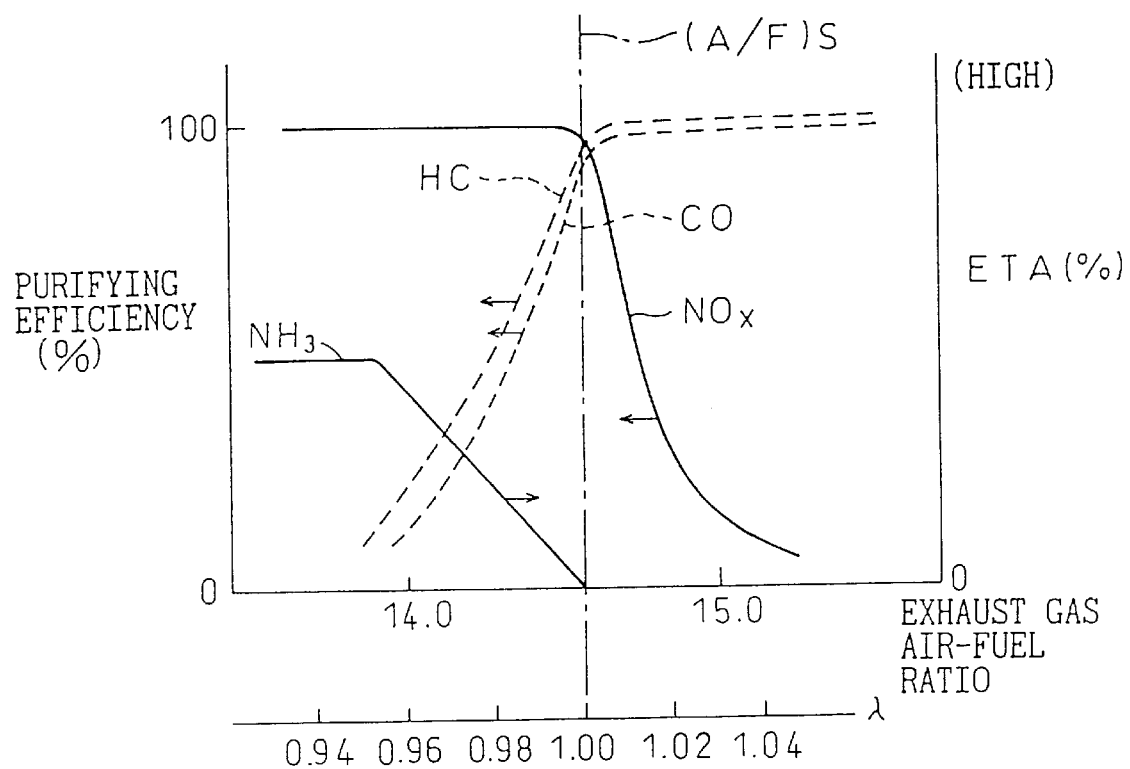
FIG. 2 illustrates a characteristic of a three-way catalyst.

FIG. 2 illustrates the purifying efficiency of the exhaust gas of the TW catalyst 8a. As shown in FIG. 2, the TW catalyst 8a passes the inflowing NO$_x$ therethrough when the exhaust gas air-fuel ratio of the inflowing exhaust gas is lean with respect to the stoichiometric air-fuel ratio (A/F)S, which is about 14.6 and the air-excess ratio λ=1.0, and synthesizes NH$_3$ from a part of the inflowing NO$_x$ when the exhaust gas air-fuel ratio of the inflowing exhaust gas is rich. The NH$_3$ synthesizing function of the TW catalyst 8a is unclear, but it can be considered that some of NO$_x$ in the exhaust gas of which the exhaust gas air-fuel ratio is rich is converted to NH$_3$ according to the following reactions (1) and (2), that is:

  (1)

  (2)

On the contrary, it is considered that the other NO$_x$ is reduced to the nitrogen N$_2$ according to the following reactions (3) to (6), that is:

  (3)

  (4)

  (5)

  (6)

Accordingly, NO$_x$ flowing in the TW catalyst 8a is converted to either NH$_3$ or N$_2$ when the exhaust gas air-fuel ratio of the inflowing exhaust gas is rich, and thus NO$_x$ is prevented from flowing out from the Tw catalyst 8a.

As shown in FIG. 2, the efficiency ETA of the NH$_3$ synthesizing of the TW catalyst 8a becomes larger as the exhaust gas air-fuel ratio of the inflowing exhaust gas becomes smaller or richer than the stoichiometric air-fuel ratio (A/F)S, and is kept constant when the exhaust gas air-fuel ratio of the inflowing exhaust gas become even smaller. In the example shown in FIG. 2, the NH$_3$ synthesizing efficiency ETA is kept constant when the exhaust gas air-fuel ratio of the inflowing exhaust gas equals or is smaller than about 13.8, where the air-excess ratio λ is about 0.95.

Figure 24:
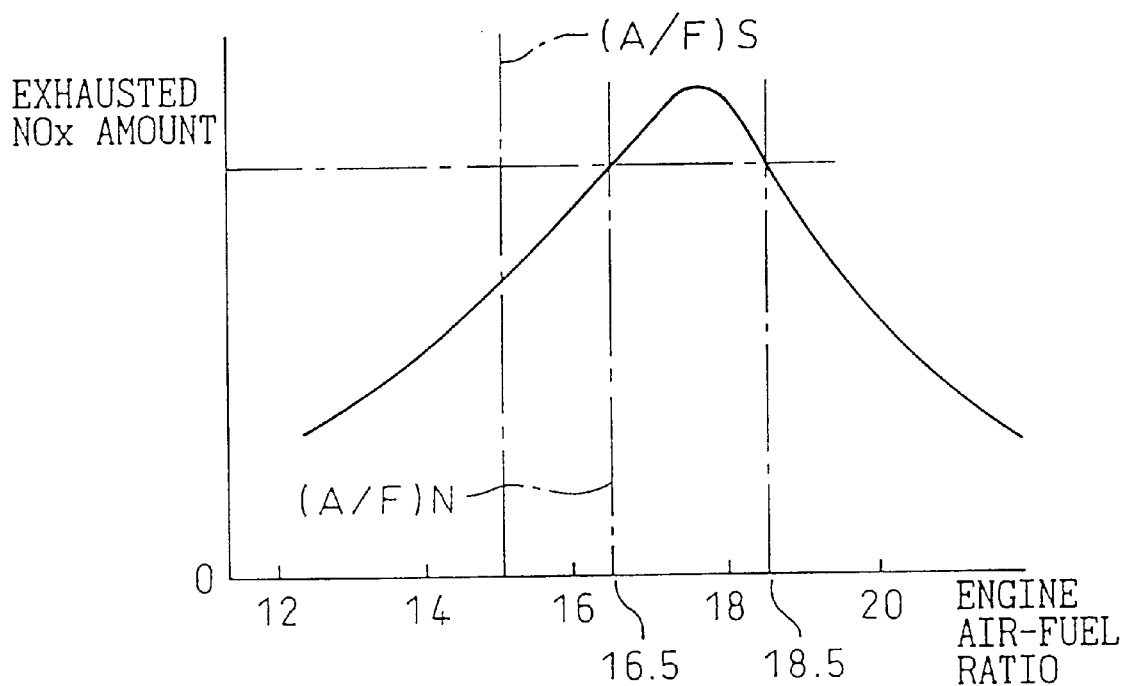
FIG. 24 illustrates a variation of a $NO_x$ amount exhaust from the engine with an engine air-fuel ratio.

On the other hand, the NO$_x$ amount exhausted from each cylinder per unit time depends on the engine air-fuel ratio, as shown in FIG. 24 and explained hereinafter. In particular, the exhausted NO$_x$ amount becomes smaller as the engine air-fuel ratio becomes smaller when the engine air-fuel ratio is rich. Therefore, considering the synthesizing efficiency ETA, the $NH_3$ amount synthesized in the TW catalyst 8a per unit time reaches the maximum amount thereof when the exhaust gas air-fuel ratio of the inflowing exhaust gas is about 13.8, if the exhaust gas air-fuel ratio of the inflowing exhaust gas conforms to the engine air-fuel ratio.

Note that, in the engine shown in FIG. 1, it is desired to synthesize as much $NH_3$ as possible when the exhaust gas air-fuel ratio of the exhaust gas flowing into the TW catalyst 8a is rich, as can be understood from the following description. Accordingly, a TW catalyst carrying palladium Pd or cerium Ce is used as the TW catalyst 8a. In particular, a TW catalyst carrying palladium Pd can also enhance the HC purifying efficiency, when the exhaust air-fuel ratio of the inflowing exhaust gas is rich. Further, note that a TW catalyst carrying rhodium Rh suppresses $NH_3$ synthesizing therein, and a TW catalyst without rhodium Rh is preferably used as the TW catalyst 8a.

On the other hand, the occlusive material 11 is for occluding $NO_x$ in the inflowing exhaust gas to thereby prevent a large amount of $NO_x$ from flowing into the exhaust gas purifying catalyst 14. The occlusive material 11 does not necessarily have a catalytic function, but, in this embodiment, a $NO_x$ occluding and reducing catalyst 11a, which is simply expressed as a $NO_x$-OR catalyst, is used as the occlusive material 11. The $NO_x$-OR catalyst 11a has both an occluding and releasing function of the $NO_x$ and a reducing function of $NO_x$, and is comprised of at least one substance selected from alkali metals such as potassium K, sodium Na, lithium Li, and cesium Cs, alkali earth metals such as barium Ba and calcium Ca, rare earth metals such as lanthanum La and yttrium Y, and transition metals such as iron Fe and copper Cu, and of precious metals such as palladium Pd, platinum Pt, iridium Ir, and rhodium Rh, which are carried on alumina as a carrier. The $NO_x$-OR catalyst 11a performs the $NO_x$ occluding and releasing function in which it occludes $NO_x$ therein when the exhaust gas air-fuel ratio of the inflowing exhaust gas is lean, and releases the occluded $NO_x$ therefrom when the oxygen concentration in the inflowing exhaust gas becomes lower.

When the $NO_x$-OR catalyst 11a is disposed in the exhaust passage of the engine, the $NO_x$-OR catalyst 11a actually performs the $NO_x$ occluding and releasing function, but the function is unclear. However, it can be considered that the function is performed according to the mechanism as explained below. This mechanism will be explained by using as an example a case where platinum Pt and barium Ba are carried on the carrier, but a similar mechanism is obtained even if another precious metal, alkali metal, alkali earth metal, or rare earth metal is used.

Namely, when the exhaust gas air-fuel ratio of the inflowing exhaust gas becomes lean, that is, when the oxygen concentration in the inflowing exhaust gas increases, the oxygen $O_2$ is deposited on the surface of platinum Pt in the form of $O_2^-$ or $O^{2-}$. On the other hand, NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and is occluded into the $NO_x$-OR catalyst 11a. While bonding with barium oxide BaO, it is diffused in the $NO_x$-OR catalyst 11a in the form of nitric acid ions $NO_3^-$. In this way, $NO_x$ is occluded in the $NO_x$-OR catalyst 11a.

Contrarily, when the oxygen concentration in the inflowing exhaust gas becomes lower and the production of $NO_2$ is lower, the reaction proceeds in an inverse direction ($NO_3^- \rightarrow NO_2$), and thus nitric acid ions $NO_3^-$ in the $NO_x$-OR catalyst 11a are released in the form of $NO_2$ from the $NO_x$-OR catalyst 11a. Namely, when the oxygen concentration in the inflowing exhaust gas is lowered, that is, when the exhaust gas air-fuel ratio of the inflowing exhaust gas is changed lean to rich, $NO_x$ is released from the $NO_x$-OR catalyst 11a. At this time, if the reducing agent such as $NH_3$, HC, and CO, exists in the $NO_x$-OR catalyst 11a, $NO_x$ is reduced and purified by the $NH_3$, the HC, and the CO.

As mentioned above, the occlusive material 11 is to prevent a large amount of $NO_x$ from flowing into the exhaust gas purifying catalyst 14, and is not necessarily able to occlude all of the inflowing $NO_x$ therein. Thus, the $NO_x$-OR catalyst 11a has a relatively small volume.

On the other hand, the exhaust gas purifying catalyst 14 is for purifying the inflowing $NO_x$ and $NH_3$ simultaneously, and does not necessarily have an $NH_3$ adsorbing function. However, in this embodiment, the exhaust gas purifying catalyst 14 consists of an $NH_3$ adsorbing and oxidizing catalyst 14a, which is simply expressed as a $NH_3$-AO catalyst, and has both an adsorbing and desorbing function of $NH_3$ and a catalytic function. The $NH_3$-AO catalyst 14a is comprised of a so-called zeolite denitration catalyst, such as zeolite carrying copper Cu thereon (the Cu zeolite catalyst), zeolite carrying copper Cu and platinum Pt thereon (the PT—Cu zeolite catalyst), and zeolite carrying iron Fe thereon, which is carried on a surface of a substrate. Alternatively, the $NH_3$-AO catalyst 14a may be comprised of solid acid such as zeolite, silica, silica-alumina, and titania, carrying the transition metals such as iron Fe and copper Cu or precious metals such as palladium Pd, platinum Pt, iridium Ir, and rhodium Rh, or of a combination of at least two of the above. Further alternatively, the exhaust gas purifying catalyst 14 may be comprised of a catalyst carrying at least precious metals (precious metal catalyst), or of a combination of the precious metal catalyst and the $NH_3$-AO catalyst.

It is considered that the $NH_3$-AO catalyst 14a adsorbs $NH_3$ in the inflowing exhaust gas, and desorbs the adsorbed $NH_3$ when the $NH_3$ concentration in the inflowing exhaust gas becomes lower, or when the inflowing exhaust gas includes $NO_x$. At this time, it is considered that, if the $NH_3$-AO catalyst 14a is under the oxidizing atmosphere, that is, if the exhaust gas air-fuel ratio of the inflowing exhaust gas is lean, the $NH_3$-AO catalyst 14a oxidizes all of $NH_3$ desorbed therefrom. Or, it is considered that, if the inflowing exhaust gas includes both $NH_3$ and $NO_x$, the $NH_3$ is oxidized by the $NO_x$ on the $NH_3$-AO catalyst 14a. In these cases, the $NH_3$ oxidizing function is partly unclear, but it can be considered that the $NH_3$ oxidation occurs according to the following reactions (7) to (10), that is:

$$4NH_3 + 7O_2 \rightarrow 4NO_2 + 6H_2O \qquad (7)$$

$$4NH_3 + 5O_2 \rightarrow 4NO + 6H_2O \qquad (8)$$

$$8NH_3 + 6NO_2 \rightarrow 12H_2O + 7N_2 \qquad (9)$$

$$4NH_3 + 4NO + O_2 \rightarrow 6H_2O + 4N_2 \qquad (10)$$

The reactions (9) and (10), which are denitration, reduce both $NO_x$ produced in the oxidation reactions (7) and (8), and $NO_x$ in the exhaust gas flowing in the $NH_3$-AO catalyst 14a. Note that, alternatively, there may be provided the exhaust gas purifying catalyst 14 and the adsorbent separated from each other, and the adsorbent may be arranged downstream of the catalyst 14.

The $NH_3$ purifying catalyst 16 is comprised of transition metals such as iron Fe and copper Cu, or precious metals such as palladium Pd, platinum Pt, iridium Ir, and rhodium Rh, carried on a layer of, for example, alumina, formed on a surface of a substrate. The $NH_3$ purifying catalyst 12 purifies or resolves $NH_3$ in the inflowing exhaust gas, if the catalyst 12 is under the oxidizing atmosphere, that is, if the exhaust gas air-fuel ratio of the inflowing exhaust gas is lean. In this case, it is considered that the oxidation and denitration reactions (7) to (10) mentioned above occur in the catalyst 12 and thereby $NH_3$ is purified or resolved. In this embodiment and embodiments described below, basically, the $NH_3$ amount exhausted from the $NH_3$-AO catalyst 14a is kept at zero, but the $NH_3$ purifying catalyst 16 ensures preventing $NH_3$ from being emitted to the ambient air, even if $NH_3$ is included in the inflowing exhaust gas.

In the engine shown in FIG. 1, the fuel injection time TAU is calculated using the following equation:

$$TAU = TB \cdot ((A/F)S/(A/F)T) \cdot FAF$$

TB represents a basic fuel injection time suitable for making the engine air-fuel ratio of each cylinder equal to the stoichiometric air-fuel ratio (A/F)S, and is calculated using the following equation:

$$TB = (Q/N) \cdot K$$

where Q represents the intake air amount, N represents the engine speed, and K represent a constant. Accordingly, the basic fuel injection time TB is a product of an intake air amount per unit engine speed, and the constant.

(A/F)T represents a target value for the control of the engine air-fuel ratio. When the target value (A/F)T is made larger to make the engine air-fuel ratio lean with respect to the stoichiometric air-fuel ratio, the fuel injection time TAU is made shorter and thereby the fuel amount to be injected is decreased. When the target value (A/F)T is made smaller to make the engine air-fuel ratio rich with respect to the stoichiometric air-fuel ratio, the fuel injection time TAU is made longer and thereby the fuel amount to be injected is increased. Note that, in this embodiment, the target values for the cylinders of the second cylinder group 1b are made identical to each other.

FAF represents a feedback correction coefficient for making the actual engine air-fuel ratio equal to the target value (A/F)T. When calculating the fuel injection time TAU for the cylinder of the first cylinder group 1a, that is, for the first cylinder #1, FAFA is memorized as the feedback correction coefficient FAF, and when calculating the fuel injection time TAU for each cylinder of the second cylinder group 1b, that is, for the second, the third, and the fourth cylinders, FAFB is memorized as the feedback correction coefficient FAF. The feedback correction coefficients FAFA and FAFB are determined, mainly, on the basis of the output signals from the air-fuel ratio sensors 29 and 30, respectively. The exhaust gas air-fuel ratio of the exhaust gas flowing through the exhaust duct 7 and detected by the sensor 29 conforms to the engine air-fuel ratio of the first group 1a. When the exhaust gas air-fuel ratio detected by the sensor 29 is lean with respect to the target value (A/F)T for the first group 1a, the feedback correction coefficient FAFA is made larger and thereby the fuel amount to be injected is increased. When the exhaust gas air-fuel ratio detected by the sensor 29 is rich with respect to the target value (A/F)T for the first group 1a, FAFA is made smaller and thereby the fuel amount to be injected is decreased. In this way, the actual engine air-fuel ratio of the first group 1a is made equal to the target value (A/F)T for the first group 1a.

Also, the exhaust gas air-fuel ratio of the exhaust gas flowing through the exhaust manifold 10 and detected by the sensor 30 conforms to the engine air-fuel ratio of the second group 1b. When the exhaust gas air-fuel ratio detected by the sensor 30 is lean with respect to the target value (A/F)T for the second group 1b, the feedback correction coefficient FAFB is made larger and, thereby, the fuel amount to be injected is increased. When the exhaust gas air-fuel ratio detected by the sensor 30 is rich with respect to the target value (A/F)T for the second group 1b, FAFB is made smaller and, thereby, the fuel amount to be injected is decreased. In this way, the actual engine air-fuel ratio of the second group 1b is made equal to the target value (A/F)T for the second group 1b. Note that the feedback correction coefficients FAFA and FAFB fluctuate around 1.0, respectively.

The air-fuel ratio sensors 31 and 32 are for making the actual engine air-fuel ratio equal to the target value more precisely. Namely, the sensors 31 and 32 are for compensating for the deviation of the engine air-fuel ratio of the first and second groups 1a and 1b from the corresponding target value (A/F)T due to the deterioration of the sensors 29 and 30. As each sensor 29, 30, 31, 32, a sensor suitably selected from an air-fuel ratio sensor generating an output voltage which corresponds to the exhaust gas air-fuel ratio over the broader range of the exhaust gas air-fuel ratio, and a Z-output type oxygen concentration sensor, of which an output voltage varies drastically when the detecting exhaust gas air-fuel ratio increases or decreases across the stoichiometric air-fuel ratio, may be used.

In the engine shown in FIG. 1, there is no device for supplying secondary fuel or secondary air in the exhaust passage, other than the secondary air supplying device 18. Thus, the exhaust gas air-fuel ratio of the exhaust gas flowing into the TW catalyst 8a conforms to the engine air-fuel ratio of the first group 1a, and the exhaust gas air-fuel ratio of the exhaust gas flowing into the $NO_x$-OR catalyst 11a conforms to the engine air-fuel ratio of the second group 1b. Contrarily, in the exhaust passage downstream of the secondary air supplying device 18, the exhaust gas air-fuel ratio conforms to a ratio of the total amount of air fed into all of the cylinders to the total amount of fuel fed into all of the cylinders when the supply of the secondary air is stopped, and is made lean with respect to that ratio when the secondary air is supplied.

Next, the exhaust gas purifying method in this embodiment will be explained with reference to FIGS. 3 and 4.

In this embodiment, the exhaust gas air-fuel ratio of the exhaust gas flowing into the TW catalyst 8a is basically made rich, and an exhaust gas air-fuel ratio of the exhaust gas flowing into the $NO_x$-OR catalyst 11a is basically made lean. When the exhaust gas air-fuel ratio of the inflowing exhaust gas is made rich, the TW catalyst 8a converts a part of the inflowing $NO_x$. The $NH_3$ synthesized in the TW catalyst 8a then flows into the $NH_3$-AO catalyst 14a, via the interconnecting duct 13. On the other hand, when the exhaust gas air-fuel ratio of the exhaust gas flowing into the $NO_x$-OR catalyst 11a is made lean, most $NO_x$ in the inflowing exhaust gas is occluded in the $NO_x$-OR catalyst 11a, and the remaining $NO_x$ passes through the $NO_x$-OR catalyst 11a without being occluded. The $NO_x$ then flows into the $NH_3$-AO catalyst 14a, via the interconnecting duct 13.

Into the $NH_3$-AO catalyst 14a is mixed the exhaust gas exhausted from the TW catalyst 8a and that from the $NO_x$-OR catalyst 11a. The exhaust gas air-fuel ratio of the exhaust gas flowing into the $NH_3$-AO catalyst 14a is kept lean in this embodiment, and thus the $NO_x$ and the $NH_3$ are purified according to the above-mentioned reactions (7) to (10), on the $NH_3$-AO catalyst 14a. Therefore, $NO_x$ and $NH_3$ are prevented from being emitted to the ambient air. Note that, when the exhaust gas air-fuel ratio of the exhaust gas flowing into the TW catalyst 8$a$ is rich, unburned hydrocarbon HC, carbon monoxide CO, or hydrogen $H_2$ may pass through the TW catalyst 8$a$ and may flow into the $NH_3$-AO catalyst 14$a$. It is considered that the HC, CO, etc. act as the reducing agent, as well as $NH_3$, and reduce a part of $NO_x$ on the $NH_3$-AO catalyst 14$a$. However, the reducing ability of $NH_3$ is higher than those of HC, CO, etc., and thus $NO_x$ can be reliably purified by using $NH_3$ as the reducing agent.

As mentioned above, the exhaust gas air-fuel ratio of the exhaust gas flowing into the TW catalyst 8$a$ conforms to the engine air-fuel ratio of the first cylinder group 1$a$. Thus, to make the exhaust gas air-fuel ratio of the exhaust gas flowing into the TW catalyst 8$a$ rich, the first group 1$a$ performs a rich operation in which the engine air-fuel ratio of each cylinder is rich with respect to the stoichiometric air-fuel ratio (A/F)S. In other words, if the target value (A/F)T of the engine air-fuel ratio of each cylinder is referred as a target air-fuel ratio, the target air-fuel ratio (A/F)T of the first cylinder #1 is made equal to a rich air-fuel ratio (A/F)R which is rich with respect to the stoichiometric air-fuel ratio (A/F)S, to thereby make the exhaust gas air-fuel ratio of the exhaust gas flowing into the TW catalyst 8$a$ rich.

Also, the exhaust gas air-fuel ratio of the exhaust gas flowing into the $NO_x$-OR catalyst 11$a$ conforms to the engine air-fuel ratio of the second cylinder group 1$b$. Thus, to make the exhaust gas air-fuel ratio of the exhaust gas flowing into the $NO_x$-OR catalyst 11$a$ lean, the second group 1$b$ performs a lean operation in which the engine air-fuel ratio of each cylinder is lean with respect to the stoichiometric air-fuel ratio (A/F)S. In other words, the target air-fuel ratio (A/F)T of each of the second, the third, and the fourth cylinders is made equal to a lean air-fuel ratio (A/F)L which is lean with respect to (A/F)S, to thereby make the exhaust gas air-fuel ratio of the exhaust gas flowing into the $NO_x$-OR catalyst 11$a$ lean.

Note that, to make the exhaust gas air-fuel ratio of the exhaust gas flowing into the TW catalyst 8$a$ rich, a secondary fuel supplying device for supplying secondary fuel into the exhaust duct 7 may be provided, and may supply secondary fuel while the first group 1$a$ performs the lean operation. Further, note that, to make the exhaust gas air-fuel ratio of the exhaust gas flowing into the $NO_x$-OR catalyst 11$a$ lean, a secondary air supplying device for supplying secondary air into the exhaust manifold 10 may be provided, and may supply secondary air while the second group 1$b$ performs the rich operation.

The lean air-fuel ratio (A/F)L and the rich air-fuel ratio (A/F)R may be set to vary in accordance with the engine operating condition, respectively. However, in this embodiment, the lean air-fuel ratio (A/F)L is set constant at about 18.5, and the rich air-fuel ratio (A/F)R is set constant at about 13.8, regardless the engine operating condition. Therefore, the target air-fuel ratio (A/F)T of the first cylinder is kept constant at about 18.5, and that of each of the second, the third, and the fourth cylinders is kept constant at about 13.8. By setting the lean and the rich air-fuel ratios (A/F)L and (A/F)R in the above-mentioned manner, the exhaust gas air-fuel ratio of the exhaust gas flowing into the $NH_3$-AO catalyst 14$a$ is kept lean, without supplying the secondary air supplying device 18. Further, by setting the rich air-fuel ratio (A/F)R to about 13.8, a large amount of $NH_3$ is synthesized in the TW catalyst 8$a$.

If a cylinder operates the lean operation, the fuel consumption rate is lowered. Thus, when the second group 1$b$ basically performs the lean operation, as in the embodiment, the fuel consumption rate of the engine 1 can be lowered, while purifying the exhaust gas sufficiently. In particular, in the engine shown in FIG. 1, the number of the second group 1$b$ is larger than half of the total cylinder number of the engine 1, and thus the fuel consumption rate is further lowered while purifying the exhaust gas sufficiently.

As the cylinder number of the second group 1$b$ becomes larger, that is, as the number of the cylinder performing the lean operation becomes larger, the fuel consumption rate becomes lower. However, as the cylinder number of the second group 1$b$ becomes larger, the $NO_x$ amount exhausted from the second group 1$b$ becomes larger. If such a large amount of $NO_x$ is introduced to the $NH_3$-AO catalyst 14$a$ directly, that is, without contacting the $NO_x$-OR catalyst 11$a$, the $NO_x$ may be emitted from the $NH_3$-AO catalyst 14$a$ without being reduced, because there may a case where $NH_3$ required to purify such a large amount of $NO_x$ is not supplied to the $NH_3$-AO catalyst 14$a$. Namely, the $NO_x$ amount may be excessive to the $NH_3$ amount, at the $NH_3$-AO catalyst 14$a$. In particular, as the cylinder number of the second group 1$b$ becomes larger, that of the first group 1$a$ becomes smaller and the $NO_x$ amount exhausted from the first cylinder 1$a$ becomes smaller. As a result, as the cylinder number of the second group 1$b$ becomes larger, the $NH_3$ amount flowing into the $NH_3$-AO catalyst 14$a$ becomes smaller. Thus, in this case, there is a large possibility that the $NO_x$ amount is excessive to the $NH_3$ amount in the $NH_3$-AO catalyst 14$a$.

Thus, in this embodiment, the exhaust gas from the second cylinder group 1$b$ is introduced to the $NO_x$-OR catalyst 11$a$ to thereby occlude most of the $NO_x$ in the $NO_x$-OR catalyst 11$a$ and suppress the $NO_x$ amount flowing into the $NH_3$-AO catalyst 14$a$, to thereby prevent the $NO_x$ amount flowing into the $NH_3$-AO catalyst 14$a$ from exceeding a $NO_x$ amount which can be purified by the $NH_3$ flowing into the $NH_3$-AO catalyst 14$a$. In other words, the $NO_x$ amount is made equal to or smaller than a $NO_x$ amount which can be purified by the $NH_3$ flowing into the $NH_3$-AO catalyst 14$a$. As a result, substantially all of $NO_x$ flowing into the $NH_3$-AO catalyst 14$a$ is purified sufficiently.

If controlling one or both of the $NH_3$ amount and the $NO_x$ amount flowing into the $NH_3$-AO catalyst 14$a$ to react $NH_3$ and $NO_x$ without any excess and any lack, no $NH_3$ and $NO_x$ may flow out from the $NH_3$-AO catalyst 14$a$. However it is difficult to controlling one or both of the $NH_3$ amount and the $NO_x$ amount flowing into the $NH_3$-AO catalyst 14$a$ precisely. Contrarily, in this embodiment, the $NO_x$ amount flowing into the $NH_3$-AO catalyst 14$a$ is merely suppressed, and thus the controllability and the structure of the device are simplified.

On the other hand, when the $NO_x$-OR catalyst 11$a$ deteriorates and the occluding ability is lowered, or when the amount or the concentration of $NO_x$ flowing into the $NO_x$-OR catalyst 11$a$ widely increases, an undesirable leakage of $NO_x$ from the $NO_x$-OR catalyst 11$a$ may occur, even when the exhaust gas air-fuel ratio of the inflowing exhaust gas is lean. However, the leaked $NO_x$ then flows into the $NH_3$-AO catalyst 14$a$, and is reduced by $NH_3$. Accordingly, even if the undesirable leakage of $NO_x$ from the $NO_x$-OR catalyst 11$a$ occurs, the $NO_x$ is prevented from being emitted to the ambient air.

When the $NH_3$ amount flowing into the $NH_3$-AO catalyst 14$a$ is excessive to the $NO_x$ amount flowing into the $NH_3$-AO catalyst 14$a$, the excess $NH_3$ is adsorbed in the $NH_3$-AO catalyst 14$a$. Thus, $NH_3$ is prevented from being emitted to the ambient air. Further, in this embodiment, the $NH_3$ purifying catalyst 16 is arranged downstream of the $NH_3$-AO catalyst 14$a$. Thus, even if $NH_3$ flows out from the $NH_3$-AO catalyst 14a without being adsorbed, the $NH_3$ is purified on the $NH_3$ purifying catalyst 16. In this way, $NH_3$ is reliably prevented from being emitted to the ambient air. The exhaust gas purifying method described above is schematically illustrated in FIG. 3.

If the second group 1b continuously performs the lean operation, the fuel consumption rate is further lowered. However, if the second group 1b continuously performs the lean operation, the occluding capacity of the $NO_x$-OR catalyst 11a becomes lower. If the $NO_x$-OR catalyst 11a is saturated with $NO_x$, the relatively large amount of $NO_x$ exhausted from the second group 1b flows into the $NH_3$-AO catalyst 14a directly. On the other hand, when the exhaust gas air-fuel ratio of the inflowing exhaust gas is made rich, the $NO_x$-OR catalyst 11a releases the occluded $NO_x$ therefrom, as mentioned above. Thus, in this embodiment, the exhaust gas air-fuel ratio of the exhaust gas flowing into the $NO_x$-OR catalyst 11a is changed to rich temporarily to release the occluded $NO_x$ from the $NO_x$-OR catalyst 11a, to thereby prevent the catalyst 11a from being saturated with $NO_x$. Accordingly, the exhaust gas air-fuel ratio of the exhaust gas flowing into the $NO_x$-OR catalyst 11a is made lean and rich alternately and repeatedly.

To make the exhaust gas air-fuel ratio of the exhaust gas flowing into the $NO_x$-OR catalyst 11a rich temporarily, a secondary fuel supplying device for supplying secondary fuel into the $NO_x$-OR catalyst 11a may be provided, and may supply secondary fuel temporarily while the second group 1b performs the lean operation. However, as mentioned above, the exhaust gas air-fuel ratio of the exhaust gas flowing into the $NO_x$-OR catalyst 11a conforms to the engine air-fuel ratio of the second cylinder group 1b. Therefore, in this embodiment, the second group 1b performs the rich operation temporarily, to thereby make the exhaust gas air-fuel ratio of the exhaust gas flowing into the $NO_x$-OR catalyst 11a rich temporarily. Namely, the target air-fuel ratio (A/F)T of for the second group 1b is temporarily set to a rich air-fuel ratio (A/F)RR. The rich air-fuel ratio (A/F)RR may be set to any air-fuel ratio, but in this embodiment, is set to about 13.8 regardless the engine operating condition. Accordingly, the second group 1b performs the lean and the rich operations alternately and repeatedly.

Almost of the $NO_x$ released from the $NO_x$-OR catalyst 11a and the $NO_x$ flowing from the second group 1b to the $NO_x$-OR catalyst 11a when the second group 1b performs the rich operation is reduced on the $NO_x$-OR catalyst 11a by HC and CO flowing into the catalyst 11a and the $NH_3$ synthesized in the catalyst 11a. Namely, the $NO_x$-OR catalyst 11a is a catalyst produced by adding barium, for example, to a three way catalyst, as can be seen the catalytic components mentioned above. Thus, when the exhaust gas air-fuel ratio of the inflowing exhaust gas is rich, the $NO_x$-OR catalyst 11a converts $NO_x$ on the catalyst 11a to $NH_3$. The $NH_3$ reduces $NO_x$ on the $NO_x$-OR catalyst 11a immediately, or it flows into the $NH_3$-AO catalyst 14a.

The small amount of $NO_x$ flowing out from the $NO_x$-OR catalyst 11a when the second group 1b performs the rich operation then flows into the $NH_3$-AO catalyst 14a.

When the second group 1b performs the rich operation and the exhaust gas air-fuel ratio of the inflowing exhaust gas is made rich, the occluded $NO_x$ is released from the $NO_x$-OR catalyst 11a almost at once. However, just after the exhaust gas of which the exhaust gas air-fuel ratio is rich flows into the $NO_x$-OR catalyst 11a, the amount of the reducing agent is still small on the $NO_x$-OR catalyst 11a, and thus some of the $NO_x$ on the $NO_x$-OR catalyst 11a escapes from the catalyst 11a without being reduced. Further, the inventors of the present invention has found that, when CO, $CO_2$, $H_2O$, etc. are not present, $NO_x$ in the form of $NO_2$ easily reacts with $NH_3$, but $NO_x$ in the form of NO hardly reacts with $NH_3$, as long as $O_2$ is not present. As mentioned above, $NO_x$ is released from the $NO_x$-OR catalyst 11a in the form of $NO_2$. However, if the $NO_2$ is converted to NO on the $NO_x$-OR catalyst 11a, the NO is hardly converted to $NO_2$, because the oxygen concentration on the catalyst 11a is very low at this time. As mentioned above, the NO hardly reacts with $NH_3$. Accordingly, the $NO_x$ in the form of NO also escapes from the $NO_x$-OR catalyst 11a.

Note that the $NO_x$ amount escaping from the $NO_x$-OR catalyst 11a at the beginning of the rich operation of the second group 1b becomes larger, as the occluded $NO_x$ amount becomes larger, as the temperature of the catalyst 11a becomes higher, and as the rich air-fuel ratio (A/F)RR becomes larger, that is, becomes closer to the stoichiometric air-fuel ratio (A/F)S.

The $NO_x$, escaping from the $NO_x$-OR catalyst 11a at the beginning of the rich operation of the second group also flows into the $NH_3$-AO catalyst 14a.

If the first group 1a performs the rich operation when the second group 1b performs the rich operation, the exhaust gas air-fuel ratio of the exhaust gas mixture flowing into the $NH_3$-AO catalyst 14a is made rich, and thus $NO_x$ may be reduced in the $NH_3$-AO catalyst 14a sufficiently, even if $NH_3$ is desorbed therefrom or is fed from the TW catalyst 8a, because the catalyst 14a is not in an oxidizing atmosphere. Therefore, the exhaust gas air-fuel ratio of the exhaust gas flowing into the TW catalyst 8a is made lean when the second group 1b has to perform the rich operation to make the exhaust gas air-fuel ratio of the exhaust gas mixture flowing into the $NH_3$-AO catalyst 14a lean, to thereby keep the $NH_3$-AO catalyst 14a under the oxidizing atmosphere. Accordingly, the exhaust gas air-fuel ratio of the exhaust gas flowing into the TW catalyst 8a is made rich and lean alternately and repeatedly.

To make the exhaust gas air-fuel ratio of the exhaust gas flowing into the TW catalyst 8a lean temporarily, a secondary air supplying device for supplying secondary air into the TW catalyst 8a may be provided, and may supply secondary air temporarily while the first group 1a performs the rich operation. However, as mentioned above, the exhaust gas air-fuel ratio of the exhaust gas flowing into the TW catalyst 8a conforms to the engine air-fuel ratio of the first cylinder group 1a. Therefore, in this embodiment, the first group 1a performs the lean operation temporarily, to thereby make the exhaust gas air-fuel ratio of the exhaust gas flowing into the TW catalyst 8a lean temporarily. Namely, the target air-fuel ratio (A/F)T of for the first group 1a is temporarily set to a lean air-fuel ratio (A/F)LL. The lean air-fuel ratio (A/F)LL may be set to any air-fuel ratio, but in this embodiment, is set to about 18.5 regardless the engine operating condition. Accordingly, the first group 1a performs the rich and the lean operations alternately and repeatedly.

When the first group 1a performs the lean operation, $NO_x$ in the inflowing exhaust gas passes through the TW catalyst 8a. That is, the inflowing $NO_x$ flows out without being converted to either $NH_3$ or $N_2$. The $NO_x$ then flows into the $NH_3$-AO catalyst 14a. At this time, the $NH_3$ concentration in the inflowing exhaust gas is low or the exhaust gas includes $NO_x$, and thus $NH_3$ is desorbed from the $NH_3$-AO catalyst 14a. At this time, the $NH_3$-AO catalyst 14a is under the oxidizing atmosphere, and thus the desorbed $NH_3$ reduces and purifies $NO_x$ in the inflowing exhaust gas. Accordingly, $NO_x$ and $NH_3$ in the exhaust gas flowing into the $NH_3$-AO catalyst 14a are purified, when the first group 1a performs the lean operation and the second group 1b performs the rich operation. Note that $NO_x$ in the form of NO is also purified sufficiently in the $NH_3$-AO catalyst 14a.

Even if the $NH_3$ amount desorbed from the $NH_3$-AO catalyst 14a exceeds the amount required for reducing the inflowing $NO_x$ when the first group 1a performs the lean operation and the second group 1b performs the rich operation, the excess $NH_3$ is purified or resolved in the following $NH_3$ purifying catalyst 16. Accordingly, $NH_3$ is prevented from being emitted to the ambient air. The exhaust gas purifying method in this case is illustrated in FIG. 4.

As mentioned above, when the rich operation of the first group 1a is stopped temporarily, the $NH_3$ synthesizing of the TW catalyst 8a is also temporarily stopped, and the $NH_3$ flowing into the $NH_3$-AO catalyst 14a is temporarily stopped. As a result, the adsorbed $NH_3$ is desorbed from the $NH_3$-AO catalyst 14a by causing the first group 1a to perform the lean operation. Accordingly, by causing the first group 1a to perform the lean operation, the $NH_3$ adsorbing capacity of the $NH_3$-AO catalyst 14a is also ensured.

Note that the lean and the rich air-fuel ratios (A/F)LL and (A/F)RR are set to make the exhaust gas air-fuel ratio of the exhaust gas mixture flowing, via the interconnecting duct 13, into the $NH_3$-AO catalyst 14a lean. However, there may be a case where the exhaust gas air-fuel ratio of the exhaust gas mixture flowing into the $NH_3$-AO catalyst 14a is made rich at a transition engine operation. Thus, to make the exhaust gas air-fuel ratio of the exhaust gas mixture flowing into the $NH_3$-AO catalyst 14a lean or stoichiometric regardless of the engine operating condition, the engine shown in FIG. 1 comprises the secondary air supplying device 18. The secondary air supplying device 18 supplies the secondary air to the $NH_3$-AO catalyst 14a continuously or intermittently.

As long as the $NO_x$-OR catalyst 11a is prevented from being saturated, any method may be applied for determining a timing at which the operations of the first and the second groups 1a and 1b are changed between the rich and the lean operations. In this embodiment, this operation change control is performed in accordance with the $NO_x$ amount occluded in the $NO_x$-OR catalyst 11a. Namely, the occluded $NO_x$ amount $S(NO_x)$ is obtained, and the operation of the first group 1a is changed from the rich to the lean and that of the second group 1b is changed from the lean to the rich, when the occluded $NO_x$ amount $S(NO_x)$ becomes larger than a predetermined upper threshold amount $UT(NO_x)$. When the occluded $NO_x$ amount $S(NO_x)$ becomes smaller than a predetermined lower threshold amount $LT(NO_x)$, the operation of the first group 1a is changed from the lean to the rich and that of the second group 1b is changed from the rich to the lean.

Changing the operations of the first and the second groups 1a and 1b when the occluded $NO_x$ amount $S(NO_x)$ becomes larger than the upper threshold amount $UT(NO_x)$, or becomes lower than the lower threshold amount $LT(NO_x)$, as mentioned above, can decrease the frequency of the operation change.

FIG. 5 shows a time chart illustrating the occluded $NO_x$ amount $S(NO_x)$ in the $NO_x$-OR catalyst 11a, and the target air-fuel ratios for the first and the second groups 1a and 1b. In FIG. 5, the time zero represents a time when the first and the second groups 1a and 1b start the rich and the lean operations, respectively. When the first group 1a performs the rich operation with the target air-fuel ratio (A/F)T being the rich air-fuel ratio (A/F)R, and the second group 1b performs the lean operation with the target air-fuel ratio (A/F)T being the lean air-fuel ratio (A/F)L, the occluded $NO_x$ amount $S(NO_x)$ becomes larger, and is larger than the upper threshold amount $UT(NO_x)$ at the time a. When $S(NO_x) > UT(NO_x)$, the target air-fuel ratio (A/F)T for the first group 1a is set to the lean air-fuel ratio (A/F)LL, and that for the second group 1b is set to the rich air-fuel ratio (A/F)RR. As a result, the occluded $NO_x$ is released and the occluded $NO_x$ amount $S(NO_x)$ becomes smaller. At the time b, the occluded $NO_x$ amount $S(NO_x)$ is smaller than the lower threshold $LT(NO_x)$, and the target air-fuel ratios (A/F)T for the first and the second groups 1a and 1b are set again to the rich and the lean air-fuel ratio (A/F)R and (A/F)L, respectively.

It is difficult to directly find the occluded $NO_x$ amount $S(NO_x)$ in the $NO_x$-OR catalyst 11a. Therefore, in this embodiment, the occluded $NO_x$ amount $S(NO_x)$ is estimated on the basis of the $NO_x$ amount flowing into the $NO_x$-OR catalyst 11a, that is, the $NO_x$ amount exhausted from the second group 1b, and of the $NO_x$ amount $F(NO_x)$ passing through the $NO_x$-OR catalyst 11a. In this case, a sensor for detecting the $NO_x$ amount flowing into the $NO_x$-OR catalyst 11a may be arranged in, for example, the exhaust manifold 10 between the second group 1b and the $NO_x$-OR catalyst 11a. However, the $NO_x$ amount flowing into the $NO_x$-OR catalyst 11a can be found on the basis of the engine operating condition. Namely, as the engine speed N becomes higher, the $NO_x$ amount exhausted from the second cylinder 1b per unit time becomes larger and thus the $NO_x$ amount flowing into the $NO_x$-OR catalyst 11a per unit time becomes larger. Also, the exhaust gas amount exhausted from the second group 1b becomes larger and the combustion temperature becomes higher as the engine load Q/N (the intake air amount Q/the engine speed N) becomes higher, and thus the $NO_x$ amount flowing into the TW catalyst 8a per unit becomes larger as the engine load Q/N becomes higher.

Figure 6A:
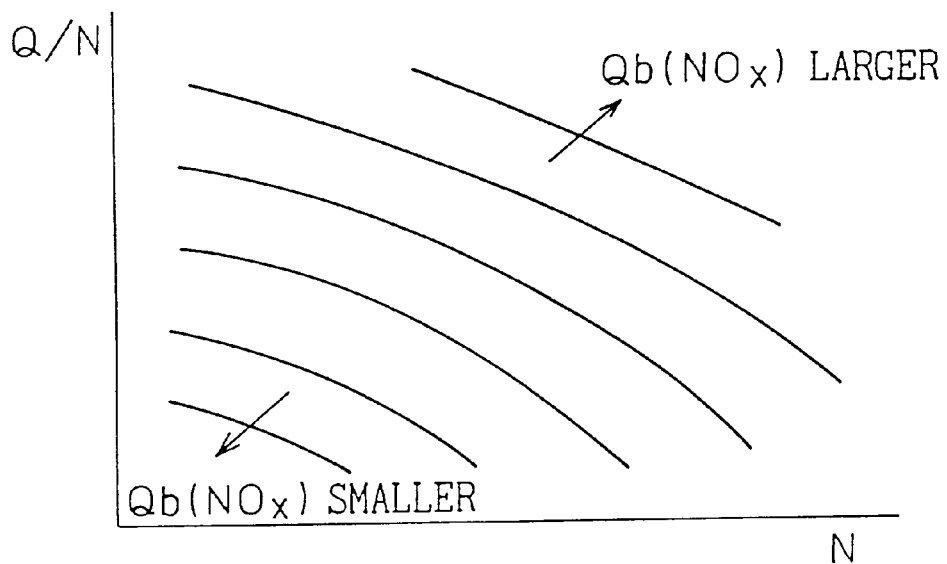
FIGS. 6A and 6B are diagrams illustrating a $NO_x$ amount exhausted from the second cylinder group per unit time.
Figure 6B:
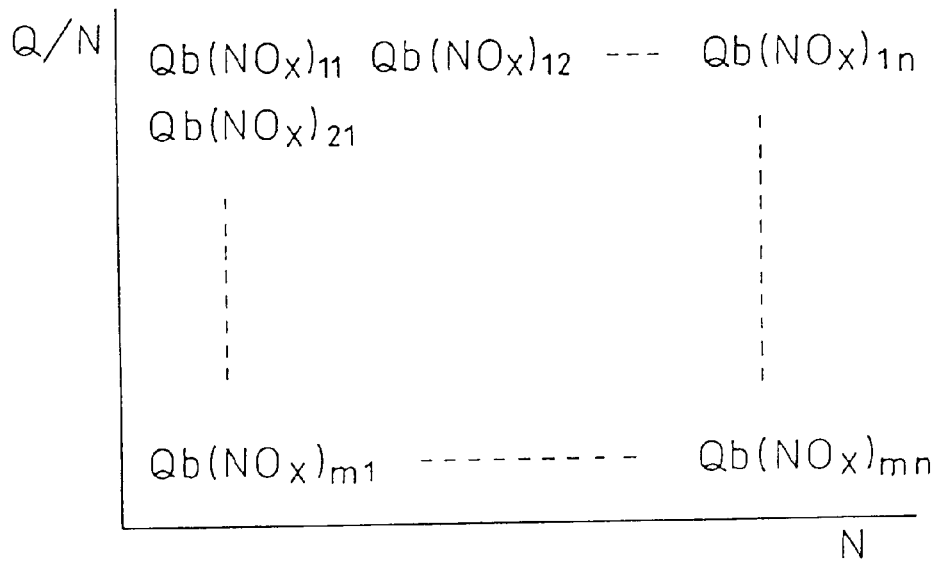

FIG. 6A illustrates the relationships, obtained by experiment, between the $NO_x$ amount exhausted from the second group 1b per unit time $Qb(NO_x)$, the engine load Q/N, and the engine speed N, with the constant lean air-fuel ratio (A/F)L. In FIG. 6A, the curves show the identical $NO_x$ amounts. As shown in FIG. 6A, the exhausted $NO_x$ amount $Qb(NO_x)$ becomes larger as the engine load Q/N becomes higher, and as the engine speed N becomes higher. Note that the exhausted $NO_x$ amount $Qb(NO_x)$ is stored in the ROM 22 in advance in the form of a map as shown in FIG. 6B.

For detecting the $NO_x$ amount $F(NO_x)$ passing through the $NO_x$-OR catalyst 11a and flowing into the $NH_3$-AO catalyst 14a, a sensor may be arranged in the interconnecting duct 13 between the $NO_x$-OR catalyst 11a and $NH_3$-AO catalyst 14a. However, the inflowing $NO_x$ amount $F(NO_x)$ can be found on the basis of the $NO_x$ amount flowing into the $NO_x$-OR catalyst 11a, that is, the exhausted $NO_x$ amount $Qb(NO_x)$, and of the occluded $NO_x$ amount $S(NO_x)$ in the $NO_x$-OR catalyst 11a.

Figure 7A:
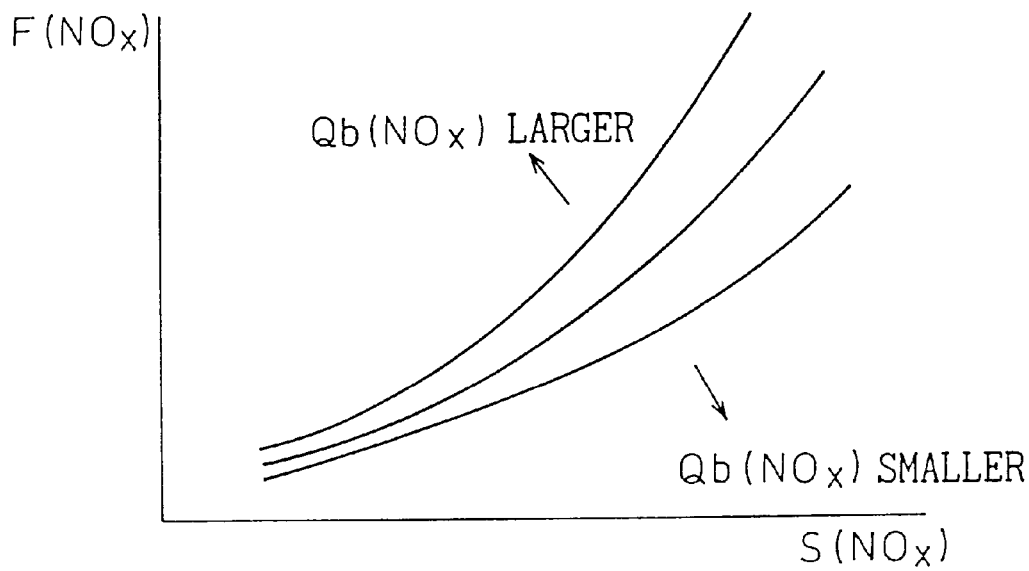
FIGS. 7A and 7B are diagrams illustrating a $NO_x$ amount passing through the $NO_x$-OR catalyst per unit time.
Figure 7B:
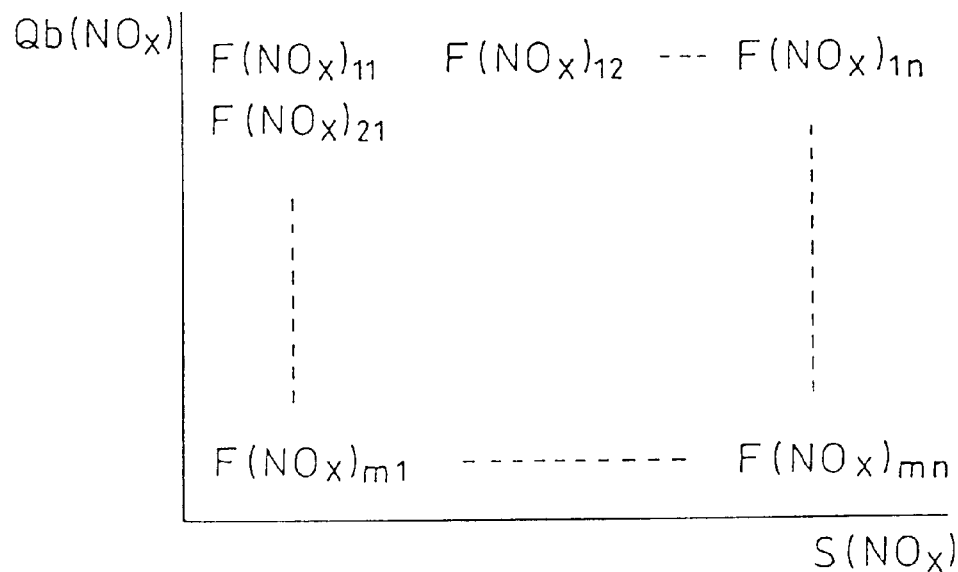

FIG. 7A illustrates experimental results of the $NO_x$ amount passing through the $NO_x$-OR catalyst 11a per unit time $F(NO_x)$. In FIG. 7A, the curves show the identical $NO_x$ amounts. As shown in FIG. 7A, the passing $NO_x$ amount $F(NO_x)$ becomes larger as the exhausted $NO_x$ amount $Qb(NO_x)$ becomes larger, and $F(NO_x)$ becomes larger as the occluded $NO_x$ amount $S(NO_x)$ becomes larger. Note that the passing $NO_x$ amount $F(NO_x)$ is stored in the ROM 22 in advance in the form of a map as shown in FIG. 7B.

Namely, when the second group 1b performs the lean operation, the occluded $NO_x$ amount $S(NO_x)$ increases by $Qb(NO_x) - F(NO_x)$ per unit time. Thus, when the second group 1b performs the lean operation, the occluded $NO_x$ amount $S(NO_x)$ is calculated using the following equation:

$$S(NO_x)=S(NO_x)+\{Qb(NO_x)-F(NO_x)\}\cdot DELTAna$$

where DELTAna represents the time interval of the detection of $Qb(NO_x)$. Thus, $\{Qb(NO_x)-F(NO_x)\}\cdot DELTAna$ represents the $NO_x$ amount occluded in the $NO_x$-OR catalyst 11a from the last detection of $Qb(NO_x)$ until the present detection.

Figure 8A:
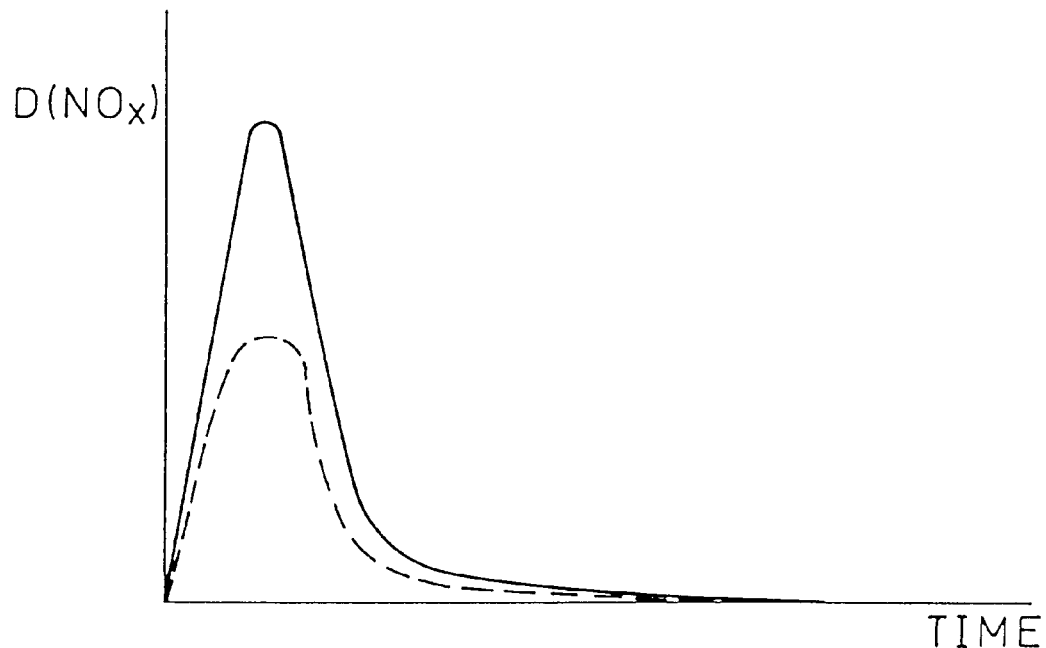
FIGS. 8A and 8B are diagrams illustrating a $NO_x$ amount released from the $NO_x$-OR catalyst per unit time.
Figure 8B:
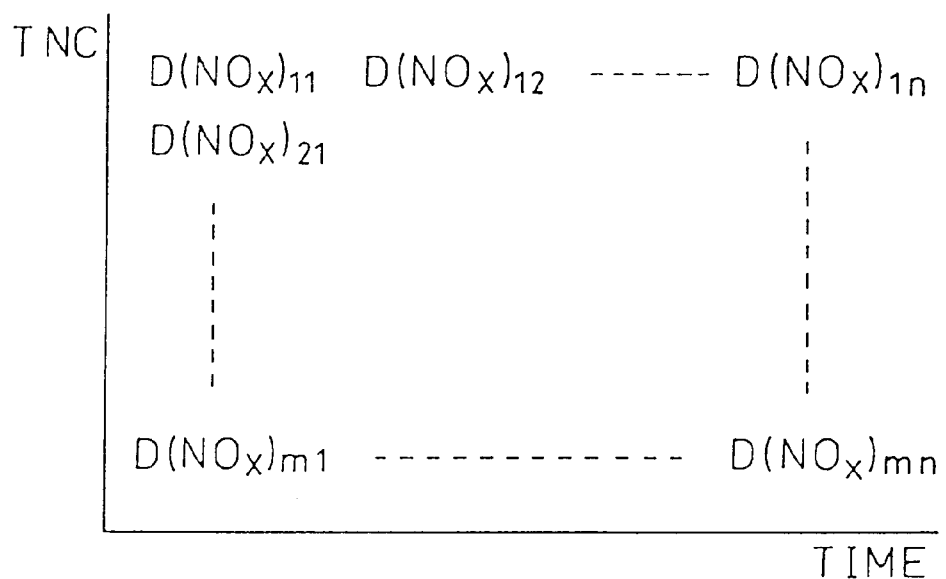

FIG. 8A illustrates the $NO_x$ amount $D(NO_x)$ released from the $NO_x$-OR catalyst 11a per unit time, obtained by experiment. In FIG. 8A, the solid curve shows the case where the temperature TNC of the exhaust gas flowing into the $NO_x$-OR catalyst 11a is high, and the broken curve shows the case where the exhaust gas temperature TNC is low. The exhaust gas temperature TNC represents the temperature of the $NO_x$-OR catalyst 11a. Further, in FIG. 8A, TIME represents a time at which the second group 1b starts the rich operation, that is, the exhaust gas air-fuel ratio of the exhaust gas flowing into the $NO_x$-OR catalyst 11a is changed from lean to rich. The decomposition rate of $NO_x$ in the $NO_x$-OR catalyst 11a becomes higher as the temperature of the catalyst 11a becomes higher. Thus, when the exhaust gas temperature TNC is high as shown by the solid line in FIG. 8A, a large amount of $NO_x$ is released from the $NO_x$-OR catalyst 11a in a short time, while when TNC is low, as shown by the broken line in FIG. 8A, a small amount of $NO_x$ is released. In other words, the released $NO_x$ amount per unit time $D(NO_x)$ becomes larger as the exhaust gas temperature TNC becomes higher. The released $NO_x$ amount $D(NO_x)$ is stored in the ROM 22 as a function of TNC and TIME, in advance in the form of a map as shown in FIG. 8B.

Figure 9:
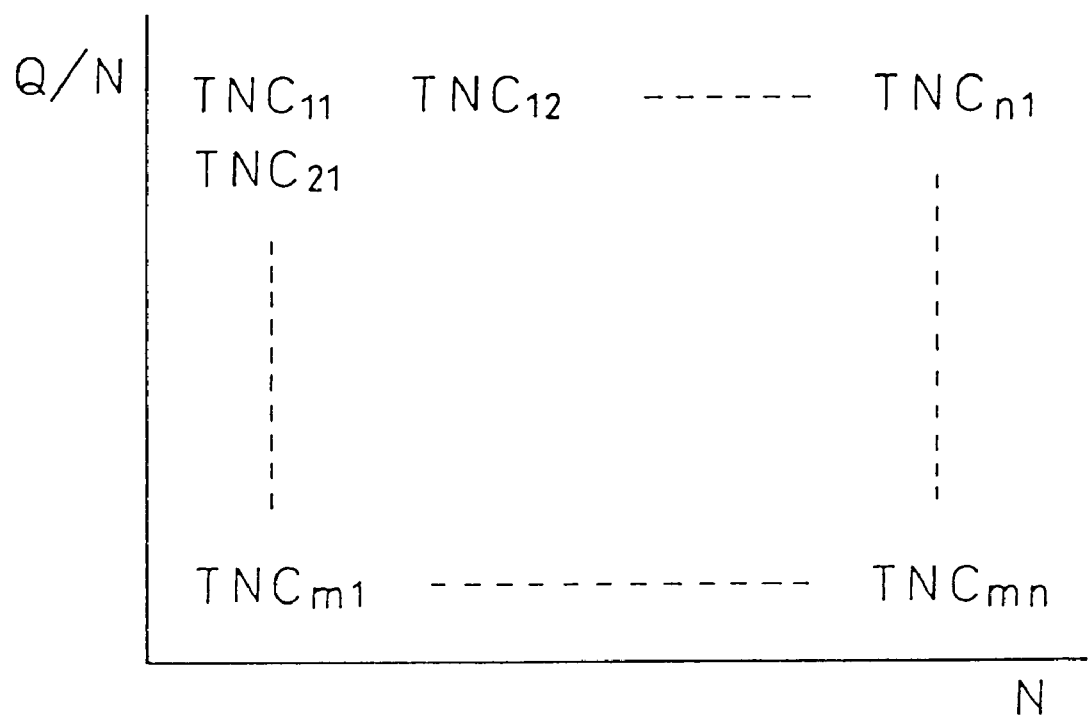
FIG. 9 is a diagram illustrating a temperature of the exhaust gas flowing into the $NO_x$-OR catalyst.

While the exhaust gas temperature TNC may be detected by using a temperature sensor arranged in the exhaust passage, TNC is estimated on the basis of the engine load Q/N and the engine speed N, in this embodiment. That is, TNC is obtained in advance by experiment and is stored in the ROM 22 in advance in the form of a map as shown in FIG. 9.

Namely, when the second group 1b performs the rich operation, the occluded $NO_x$ amount $S(NO_x)$ decreases by $D(NO_x)$ per unit time. Thus, when the second group 1b performs the rich operation, the occluded $NO_x$ amount $S(NO_x)$ is calculated using the following equation:

$$S(NO_x)=S(NO_x)-D(NO_x)\cdot DELTAnd$$

where DELTAnd represents the time interval of the detection of $D(NO_x)$. Thus, $D(NO_x)\cdot DELTAnd$ represents the $NO_x$ amount released from the $NO_x$-OR catalyst 11a from the last detection of $D(NO_x)$ until the present detection.

Note that, when the exhaust gas air-fuel ratio of the exhaust gas flowing into the $NO_x$-OR catalyst 11a is made rich, the exhaust gas air-fuel ratio of the exhaust gas flowing out from the catalyst 11a is substantially stoichiometric when the occluded $NO_x$ is released and reduced, and becomes rich when the releasing of $NO_x$ has been completed. Thus, when the exhaust gas air-fuel ratio of the exhaust gas flowing into the $NO_x$-OR catalyst 11a is to be made rich, the exhaust gas air-fuel ratio may be kept rich as long as the exhaust gas air-fuel detected by the sensor 32 is substantially stoichiometric, and may be changed to lean when the exhaust gas air-fuel detected by the sensor 32 changes to rich.

If a uniform air-fuel mixture spreads over the entire combustion chamber when the engine air-fuel ratio is very lean, such as 18.5, the spark plug (not shown) cannot ignite the air-fuel mixture, because the air-fuel mixture is very thin, and misfiring may occur. To solve this, in the engine shown in FIG. 1, an ignitable air-fuel mixture is formed in a restricted region in the combustion chamber and the reminder is filled with only the air or only the air and the EGR gas, and the air-fuel mixture is ignited by the spark plug, when the lean engine operation is to be performed. This prevents the engine from misfiring, even though the engine air-fuel ratio is very lean. Alternatively, the misfiring may be prevented by forming the swirl flow in the combustion chamber, while forming a uniform air-fuel mixture in the combustion chamber.

Figure 10:
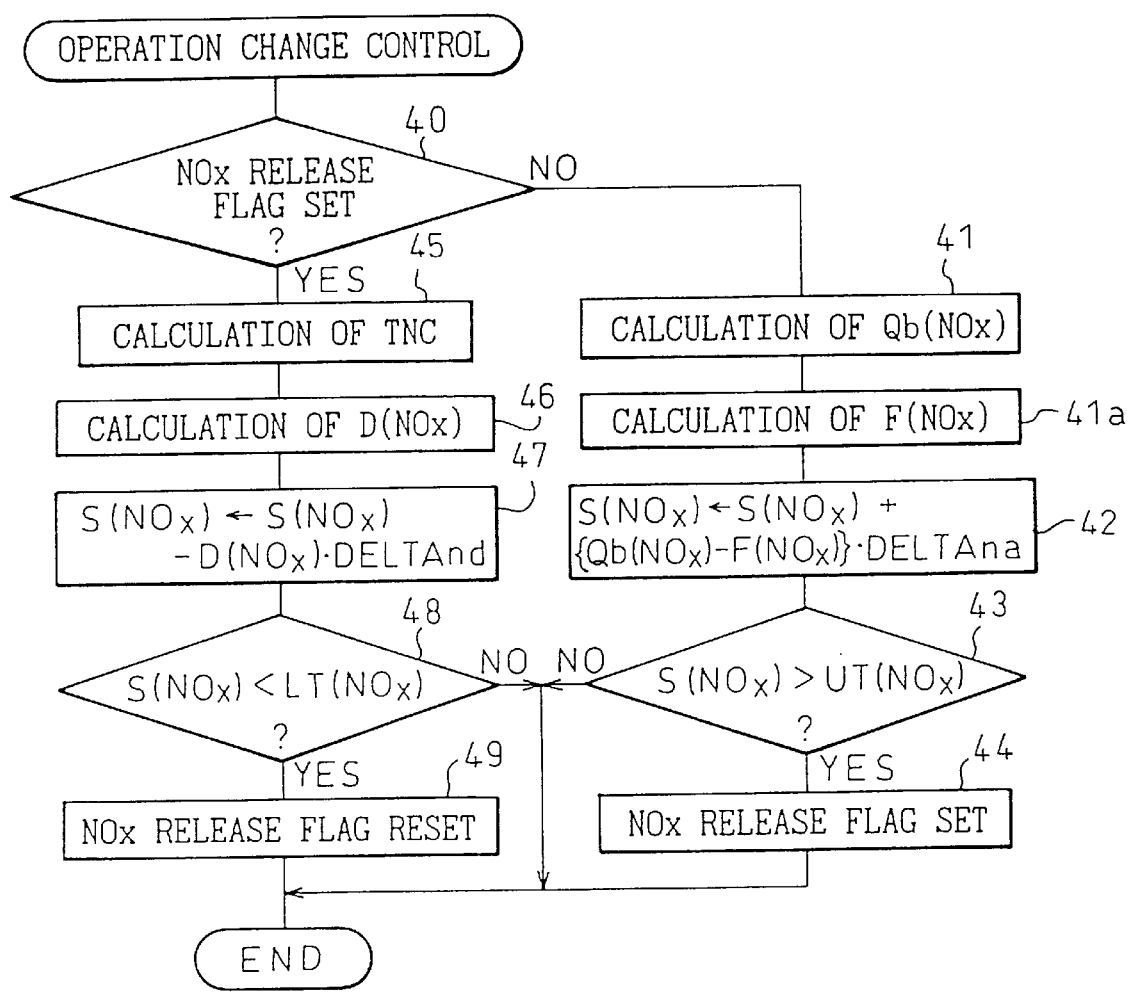
FIG. 10 is a flow chart for executing an operation change control.

FIG. 10 illustrates a routine for executing the operation change control, mentioned above. The routine is executed by interruption every predetermined time.

Referring to FIG. 10, first, in step 40, it is judged whether a $NO_x$ release flag is set. The $NO_x$ release flag is set when the lean and the rich operations are to be performed in the first and the second groups 1a and 1b, respectively, to release $NO_x$ from the $NO_x$-OR catalyst 11a, and is reset when the rich and the lean operations are to be performed in the first and the second groups 1a and 1b, respectively. If the $NO_x$ release flag is reset, the routine goes to step 41, where $Qb(NO_x)$ is calculated using the map shown in FIG. 6B. In the following step 41a, $F(NO_x)$ is calculated using the map shown in FIG. 7B. In the following step 42, the occluded $NO_x$ amount $S(NO_x)$ in the $NO_x$-OR catalyst 11a is calculated using the following equation:

$$S(NO)=S(NO_x)+\{Qb(NO_x)-F(NO_x)\}\cdot DELTAna$$

where DELTAna is a time interval from the last processing cycle until the present processing cycle. In the following step 43, it is judged whether the occluded $NO_x$ amount $S(NO_x)$ is larger than the upper threshold amount $UT(NO_x)$. If $S(NO_x)\leq UT(NO_x)$, the processing cycle is ended. Namely, if $S(NO_x)\leq UT(NO_x)$, the $NO_x$ occluding capacity of the $NO_x$-OR catalyst 11a is judged to be still large, and thus the first and the second groups 1a and 1b continuously perform the rich and the lean operations, respectively.

If $S(NO_x)>UT(NO_x)$ in step 43, the routine goes to step 44, where the $NO_x$ release flag is set, and then the processing cycle is ended. Namely, if $S(NO_x)>UT(NO_x)$, the $NO_x$ occluding capacity is judged to become small. Thus, the first group 1a stops the rich operation and starts the lean operation, and the second group 1b stops the lean operation and starts the rich operation.

Contrarily, if the $NO_x$ release flag is set, the routine goes from step 40 to step 45, where the exhaust gas temperature TNC is calculated using the map shown in FIG. 9. In the following step 46, the desorbed $NH_3$ amount $D(NH_3)$ is calculated using the map shown in FIG. 8B. In the following step 47, the occluded $NO_x$ amount $S(NO_x)$ is calculated using the following equation:

$$S(NO_x)=S(NO_x)-D(NO_x)\cdot DELTAnd$$

where DELTAnd is a time interval from the last processing cycle until the present processing cycle. In the following step 48, it is judged whether the occluded $NO_x$ amount $S(NO_x)$ is smaller than the lower threshold amount $LT(NO_x)$. If $S(NO_x)\geq LT(NO_x)$, the processing cycle is ended. Namely, if $S(NO_x)\geq LT(NO_x)$, the $NO_x$ occluding capacity of the $NO_x$-OR catalyst 11a is judged to be still small, and thus the first and the second groups 1a and 1b continuously perform the lean and the rich operations, respectively.

If $S(NO_x)<LT(NO_x)$, the routine goes to step 48, the $NO_x$ release flag is reset and the processing cycle is ended. Namely, if $S(NO_x)<LT(NO_x)$, the $NO_x$ occluding capacity of the $NO_x$-OR catalyst 11a is judged to be sufficiently large. Thus, the first group 1a stops the lean operation and starts the rich operation, and the second group 1b stops the rich operation and starts the lean operation.

Figure 11:
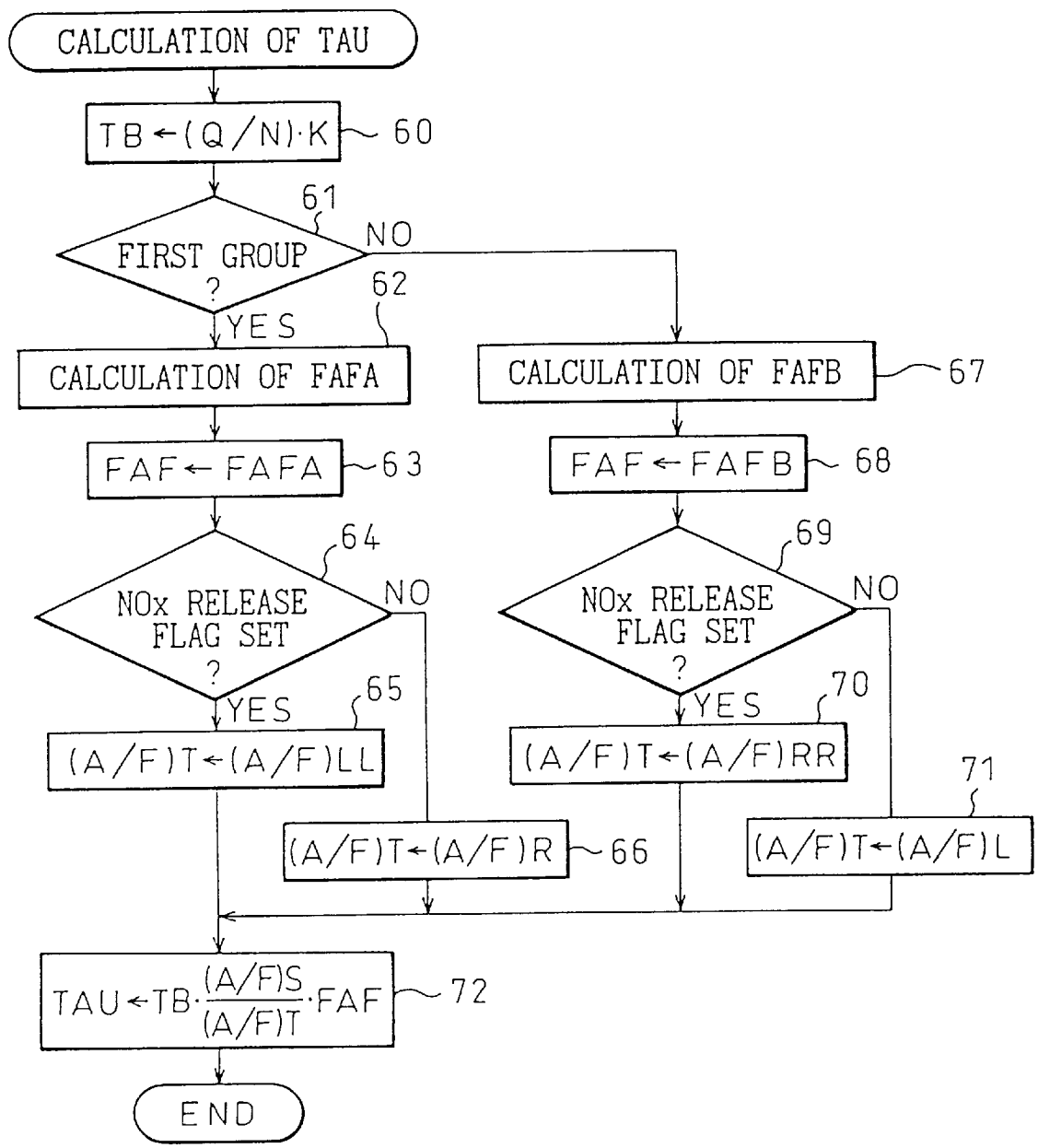
FIG. 11 is a flow chart for calculating a fuel injection time.

FIG. 11 illustrates the routine for calculating the fuel injection time TAU. The routine is executed by interruption every predetermined crank angle.

Referring to FIG. 11, first, in step 60, the basic fuel injection time TB is calculated using the following equation, on the basis of the engine load Q/N and the engine speed N:

$$TB=(Q/N)\cdot K$$

In the following step 61, it is judged whether the fuel injection time TAU to be calculated in this processing cycle is for the first group 1a or for the second group 1b. If TAU is for the first group 1a, that is, for the first cylinder #1, the routine goes to step 62, where the feedback correction coefficient for the first group 1a FAFA is calculated. In the following step 63, FAFA is memorized as FAF. In the following step 64, it is judged whether the $NO_x$ release flag, which is set or reset in the routine shown in FIG. 10, is set. If the $NO_x$ release flag is set, that is, if the lean operation is to be performed in the first group 1a, the routine goes to step 65, where the lean air-fuel ratio (A/F)LL is memorized as the target air-fuel ratio (A/F)T. In this embodiment, the lean air-fuel ratio (A/F)LL is kept constant at 18.5 regardless the engine operating condition, and thus the target air-fuel ratio (A/F)T is made 18.5 in step 65. Next, the routine goes to step 72.

Contrarily, if the $NO_x$ release flag is reset, that is, if the rich operation is to be performed in the first group 1a, the routine goes to step 66, where the rich air-fuel ratio (A/F)R is memorized as the target air-fuel ratio (A/F)T. In this embodiment, the rich air-fuel ratio (A/F)R is kept constant at 13.8 regardless the engine operating condition, and thus the target air-fuel ratio (A/F)T is made 13.8 in step 66. Next, the routine goes to step 72.

If TAU is for the second group 1b in step 61, that is, for any one of the second, the third, and the fourth cylinders, the routine goes to step 67, where the feedback correction coefficient for the second group 1b FAFB is calculated. In the following step 68, FAFB is memorized as FAF. In the following step 69, it is judged whether the $NO_x$ release flag is set. If the $NO_x$ release flag is set, that is, if the rich operation is to be performed in the second group 1b, the routine goes to step 70, where the rich air-fuel ratio (A/F)RR is memorized as the target air-fuel ratio (A/F)T. In this embodiment, the rich air-fuel ratio (A/F)RR is kept constant at 13.8 regardless the engine operating condition, and thus the target air-fuel ratio (A/F)T is made 13.8 in step 70. Next, the routine goes to step 72.

Contrarily, if the $NO_x$ release flag is reset in step 69, that is, if the lean operation is to be performed in the second group 1b, the routine goes to step 71, where the lean air-fuel ratio (A/F)L is memorized as the target air-fuel ratio (A/F)T. In this embodiment, the lean air-fuel ratio (A/F)L is kept constant at 18.5 regardless the engine operating condition, and thus the target air-fuel ratio (A/F)T is made 18.5 in step 71. Next, the routine goes to step 72.

In step 72, the fuel injection time TAU is calculated using the following equation:

$$TAU=TB\cdot((A/F)S/(A/F)T)\cdot FAF$$

Each fuel injector 5 injects the fuel for the fuel injection time TAU.

In the prior art, there is known an exhaust gas purifying device in which: a $NO_x$-OR catalyst is arranged in the exhaust passage; all of the cylinders of the engine basically perform the lean operation and $NO_x$ therefrom is occluded in the $NO_x$-OR catalyst; and the engine temporarily performs the rich operation to thereby release and reduce the occluded $NO_x$. However, when the $NO_x$ occluding capacity is small due to the occluded $NO_x$ amount $S(NO_x)$ being large or the deterioration of the $NO_x$-OR catalyst, or when the $NO_x$ amount or concentration flowing into the $NO_x$-OR catalyst widely increases, some of the inflowing $NO_x$ leaks from the $NO_x$-OR catalyst. The leaked $NO_x$ is then emitted to the ambient air in the prior art device.

Contrarily, in this embodiment, $NH_3$ is synthesized from $NO_x$ from the first group 1a, and is fed to the exhaust passage downstream of the $NO_x$-OR catalyst 11a. Thus, even if $NO_x$ is leaking from the $NO_x$-OR catalyst, the $NO_x$ is reduced by the $NH_3$. Namely, the leaking $NO_x$ is prevented from being emitted to the ambient air.

Next, another embodiment of the operation change control in the engine shown in FIG. 1 will be explained.

As mentioned above, the excess $NH_3$ produced when the first and the second cylinder groups 1a and 1b perform the rich and the lean operations, respectively is adsorbed in the $NH_3$-AO catalyst 14a. Thus, as a period in which the first and the second cylinder groups 1a and 1b perform the rich and the lean operations becomes longer, the adsorbed $NH_3$ amount becomes larger. However, if the $NH_3$-AO catalyst 14a is saturated with $NH_3$, $NH_3$ flows out from the $NH_3$-AO catalyst 14a. The $NH_3$ will be purified in the following $NH_3$ purifying catalyst 16, but it is preferable that the $NH_3$ amount flowing out from the $NH_3$-AO catalyst 14a is as small as possible. If there is no $NH_3$ flowing out from the $NH_3$-AO catalyst 14a, there is no need for providing the $NH_3$ purifying catalyst 16.

Therefore, in this embodiment, the operation change control of the first and the second groups 1a and 1b is executed in accordance with the adsorbed $NH_3$ amount in the $NH_3$-AO catalyst 14a. Namely, first, the adsorbed $NH_3$ amount $S(NH_3)$ in the $NH_3$-AO catalyst 14a is found, and when the adsorbed $NH_3$ amount $S(NH_3)$ becomes larger than a predetermined, upper threshold amount $UT(NH_3)$, the operation in the first group 1a is changed from the rich operation to the lean operation and that in the second group 1b is changed from the lean operation to the rich operation. When the adsorbed $NH_3$ amount $S(NH_3)$ becomes smaller than a predetermined, lower threshold amount $LT(NH_3)$, the operation in the first group 1a is changed from the lean operation to the rich operation and that in the second group 1b is changed from the rich operation to the lean operation.

Figure 12:
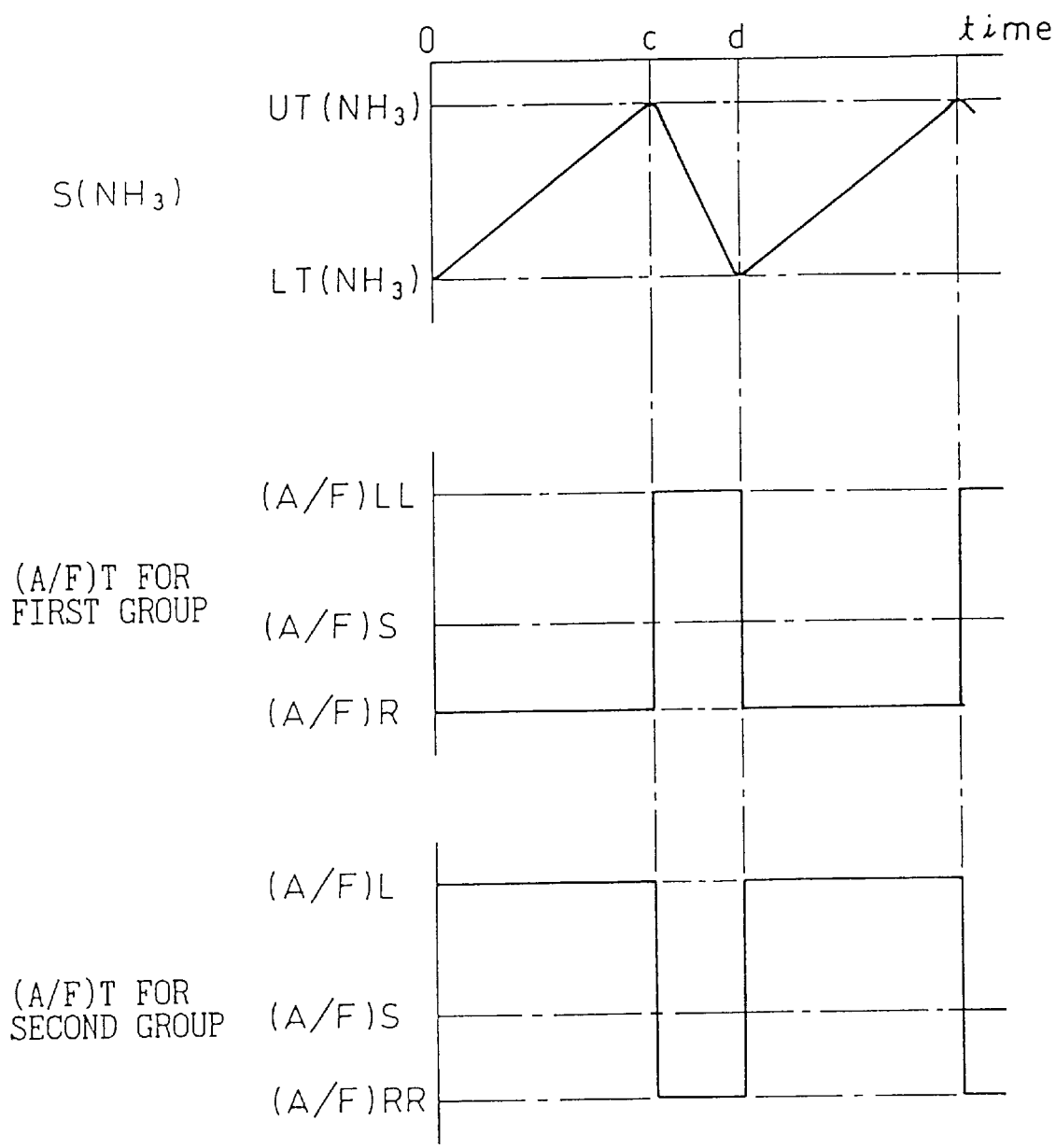
FIG. 12 is a time chart for explaining the exhaust gas purifying method according to another embodiment.

FIG. 12 shows a time chart illustrating the adsorbed $NH_3$ amount $S(NH_3)$ in the $NH_3$-AO catalyst 14a, and the target air-fuel ratios (A/F)T for the first and the second groups 1a and 1b. In FIG. 12, the time zero represents a time when the first and the second groups 1a and 1b start the rich and the lean operations, respectively. When the first group 1a performs the rich operation with the target air-fuel ratio (A/F)T being the rich air-fuel ratio (A/F)R, and the second group 1b performs the lean operation with the target air-fuel ratio (A/F)T being the lean air-fuel ratio (A/F)L, the adsorbed $NH_3$ amount $S(NH_3)$ becomes larger, and is larger than the upper threshold amount $UT(NH_3)$ at the time c. When $S(NH_3)>UT(NH_3)$, the target air-fuel ratio (A/F)T for the first group 1a is set to the lean air-fuel ratio (A/F)LL, and that for the second group 1b is set to the rich air-fuel ratio (A/F)RR. As a result, the adsorbed $NH_3$ is desorbed and the adsorbed $NH_3$ amount $S(NH_3)$ becomes smaller. At the time d, the adsorbed $NH_3$ amount $S(NH_3)$ is smaller than the lower threshold $LT(NH_3)$, and the target air-fuel ratios (A/F)T for the first and the second groups 1a and 1b are set again to the rich and the lean air-fuel ratio (A/F)R and (A/F)L, respectively.

It is difficult to directly find the adsorbed $NH_3$ amount $S(NH_3)$ in the $NH_3$-AO catalyst 14a. Therefore, in this embodiment, the adsorbed $NH_3$ amount $S(NH_3)$ is estimated on the basis of the $NH_3$ amount synthesized in the TW catalyst Ba or flowing into the $NH_3$-AO catalyst 14a, and of the $NO_x$ amount passing through the $NO_x$-OR catalyst 11a or flowing into the $NH_3$-AO catalyst 14a.

A sensor for detecting the $NH_3$ amount flowing into the $NH_3$-AO catalyst 14a may be arranged in the interconnecting duct 13 between the TW catalyst 8a and the $NH_3$-AO catalyst 14a. However, the synthesized $NH_3$ amount can be estimated on the basis of the $NO_x$ amount flowing into the TW catalyst 8a, and the $NO_x$ amount flowing into the TW catalyst 8a can be estimated on the basis of the engine operating condition. That is, the synthesized $NH_3$ amount per unit time becomes larger as the $NO_x$ amount flowing into the TW catalyst 8a per unit time becomes larger. Also, the synthesized $NH_3$ amount per unit time becomes larger as the $NH_3$ synthesizing efficiency ETA becomes higher.

On the other hand, the $NO_x$ amount exhausted from the first group 1a per unit time becomes larger as the engine speed N becomes higher, and thus the $NO_x$ amount $Qa(NO_x)$ flowing into the TW catalyst 8a per unit time becomes larger. Also, the exhaust gas amount exhausted from the first group 1a becomes larger and the combustion temperature becomes higher as the engine load Q/N becomes higher, and thus the $NO_x$ amount flowing into the TW catalyst 8a per unit becomes larger as the engine load Q/N becomes higher.

Figure 13A:
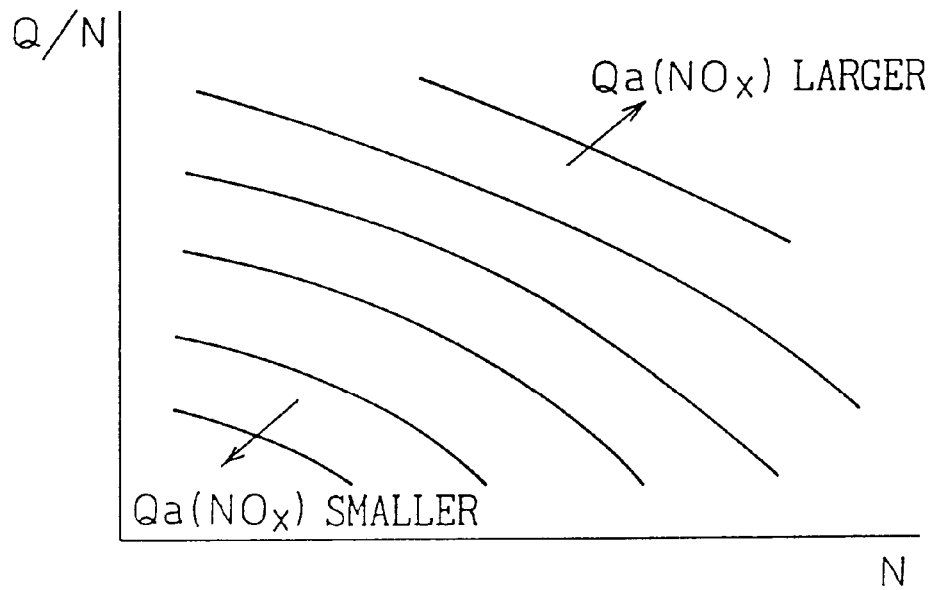
FIGS. 13A and 13B are diagrams illustrating a $NO_x$ amount exhausted from the first cylinder group per unit time.
Figure 13B:
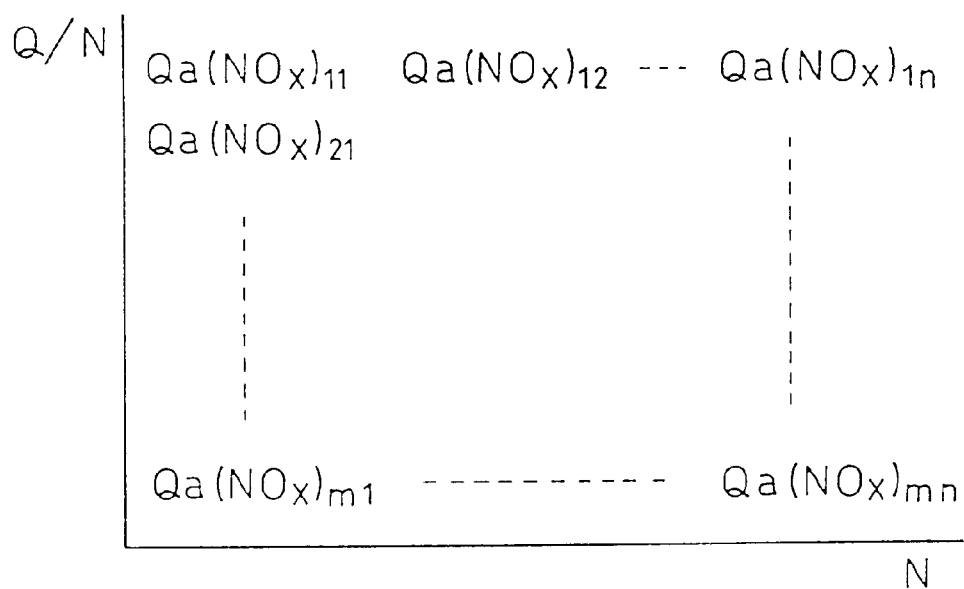

FIG. 13A illustrates the relationships, obtained by experiment, between the $NO_x$ amount exhausted from the first group 1a per unit time $Qa(NO_x)$, the engine load Q/N, and the engine speed N, with the constant rich air-fuel ratio (A/F)R. In FIG. 13A, the curves show the identical $NO_x$ amounts. As shown in FIG. 13A, the exhausted $NO_x$ amount $Qa(NO_x)$ becomes larger as the engine load Q/N becomes higher, and as the engine speed N becomes higher. Note that the exhausted $NO_x$ amount $Qa(NO_x)$ is stored in the ROM 22 in advance in the form of a map as shown in FIG. 13B.

Figure 14:
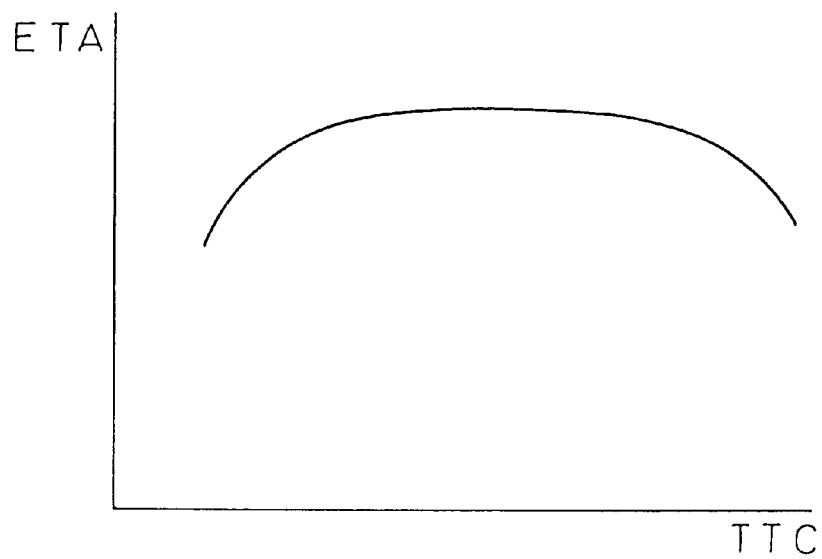
FIG. 14 is a diagram illustrating an $NH_3$ synthesizing efficiency of the three way catalyst.

The $NH_3$ synthesizing efficiency ETA varies in accordance with the temperature TTC of the exhaust gas flowing into the Tw catalyst 8a, which represents the temperature of the TW catalyst 8a. That is, as shown in FIG. 14, the synthesizing efficiency ETA becomes higher as the exhaust gas temperature TTC becomes higher when TTC is low, and becomes lower as TTC becomes higher when TTC is high, with a constant rich air-fuel ratio (A/F)R. The synthesizing efficiency ETA is stored in the ROM 22 in advance in the form of a map as shown in FIG. 14.

Note that the exhausted $NO_x$ amount from the first group 1a per unit time $Qa(NO_x)$ varies in accordance with the engine air-fuel ratio of the first group 1a. Therefore, if the rich air-fuel ratio (A/F)R is changed in accordance with, for example, the engine operating condition, the exhausted $NO_x$ amount $Qa(NO_x)$ obtained by the map shown in FIG. 13B must be corrected on the basis of the actual rich air-fuel ratio (A/F)R. Further, the synthesizing efficiency ETA also varies in accordance with the exhaust gas air-fuel ratio of the exhaust gas flowing into the TW catalyst 8a, that is, the rich air-fuel ratio (A/F)R, as shown in FIG. 2A. Therefore, if the rich air-fuel ratio (A/F)R is changed in accordance with, for example, the engine operating condition, the synthesizing efficiency ETA obtained by the map shown in FIG. 14 also must be corrected on the basis of the actual rich air-fuel ratio (A/F)R. Or, the efficiency ETA must be obtained by using a map representing a relationship between the efficiency ETA and the rich air-fuel ratio (A/F)R.

The product of $Qa(NO_x)$ calculated using the engine load Q/N and the engine speed N and the synthesizing efficiency ETA calculated using the exhaust gas temperature TTC represents the $NH_3$ amount $F(NH_3)$ flowing into the $NH_3$-AO catalyst 14a per unit time.

Note that the exhaust gas temperature TTC is determined in accordance with the engine operating condition such as the engine load Q/N and the engine speed N, and thus the synthesizing efficiency ETA is also determined in accordance with the engine load Q/N and the engine speed N. Accordingly, both $Qa(NO_x)$ and ETA are determined in accordance with the engine load Q/N and the engine speed N. Therefore, the synthesized $NH_3$ amount in the TW catalyst 8a per unit time may be stored in advance in the form of a map, as a function of the engine operating condition such as the engine load Q/N and the engine speed N, and the inflowing $NH_3$ amount $F(NH_3)$ may be calculated by using the map.

The $NO_x$ amount $F(NO_x)$ passing through the $NO_x$-OR catalyst 11a and flowing into the $NH_3$-AO catalyst 14a per unit time when the second group 1b performs the lean operation is calculated by using the map shown in FIG. 7B.

Further, the $NO_x$ amount $Qb(NO_x)$ flowing into the $NO_x$-OR catalyst 11a per unit time is calculated by using the map shown in FIG. 6B. Further, the occluded $NO_x$ amount $S(NO_x)$ in the $NO_x$-OR catalyst 11a is calculated by the method in the above-mentioned embodiment.

If KC represents an $NH_3$ amount required for reducing unit inflowing $NO_x$ amount in the $NH_3$-AO catalyst 14a, $KC \cdot F(NO_x)$ represents an $NH_3$ amount consumed by the $NO_x$ reduction when $NO_x$ flows into the $NH_3$-AO catalyst 14a by $F(NO_x)$ per unit time. Thus, the excess $NH_3$ amount per unit time, that is, the $NH_3$ amount adsorbed in the $NH_3$-AO catalyst 14a per unit time is expressed by $F(NH_3) - KC \cdot F(NO_x)$.

Accordingly, when the first and the second groups 1a and 1b perform the rich and the lean operation, the adsorbed $NH_3$ amount $S(NH_3)$ in the $NH_3$-AO catalyst 14a is calculated using the following equation:

$$S(NH_3) = S(NH_3) + \{F(NH_3) - KC \cdot F(NO_x)\} \cdot \text{DELTAaa}$$

where DELTAaa represents the time interval of the detection of $F(NH_3)$ and $F(NO_x)$. Thus, $\{F(NH_3) - KC \cdot F(NO_x)\} \cdot \text{DELTAaa}$ represents the $NH_3$ amount adsorbed in the $NH_3$-AO catalyst 14a from the last the detection of $F(NH_3)$ and $F(NO_x)$ until the present detection.

Figure 15:
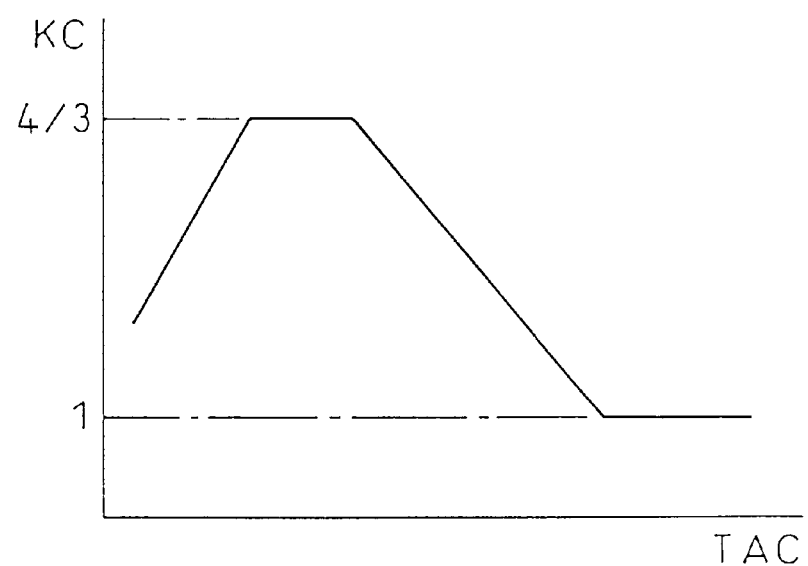
FIG. 15 is a diagram illustrating an equivalent coefficient.

KC is a coefficient determined in accordance with the components of the $NO_x$ flowing into the $NH_3$-AO catalyst 14a, that is, the fractions of NO and $NO_2$ with respect to the total inflowing $NO_x$, and is referred as an equivalent coefficient. The equivalent coefficient KC is set to 4/3 when all of the $NO_x$ flowing into the $NH_3$-AO catalyst 14a is $NO_2$, as can be understood from the above-mentioned reaction (9), and is set to 1 when all of the $NO_x$ is NO, as can be understood from the above-mentioned reaction (10). The fractions of NO and $NO_2$ are determined in accordance with the exhaust gas air-fuel ratio of the exhaust gas flowing into the $NH_3$-AO catalyst 14a and the exhaust gas temperature TAC. Thus, when the exhaust gas air-fuel ratio of the exhaust gas flowing into the $NH_3$-AO catalyst 14a is kept constant, the coefficient KC is determined in accordance with TAC. FIG. 15 illustrates the relationship. As shown in FIG. 15, the equivalent coefficient KC becomes larger as the exhaust gas temperature TAC becomes higher when TAC is low, and becomes smaller as TAC becomes higher when TAC is high, and is kept 1 when TAC becomes further higher. The equivalent coefficient KC is stored in the ROM 22 in advance in the form of a map as shown in FIG. 15. Note that $F(NH_3)/KC$ represents a $NO_x$ amount which can be purified by the $NH_3$ when the $NH_3$ flows into the $NH_3$-AO catalyst 14a by $F(NH_3)$.

Figure 16A:
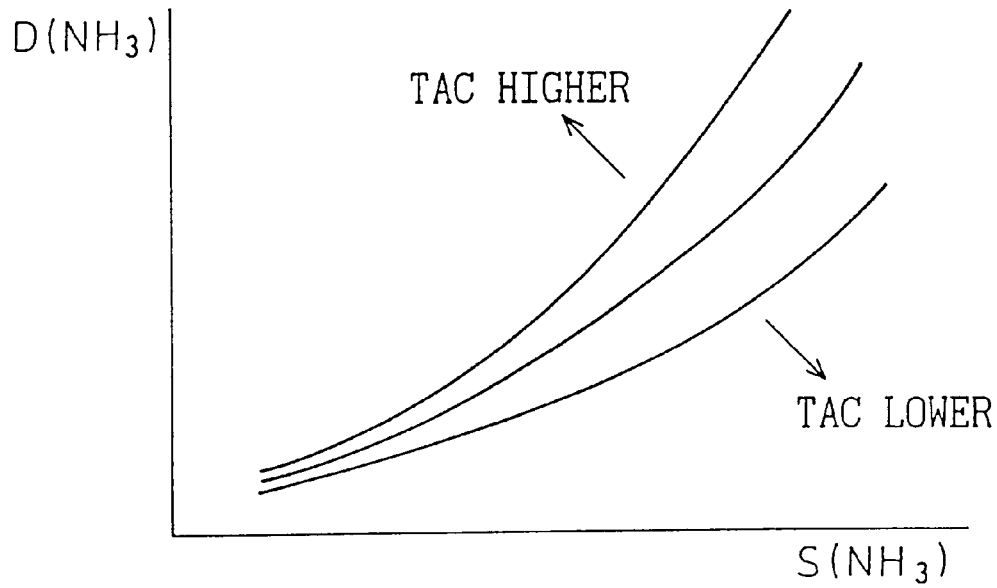
FIGS. 16A and 16B are diagrams illustrating an $NH_3$ amount desorbed from the $NH_3$-AO catalyst per unit time.
Figure 16B:
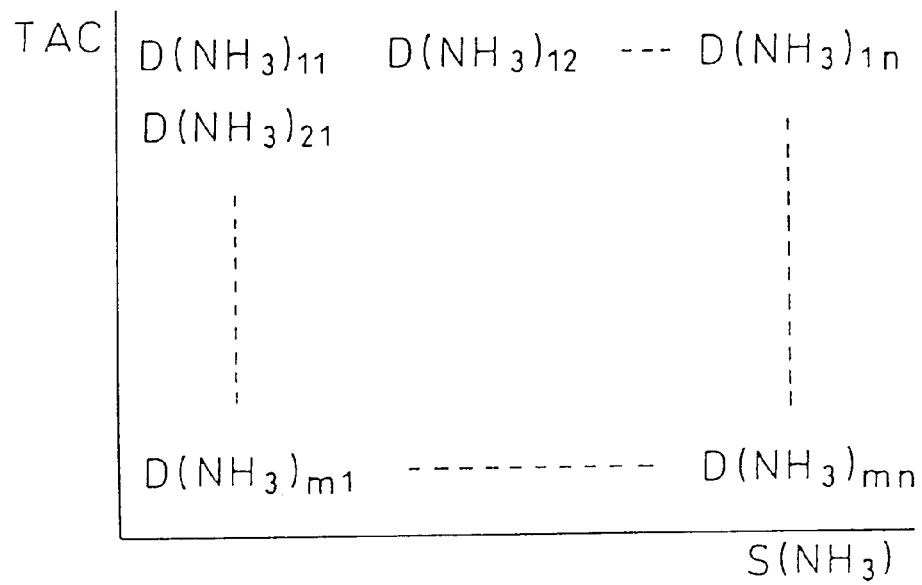

On the other hand, FIG. 16A illustrates the $NH_3$ amount $D(NH_3)$ desorbed from the $NH_3$-AO catalyst 14a per unit time, when the first and the second groups 1a and 1b perform the lean and the. rich operations, respectively, obtained by experiment. In FIG. 16A, the curves show the identical desorbed $NH_3$ amounts. As shown in FIG. 16A, the desorbed $NH_3$ amount $D(NH_3)$ becomes larger as the adsorbed $NH_3$ amount $S(NH_3)$ becomes larger. Also, $D(NH_3)$ becomes larger as the temperature TAC becomes higher. The desorbed $NH_3$ amount $D(NH_3)$ is stored in the ROM 22 in advance in the form of a map as shown in FIG. 16B.

Accordingly, when the first and the second group 1a and 1b perform the lean and the rich operations, respectively, the adsorbed $NH_3$ amount $S(NH_3)$ is calculated using the following equation:

$$S(NH_3)=S(NH_3)-D(NH_3)\cdot DELTAad$$

where DELTAad represents the time interval of the detection of $D(NH_3)$, and thus $D(NH_3)\cdot DELTAad$ represents the $NH_3$ amount desorbed from the $NH_3$-AO catalyst 14a, from the last detection of $D(NH_3)$ until the present detection.

Figure 17:
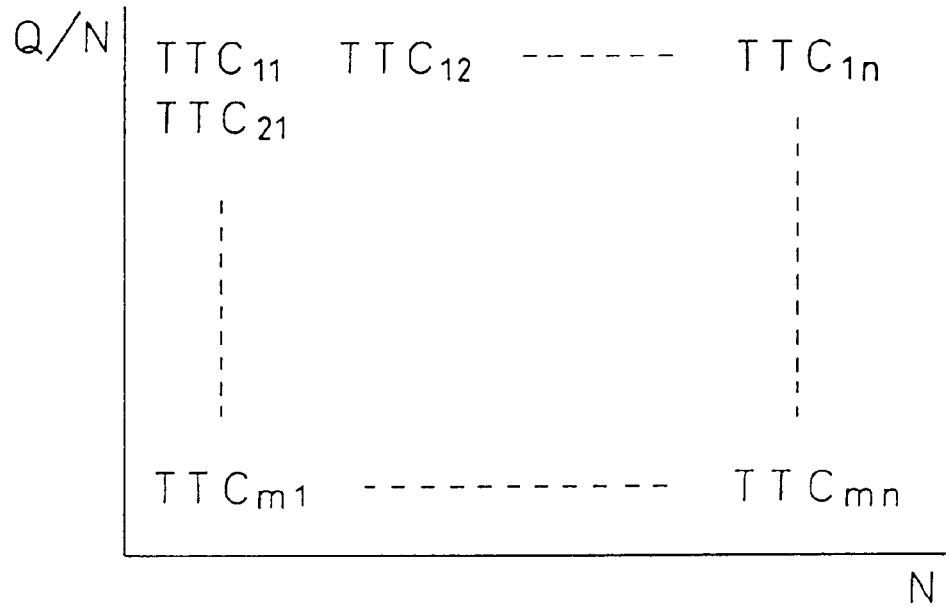
FIG. 17 is a diagram illustrating a temperature of the exhaust gas flowing into the three way catalyst.
Figure 18:
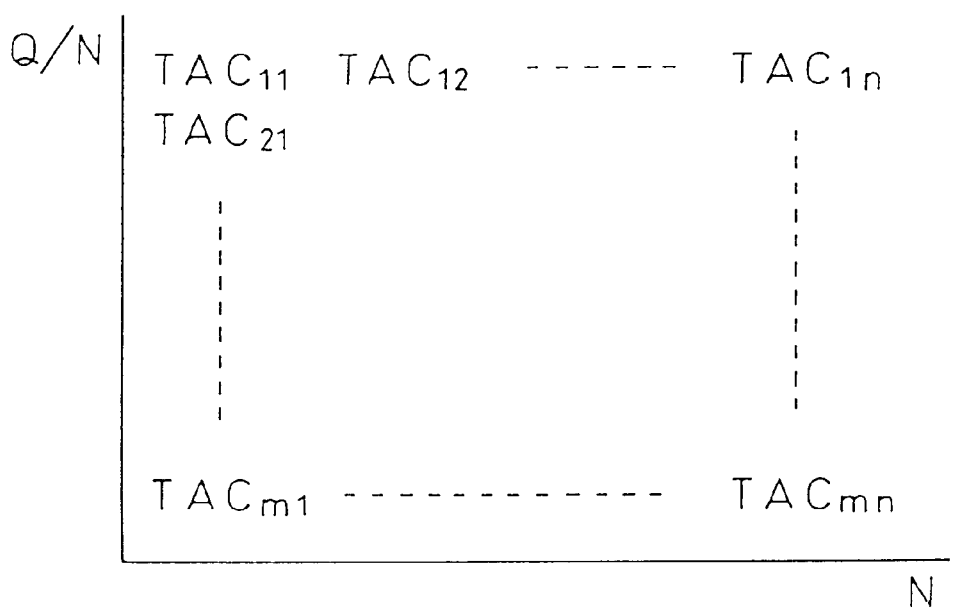
FIG. 18 is a diagram illustrating a temperature of the exhaust gas flowing into the $NH_3$-AO catalyst.

To obtain the temperature TTC of the exhaust gas flowing into the TW catalyst 8a, and the temperature TAC of the exhaust gas flowing into the $NH_3$-AO catalyst 14a, temperature sensors may be arranged in the exhaust passage directly upstream of the TW catalyst 8a and directly upstream of the $NH_3$-AO catalyst 14a, respectively. However, the exhaust gas temperatures can be estimated on the basis of the engine operating condition, that is, the engine load Q/N and the engine speed N. Thus, in the embodiment, TTC and TAC are stored in the ROM 22 in advance in the form of a map as shown in FIGS. 17 and 18. ETA and $D(NH_3)$ are calculated using TTC and TAC obtained by the maps shown in FIGS. 17 and 18.

Figure 19:
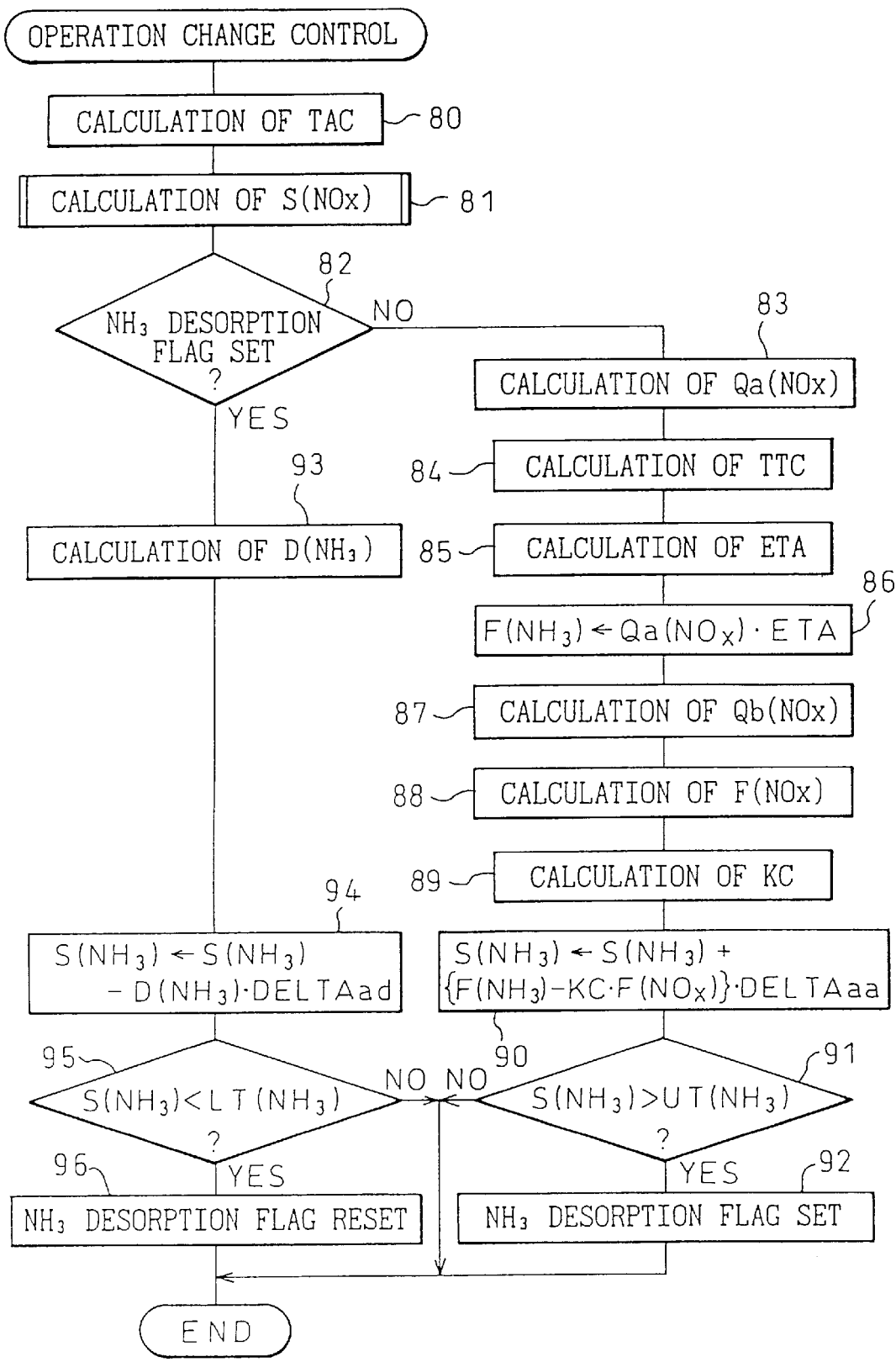
FIG. 19 is a flow chart for executing an operation change control according to the embodiment explained with FIG. 12.
Figure 20:
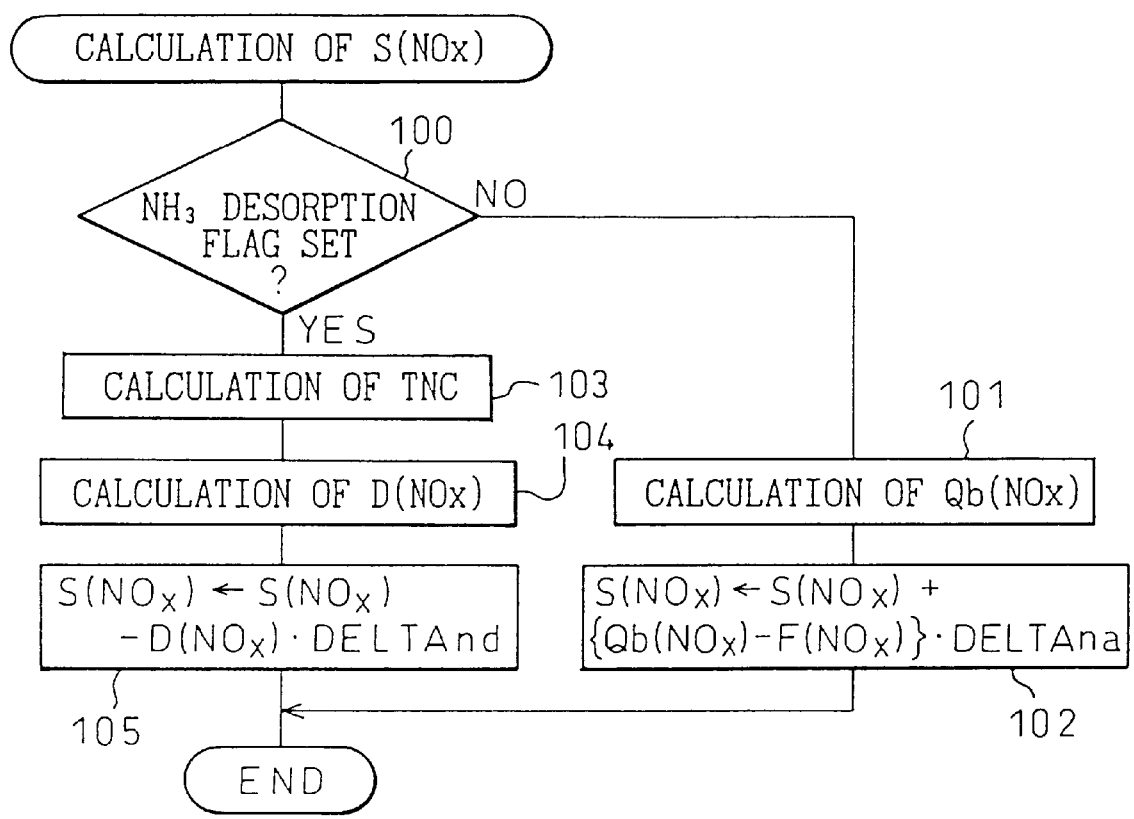
FIG. 20 is a flow chart for calculating a $NO_x$ amount occluded in the $NO_x$-OR catalyst.

FIGS. 19 and 20 illustrate a routine for executing the second embodiment mentioned above. The routine is executed by interruption every predetermined time.

Referring to FIG. 19, first, in step 80, the exhaust gas temperature TAC is calculated using the map shown in FIG. 18. In the following step 81, the occluded $NO_x$ amount $S(NO_x)$ is calculated. In the following step 82, it is judged whether an $NH_3$ desorption flag is set. The $NH_3$ desorption flag is set when the lean and the rich operations are to be performed in the first and the second groups 1a and 1b, respectively, to desorb $NH_3$ from the $NH_3$-AO catalyst 14a, and is reset when the rich and the lean operations are to be performed in the first and the second groups 1a and 1b, respectively. If the $NH_3$ desorption flag is reset, the routine goes to step 83.

The steps 83 to 86 are for calculating the inflowing $NH_3$ amount $F(NH_3)$. In step 83, the exhausted $NO_x$ amount $Qa(NO_x)$ is calculated using the map shown in FIG. 13B. In the following step 84, the exhaust gas temperature TTC is calculated using the map shown in FIG. 17. In the following step 85, the $NH_3$ synthesizing efficiency ETA is calculated using the map shown in FIG. 14. In the following step 86, the inflowing $NH_3$ amount $F(NH_3)$ is calculated using the following equation:

$$F(NH_3)=QA(NO_x)\cdot ETA$$

The following steps 87 and 88 are for calculating the inflowing $NO_x$ amount $F(NO_x)$. In step 87, the exhausted $NO_x$ amount $Qb(NO_x)$ is calculated using the map shown in FIG. 6B. In the following step 88, the inflowing $NO_x$ amount $F(NO_x)$ is calculated using the map shown in FIG. 7B. In the following step 89, the equivalent coefficient KC is calculated using the map shown in FIG. 15.

In the following step 90, the adsorbed $NH_3$ amount $S(NH_3)$ is calculated using the following equation:

$$S(NH_3)=S(NH_3)+\{F(NH_3)-KC\cdot F(NO_x)\}\cdot DELTAaa$$

where DELTAaa is a time interval from the last processing cycle until the present processing cycle. In the following step 91, it is judged whether the adsorbed $NH_3$ amount $S(NH_3)$ is larger than the upper threshold amount $UT(NH_3)$. If $S(NH_3) \leq UT(NH_3)$, the processing cycle is ended. Namely, if $S(NH_3) \leq UT(NH_3)$, the $NH_3$ adsorbing capacity of the $NH_3$-AO catalyst 14a is judged to be still large, and thus the first and the second groups 1a and 1b continuously perform the rich and the lean operations.

If $S(NH_3)>UT(NH_3)$ in step 91, the routine goes to step 92, where the $NH_3$ desorption flag is set, and then the processing cycle is ended. Namely, if $S(NH_3)>UT(NH_3)$, the $NH_3$ adsorbing capacity of the $NH_3$-AO catalyst 14a is judged to become small. Thus, the first group 1a stops the rich operation and starts the lean operation, and the second group 1b stops the lean operation and starts the rich operation.

When the $NH_3$ desorption flag is set, the routine goes from step 82 to step 93, where the desorbed $NH_3$ amount $D(NH_3)$ is calculated using the map shown in FIG. 16B. In the following step 94, the adsorbed $NH_3$ amount $S(NH_3)$ is calculated using the following equation:

$$S(NH_3)=S(NH_3)-D(NH_3)\cdot DELTAad$$

where DELTAad is a time interval from the last processing cycle until the present processing cycle. In the following step 95, it is judged whether the adsorbed $NH_3$ amount $S(NH_3)$ is smaller than the lower threshold amount $LT(NH_3)$. If $S(NH_3) \geq LT(NH_3)$, the processing cycle is ended. Namely, if $S(NH_3) \geq LT(NH_3)$, the $NH_3$ adsorbing capacity is judged to be still small, and thus the first and the second groups 1a and 1b continuously performs the lean and the rich operations.

If $S(NH_3)<LT(NH_3)$, the routine goes to step 96, where the $NH_3$ desorption flag is reset and the processing cycle is ended. Namely, if $S(NH_3)<LT(NH_3)$, the $NH_3$ adsorbing capacity is judged to be large. Thus, the first group 1a stops the lean operation and starts the rich operation, and the second group 1b stops the rich operation and starts the lean operation.

FIG. 20 illustrates a portion corresponding to the step 81 shown in FIG. 19.

Referring to FIG. 20, first, in step 100, it is judged whether the $NH_3$ desorption flag, which is set or reset in the routine shown in FIG. 19, is set. If the $NH_3$ desorption flag is reset, that is, if the second group 1b performs the lean operation, the routine goes to step 101, where $Qb(NO_x)$ is calculated using the map shown in FIG. 6B. In the following step 102, the occluded $NO_x$ amount $S(NO_x)$ in the $NO_x$-OR catalyst 11a is calculated using the following equation:

$$S(NO_x)=S(NO_x)+\{Qb(NO_x)-F(NO_x)\}\cdot DELTAna$$

where DELTAna is a time interval from the last processing cycle until the present processing cycle. Then, the processing cycle is ended.

Contrarily, if the $NH_3$ desorption flag is set, that is, if the second group 1b performs the lean rich operation, the routine goes from step 100 to step 103, where the exhaust gas temperature TNC is calculated using the map shown in FIG. 9. In the following step 104, the released $NO_x$ amount $D(NO_x)$ is calculated using the map shown in FIG. 8B. In the following step 105, the occluded $NO_x$ amount $S(NO_x)$ is calculated using the following equation:

$$S(NO_x) = S(NO_x) - D(NO_x) \cdot \text{DELTAnd}$$

where DELTAnd is a time interval from the last processing cycle until the present processing cycle.

Note that, alternatively, both the occluded $NO_x$ amount $S(NO_x)$ in the $NO_x$-OR catalyst 11a and the adsorbed $NH_3$ amount $S(NH_3)$ in the $NH_3$-OR catalyst 14a may be found, and the operation change control of the groups 1a and 1b may be executed when at least one of $S(NO_x)$ and $S(NH_3)$ becomes larger than the corresponding upper threshold, or smaller than the corresponding lower threshold.

The occlusive material 11 in the embodiments described the above comprises the $NO_x$ occluding and releasing function. However, the $NO_x$ releasing function of the occlusive material 11 may be omitted. In this case, the occluding material 11 may be replaced with a new one when the occluded $NO_x$ amount becomes large, to thereby continuously keep the $NO_x$ amount flowing into the $NH_3$-AO catalyst 14a small.

Next, another embodiment of the exhaust gas purifying method in the engine shown in FIG. 1 will be explained.

In the above embodiments, the rich air-fuel ratio (A/F)R and the lean air-fuel ratio (A/F)LL for the first group 1a, and the lean air-fuel ratio (A/F)L and the rich air-fuel ratio (A/F)RR for the second group 1b are set to make the exhaust gas air-fuel ratio of the exhaust gas flowing into the $NH_3$-AO catalyst 14a lean, both when the first and the second groups 1a and 1b respectively perform the rich and the lean operations, and when the first and the second groups 1a and 1b respectively perform the lean and the rich operations. Namely, in the above embodiments, the rich air-fuel ratios (A/F)R and (A/F)RR are both set to about 13.8, and the lean air-fuel ratios (A/F)L and (A/F)LL are both set to about 18.5.

As mentioned above, just after the exhaust gas air-fuel ratio of the exhaust gas flowing into the $NO_x$-OR catalyst 11a changes from lean to rich, $NO_x$ may escape from the catalyst 11a without being purified, due to the lack of the reducing agent. However, if the escaping $NO_x$ amount is large, such a large amount of the escaping $NO_x$ may not be purified sufficiently on the following $NH_3$-AO catalyst 14a. Thus, it is preferable that the escaping $NO_x$ amount is as small as possible.

Therefore, in this embodiment, when the exhaust gas air-fuel ratio of the exhaust gas flowing into the $NO_x$-OR catalyst 11a is to be made rich, the exhaust gas air-fuel ratio is made smaller or richer than that in the above-mentioned embodiments, to decrease the escaping $NO_x$ amount. That is, the rich air-fuel ratio (A/F)RR with which the second group 1b performs the rich operation is set to about 12.5, for example. The smaller or richer rich air-fuel ratio (A/F)RR increases the amount of the reducing agent flowing into the $NH_3$-AO catalyst 14a, to thereby decrease the escaping $NO_x$ amount.

As mentioned above, the inflowing $NO_x$ is converted to $NH_3$ in the $NO_x$-OR catalyst 11a. The $NH_3$ reduces $NO_x$, on the $NO_x$-OR catalyst 11a, and thus it is preferable that the $NH_3$ amount synthesized in the $NO_x$-OR catalyst 11a is made larger, to decrease the escaping $NO_x$ amount. Thus, alternatively, when the second group 1b has to perform the rich operation, some of the cylinders of the second group 1b may perform the rich operation with the rich air-fuel ratio of about 12.5, and the remaining may perform the rich operation with the rich air-fuel ratio of about 13.8. This also results in suppressing the deterioration of the fuel consumption rate.

In the above-mentioned embodiments, the first group 1a performs the lean operation when the second group 1b performs the rich operation. However, if the adsorbed $NH_3$ amount in the $NH_3$-AO catalyst 14a is small when the second group 1b starts the rich operation, the escaping $NO_3$ may not be purified sufficiently on the $NH_3$-AO catalyst 14a. Thus, in this embodiment, the first group 1a performs the rich operation continuously to synthesize $NH_3$ in the TW catalyst 8a, even when the second group 1b performs the rich operation, to thereby supply $NH_3$ to the $NH_3$-AO catalyst 14a continuously. As a result, $NO_x$ is purified sufficiently on the $NH_3$-AO catalyst 14a, regardless whether when the $NO_x$-OR catalyst 11a occludes $NO_x$ therein or when the catalyst 11a releases $NO_x$ therefrom. Note that, in this embodiment, the rich air-fuel ratio (A/F)R for the first group 1a is kept about 13.8, regardless whether the second group 1b performs the lean or the rich operation.

In this way, if the rich air-fuel ratio (A/F)RR for the second group 1b is made smaller or richer and the first group 1a continuously performs the rich operation, the exhaust gas air-fuel ratio of the exhaust gas mixture flowing into the $NH_3$-AO catalyst 14a is made rich, and this prevents good purification of $NO_x$ and $NH_3$. Thus, when the second group 1b has to perform the rich operation, the secondary air is supplied to the $NH_3$-AO catalyst 14a by the secondary air supplying device 18, to thereby keep the exhaust gas air-fuel ratio of the exhaust gas mixture flowing into the $NH_3$-AO catalyst 14a lean. Note that when the second group 1b performs the lean operation, the exhaust gas air-fuel ratio of the exhaust gas mixture flowing into the $NH_3$-AO catalyst 14a is kept lean, even without the secondary air.

In this embodiment, the occluded $NO_x$ amount $S(NO_x)$ in the $NO_x$-OR catalyst 11a is found when the first and the second groups 1a and 1b respectively perform the rich and the lean operations, and when the occluded $NO_x$ amount $S(NO_x)$ is larger than the upper threshold amount $UT(NO_x)$, the operation in the second group 1b is changed to the rich operation, while the operation in the first group 1a is kept as the rich operation. The operation in the second group 1b is returned to the lean operation when a rich period has past since the second group 1b started the rich operation. The rich period is a period required to make the occluded $NO_x$ amount $S(NO_x)$ equal to zero, for example, and is predetermined as a function of the engine operating condition such as the engine load Q/N and the engine speed N. Alternatively, the rich period may be set to a period required to make the occluded $NO_x$ amount $S(NO_x)$ equal to the lower threshold $LT(NO_x)$ mentioned above. Further, alternatively, the rich period may be set as a function of the engine operation and the exhaust gas temperature TNC.

Figure 21:
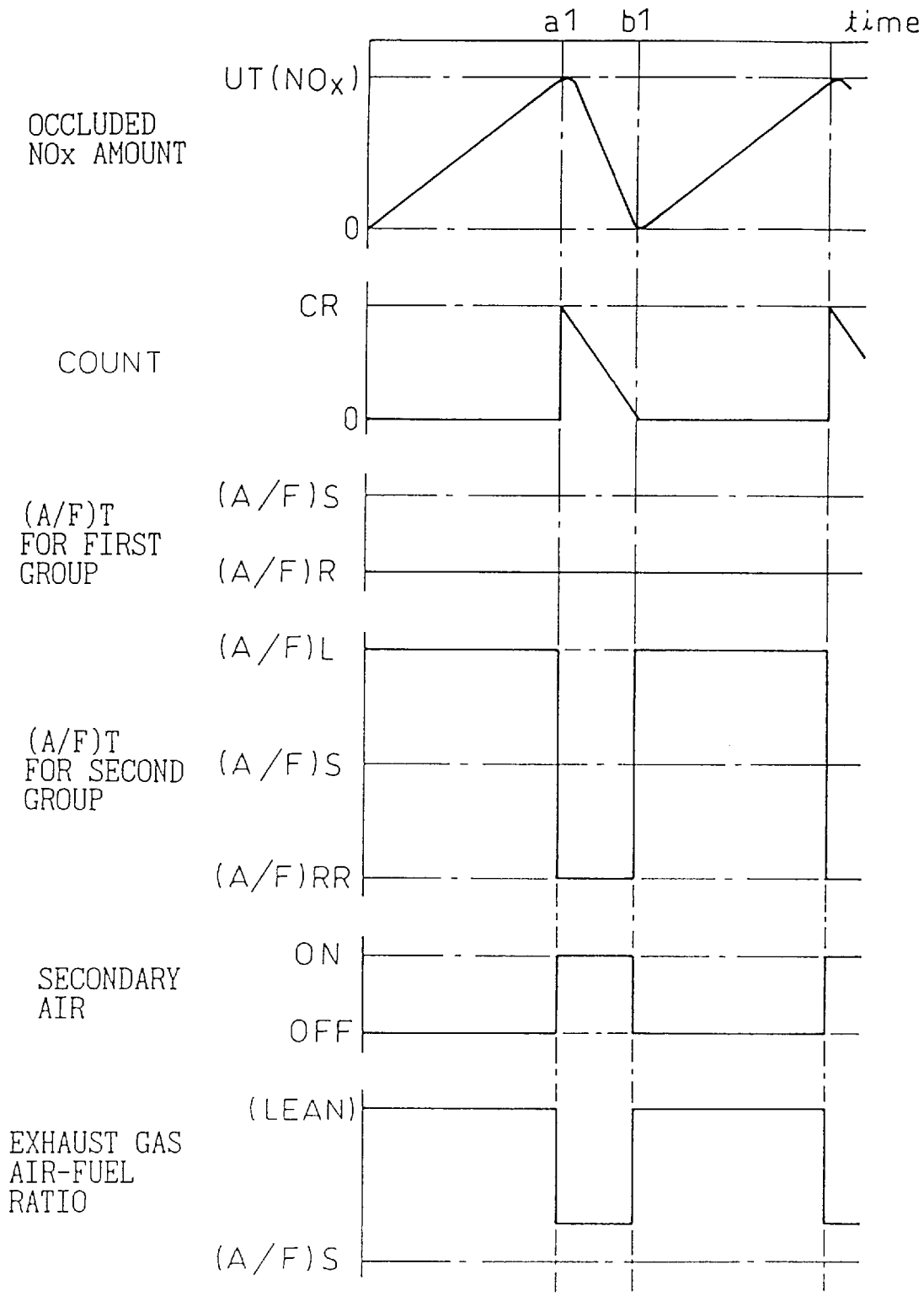
FIG. 21 is a time chart for explaining the exhaust gas purifying method according to further another embodiment.

FIG. 21 shows a time chart illustrating the actual occluded $NO_x$ amount in the $NO_x$-OR catalyst 11a, a counter value COUNT, the target air-fuel ratios (A/F)T for the first and the second groups 1a and 1b, the operation of the secondary air supplying device 18, and the exhaust gas air-fuel ratio of the exhaust gas flowing into the $NH_3$-AO catalyst 14a. In FIG. 21, the time zero represents a time when the second group 1b starts the rich operation. Just after time a, the target air-fuel ratios (A/F)T of the first and the second groups 1a and 1b are the rich and the lean air-fuel ratios (A/F)R and (A/F)L, respectively, and the supply of the secondary air by the device 18 is stopped (OFF).

Figure 22:
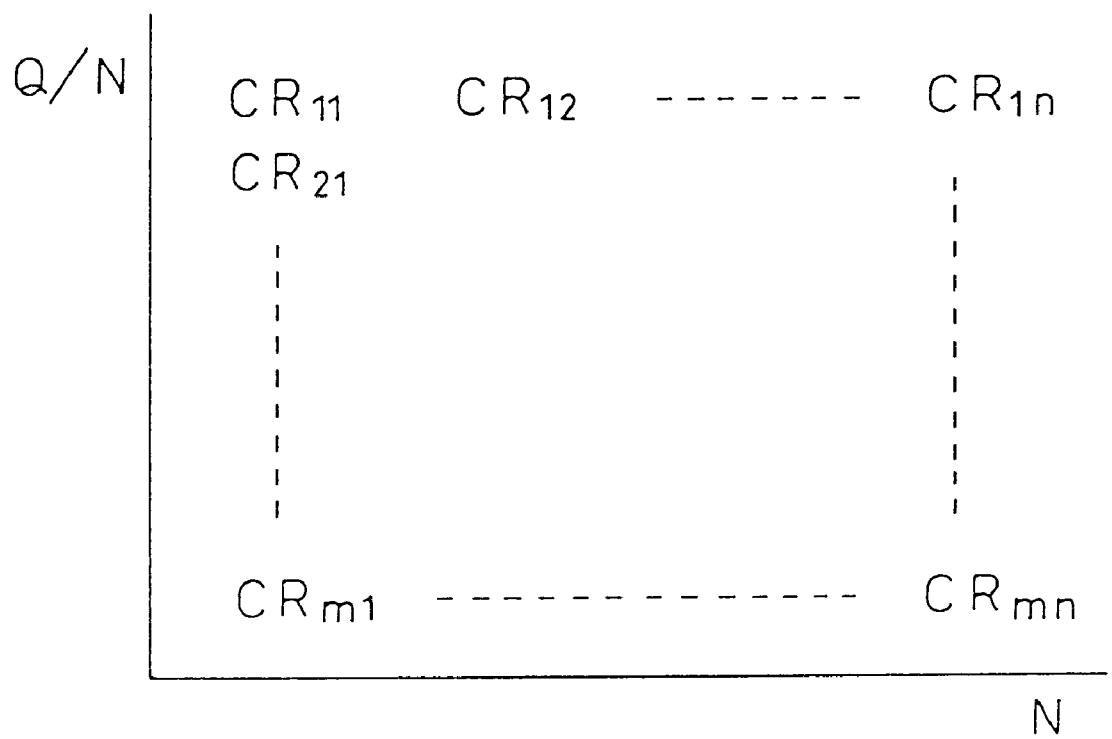
FIG. 22 is a diagram illustrating a rich period value.

At the time a1, the occluded $NO_x$ amount is larger than the upper threshold amount $UT(NO_x)$, and the target air-fuel ratio (A/F)T for the second group $1b$ is set to the rich air-fuel ratio (A/F)RR, while that for the first group $1a$ is kept as the rich air-fuel ratio (A/F)R. At the same time, the secondary air is supplied (ON). As a result, the occluded $NO_x$ is released and the occluded $NO_x$ amount becomes smaller. At this time, the exhaust gas air-fuel ratio of the exhaust gas flowing into the $NH_3$-AO catalyst $14a$ is kept lean, and the exhaust gas is sufficiently purified on the catalyst $14a$. Further, at the time a1, the counter value COUNT is set to a rich period value CR. The counter value COUNT represents a period in which the second group $1b$ performs the rich operation, and the rich period value CR corresponds to the rich period mentioned above. The rich period value CR is obtained in advance by experiment, and is stored in the ROM 22 in the form of a map as shown in FIG. 22, as a function of the engine load Q/N and the engine speed N.

The counter value COUNT is decremented from the rich period value CR by 1. When the counter value COUNT becomes zero at the time b1, the actual occluded $NO_x$ amount becomes substantially zero. At this time, the target air-fuel ratio (A/F)T for the second group $1b$ is set again to the lean air-fuel ratio (A/F)L. Further, the supply of the secondary air is stopped at this time.

As shown in FIG. 21, the exhaust gas air-fuel ratio of the exhaust gas flowing into the $NH_3$-AO catalyst $14a$ when the second group $1b$ performs the rich operation is smaller or closer to the stoichiometric than that when the second group $1b$ performs the lean operation. To ensure good purification of the exhaust gas on the $NH_3$-AO catalyst $14a$, the exhaust gas air-fuel ratio of the inflowing exhaust gas is merely made lean, and the exhaust gas air-fuel ratio is unnecessarily kept constant. Rather, if the exhaust gas air-fuel ratio is kept constant, a considerably large amount of the secondary air is required. Such a large amount of the secondary air drops the temperature of the $NH_3$-AO catalyst $14a$, and thereby good purification may be hindered. Thus, in this embodiment, the secondary air amount is made the minimum amount required to keep the exhaust gas air-fuel ratio of the exhaust gas flowing into the $NH_3$-AO catalyst $14a$ lean. Note that the minimum amount is found in advance by experiment, and is stored in the ROM 22.

Figure 23:
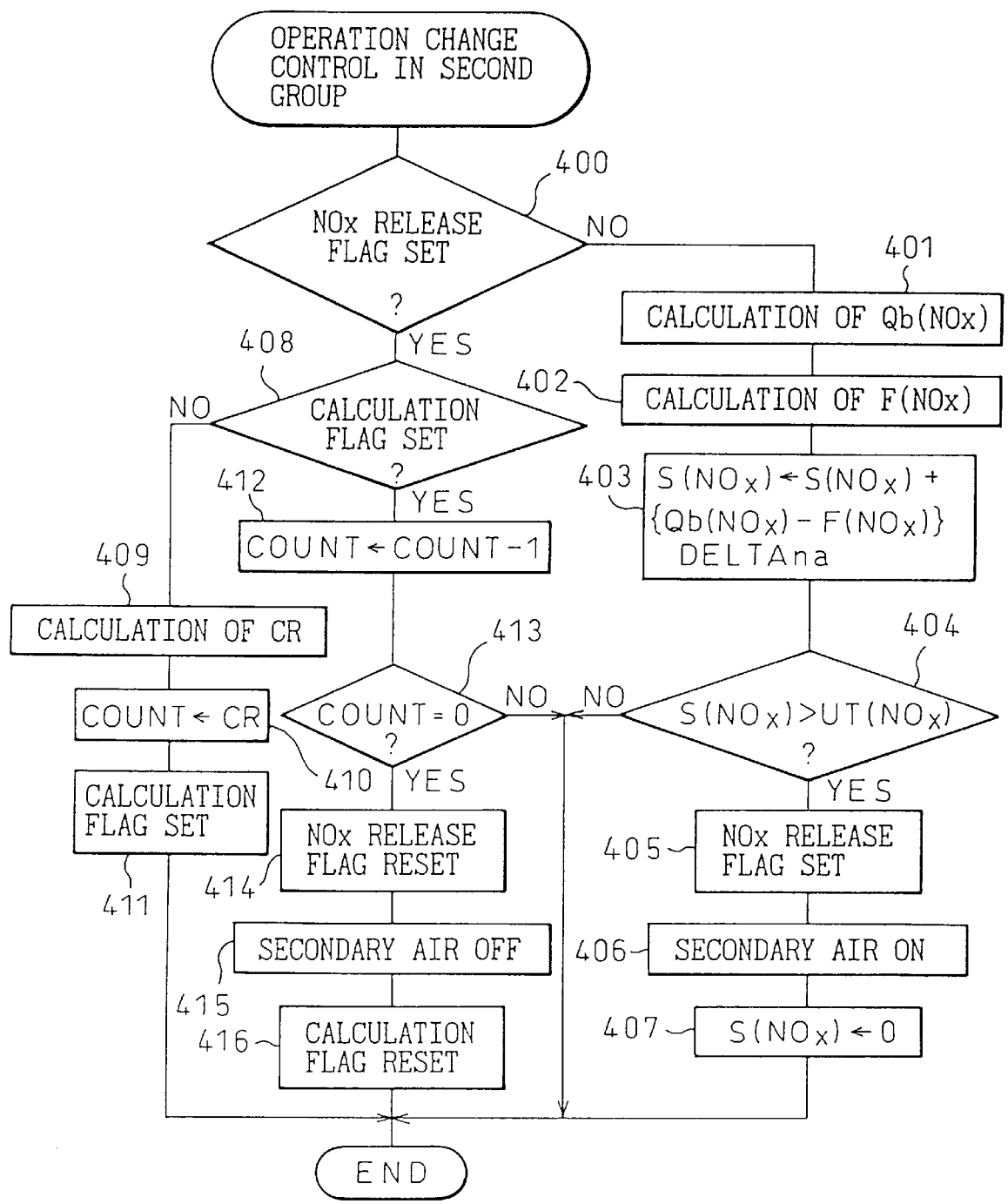
FIG. 23 is a flow chart for executing an operation change control in the second cylinder group according to the embodiment explained with FIG. 21.

FIG. 23 illustrates a routine for executing the operation change control in the second group $1b$, according to the embodiment. The routine is executed by interruption every predetermined time.

Referring to FIG. 23, first, in step 400, it is judged whether a $NO_x$ release flag is set. The $NO_x$ release flag is set when the rich operation is to be performed in the second group $1b$ to release $NO_x$ from the $NO_x$-OR catalyst $11a$, and is reset when the lean operation is to be performed in the second group $1b$. If the $NO_x$ release flag is reset, the routine goes to step 401, where $Qb(NO_x)$ is calculated using the map shown in FIG. 6B. In the following step 402, $F(NO_x)$ is calculated using the map shown in FIG. 7B. In the following step 403, the occluded $NO_x$ amount $S(NO_x)$ in the $NO_x$-OR catalyst $11a$ is calculated using the following equation:

$$S(NO_x)=S(NO_x)+\{Qb(NO_x)-F(NO_x)\}\cdot DELTAna$$

where DELTAna is a time interval from the last processing cycle until the present processing cycle. In the following step 404, it is judged whether the occluded $NO_x$ amount $S(NO_x)$ is larger than the upper threshold amount $UT(NO_x)$. If $S(NO_x) \leq UT(NO_x)$, the processing cycle is ended. Namely, if $S(NO) \leq UT(NO_x)$, the $NO_x$ occluding capacity of the $NO_x$-OR catalyst $11a$ is judged to be still large, and thus the second group $1b$ continuously performs the lean operation.

If $S(NO_x) > UT(NO_x)$ in step 404, the routine goes to step 405, where the $NO_x$ release flag is set, and then the processing cycle is ended. Namely, if $S(NO_x) > UT(NO_x)$, the $NO_x$ occluding capacity is judged to become small. Thus, the second group $1b$ stops the lean operation and starts the rich operation. In the following step 406, the supply of the secondary air starts. In the following step 407, the occluded NO:, amount $S(NO_x)$ is reset. Then, the processing cycle is ended.

Contrarily, if the $NO_x$ release flag is set, the routine goes from step 400 to step 408, where a calculation flag is set. The calculation flag is set when the rich period value CR is calculated, and is reset when the counter value COUNT is made zero. When it is first time for the routine to go to step 408 after the $NO_x$ release flag is set, the calculation flag is reset, and thus the routine goes to step 409, where the rich period value CR is calculated using the map shown in FIG. 22. In the following step 410, the rich period value CR is memorized as COUNT. In the following step 411, the calculation flag is set. Then, the processing cycle is ended.

When the calculation flag is set, the routine goes from step 408 to step 412, where the counter value COUNT is decremented by 1. In the following step 413, it is judged whether the counter value COUNT is zero. If COUNT is larger than zero, the processing cycle is ended. Namely, if COUNT>0, the $NO_x$ occluding capacity of the $NO_x$-OR catalyst $11a$ is judged to be still small, and thus the rich operation of the second group $1b$ and the supply of the secondary air are continued.

If COUNT=0 in step 413, the routine goes to step 414, where the $NO_x$ release flag is reset. Namely, if COUNT=0, the $NO_x$ occluding capacity of the $NO_x$-OR catalyst $11a$ is judged to become sufficiently large, and thus the second group $1b$ stops the rich operation and starts the lean operation. In the following step 415, the supply of the secondary air is stopped. In the following step 416, the calculation flag is reset, and then the processing cycle is ended.

Next, further another embodiment of the exhaust gas purifying method of the engine shown in FIG. 1 will be explained.

In the embodiments mentioned above, the occlusive material 11 is arranged in the exhaust passage between the second group $1b$ and the exhaust gas purifying catalyst 14, to thereby prevent the $NO_x$ amount flowing into the exhaust gas purifying catalyst 14 from exceeding a $NO_x$ amount which can be reduced by the inflowing $NH_3$. On the other hand, the $NO_x$ amount flowing into the exhaust gas purifying catalyst 14 becomes smaller as the $NO_x$ amount exhausted from the second group $1b$. Thus, in this embodiment, the $NO_x$ amount exhausted from the second group $1b$ is decreased to thereby prevent the $NO_x$ amount flowing into the exhaust gas purifying catalyst 14 from exceeding a $NO_x$ amount which can be reduced by the inflowing $NH_3$.

As mentioned above, the $NO_x$ amount exhausted from the second group $1b$ varies in accordance with the engine air-fuel ratio. Thus, in this embodiment, the lean air-fuel ratio (A/F)L with which the second group $1b$ performs the lean operation is controlled, to thereby prevent the $NO_x$ amount flowing into the exhaust gas purifying catalyst 14 from exceeding a $NO_x$ amount which can be reduced by the inflowing $NH_3$.

FIG. 24 illustrates the experimental results showing the $NO_x$ amount exhausted from the second group $1b$ per unit time, at the respective engine air-fuel ratio, and under a constant engine operating condition. In the example shown in FIG. 24, the exhausted $NO_x$ amount becomes maximum at the engine air-fuel ratio being about 17.5, and becomes smaller as the engine air-fuel ratio becomes richer or leaner with respect to 17.5. Further, as can be seen from FIG. 24, the exhausted $NO_x$ amount at the engine air-fuel ratio being 18.5 is substantially identical to that at the engine air-fuel ratio being (A/F)N. Thus, when the engine air-fuel ratio is made 18.5, if the engine air-fuel ratio is made larger than 18.5, or is set to a lean air-fuel ratio which is smaller than (A/F)N or to stoichiometric, the $NO_x$ amount exhausted from the second group 1b can be decreased. Note that (A/F)N is about 16.5 in the example shown in FIG. 24.

Therefore, in this embodiment, if the $NO_x$ amount flowing into the exhaust gas purifying catalyst 14 exceeds a $NO_x$ amount which can be reduced by the inflowing $NH_3$ when the second group 1b performs the lean operation with the lean air-fuel ratio (A/F)L being 18.5, the lean air-fuel ratio (A/F)L is made larger or leaner than 18.5, such as 25.0, to thereby prevent the $NO_x$ amount flowing into the exhaust gas purifying catalyst 14 from exceeding a $NO_x$ amount which can be reduced by the inflowing $NH_3$. Alternatively, the lean air-fuel ratio (A/F)L may be changed to an air-fuel ratio which is larger or leaner than the stoichiometric air-fuel ratio (A/F)S and is smaller or richer than (A/F)N, or to the stoichiometric air-fuel ratio (A/F)S, to thereby ensure a large output torque from the engine.

The detailed explanation of the embodiment will be made with reference to FIG. 25. The routine shown in FIG. 25 is executed by interruption every predetermined time.

Figure 25:
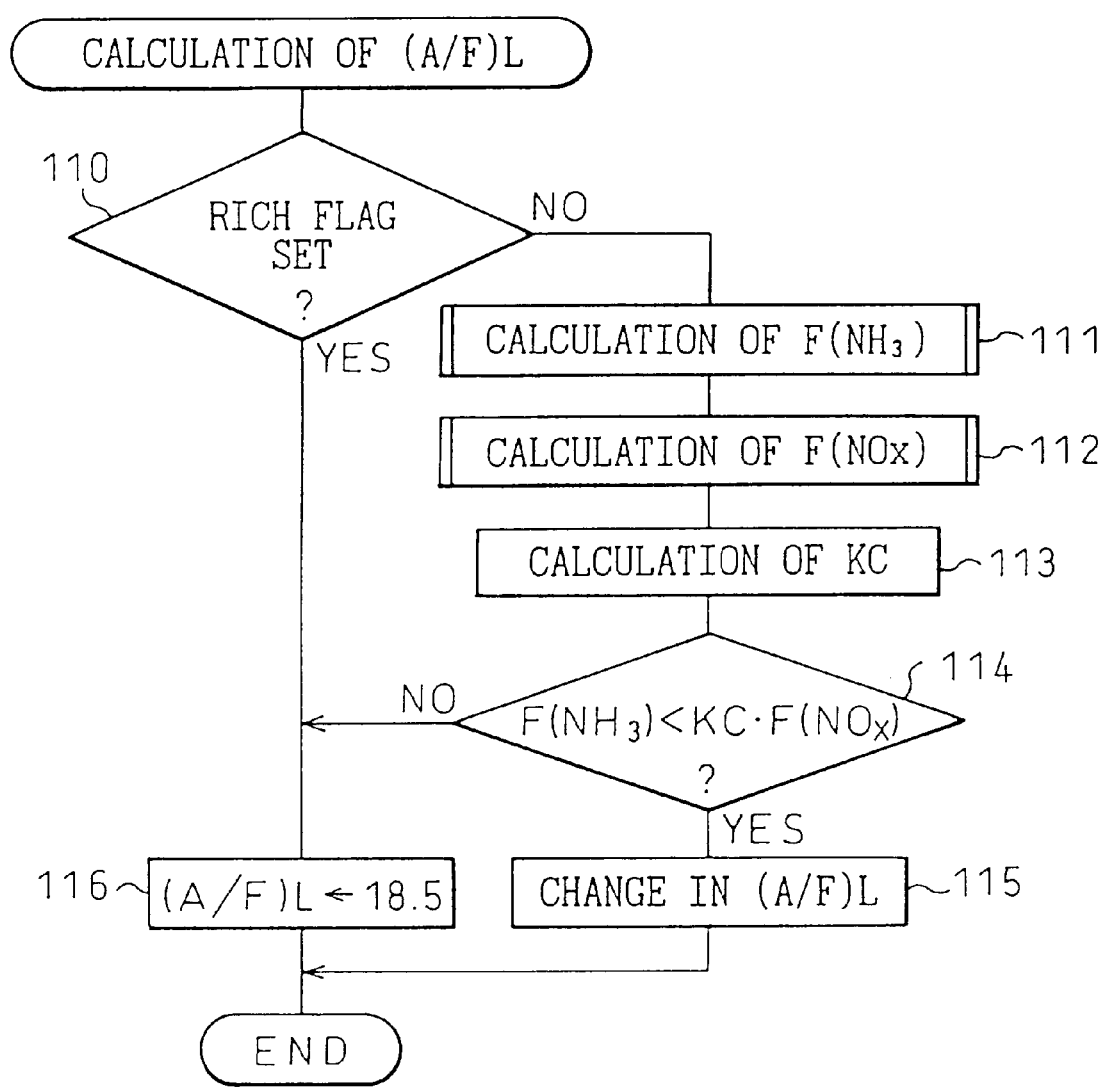
FIG. 25 is a flow chart for calculating a lean air-fuel ratio.

Referring to FIG. 25, first, in step 110, it is judged whether a rich flag is set. The rich flag is set when the second group 1b has to perform the rich operation and is reset when the second group 1b has to perform the lean operation. As the rich flag, the $NO_x$ release flag in the routine shown in FIG. 10, or the $NH_3$ desorption flag in the routine shown in FIG. 19 can be used. If the rich flag is set, that is, if the second group 1b has to perform the rich operation, the routine jumps to step 116.

If the rich flag is reset, that is, if the second group 1b has to perform the lean operation, the routine goes to step 111, where the inflowing $NH_3$ amount $F(NH_3)$ into the $NH_3$-AO catalyst 14a is calculated. In this step 111, the steps 83 to 86 in the routine shown in FIG. 19 are performed, for example. In the following step 112, the inflowing $NO_x$ amount $F(NO_x)$ into the $NH_3$-AO catalyst 14a is calculated. In this step 112, the steps 87 and 88 in the routine shown in FIG. 19 are performed, for example. In the following step 113, the equivalent coefficient KC is calculated. In this step 113, the steps 80 and 89 in the routine shown in FIG. 19 are performed, for example.

In the following step 114, it is judged whether $F(NH_3)$ is larger than $F(NO_x) \cdot KC$. If $F(NH_3) < F(NO_x) \cdot KC$, that is, if the inflowing $NO_x$ amount is larger than a $NO_x$ amount which can be reduced by the inflowing $NH_3$, the routine goes to step 115, where the lean air-fuel ratio (A/F)L for the second group 1b is changed to 25.0. Contrarily, if $F(NH_3) \geq F(NO_x) \cdot KC$, that is, if the inflowing $NO_x$ amount is equal to or smaller than a $NO_x$ amount which can be reduced by the inflowing $NH_3$, the routine goes from step 114 to step 116, where the lean air-fuel ratio (A/F)L for the second group 1b is kept 18.5. Then, the processing cycle is ended.

In step 115, the lean air-fuel ratio (A/F)L is made equal to 25.0, which is larger than 18.5. Alternatively, (A/F)N, which may vary in accordance with the engine operating condition, is found in advance, and the lean air-fuel ratio (A/F)L may be changed to an air-fuel ratio which is larger than (A/F)S and is smaller than (A/F)N, or to the stoichiometric air-fuel ratio (A/F)S.

If the $NO_x$ amount flowing into the $NH_3$-AO catalyst 14a is decreased by decreasing the $NO_x$ amount exhausted from the second group 1b, as mentioned above, a period during which the second group 1b has to perform the lean operation can be extended, and thus the fuel consumption rate is further lowered. Further, the frequency of the operation change in the second group 1b is decreased, and thus the fluctuation in the output torque of the engine 1 is diminished, to thereby enhance the drivability. Further, the volume of the occlusive material 11 can be decreased, or the occlusive material 11 can be omitted. When the occlusive material 11, such as the $NO_x$-OR catalyst 11a is omitted, there is no need for the second group 1b to perform the rich operation, and thus the fuel consumption rate is further lowered.

Next, another embodiment for decreasing the $NO_x$ amount exhausted from the second group 1b will be explained.

To decrease the $NO_x$ amount exhausted from the second group 1b, in this embodiment, the operation of at least one of the cylinders of the second group 1b is stopped temporarily. Namely, the number of the operating cylinder in the second group 1b is decreased to thereby decrease the $NO_x$ amount flowing into the $NH_3$-AO catalyst 14a.

Figure 26:
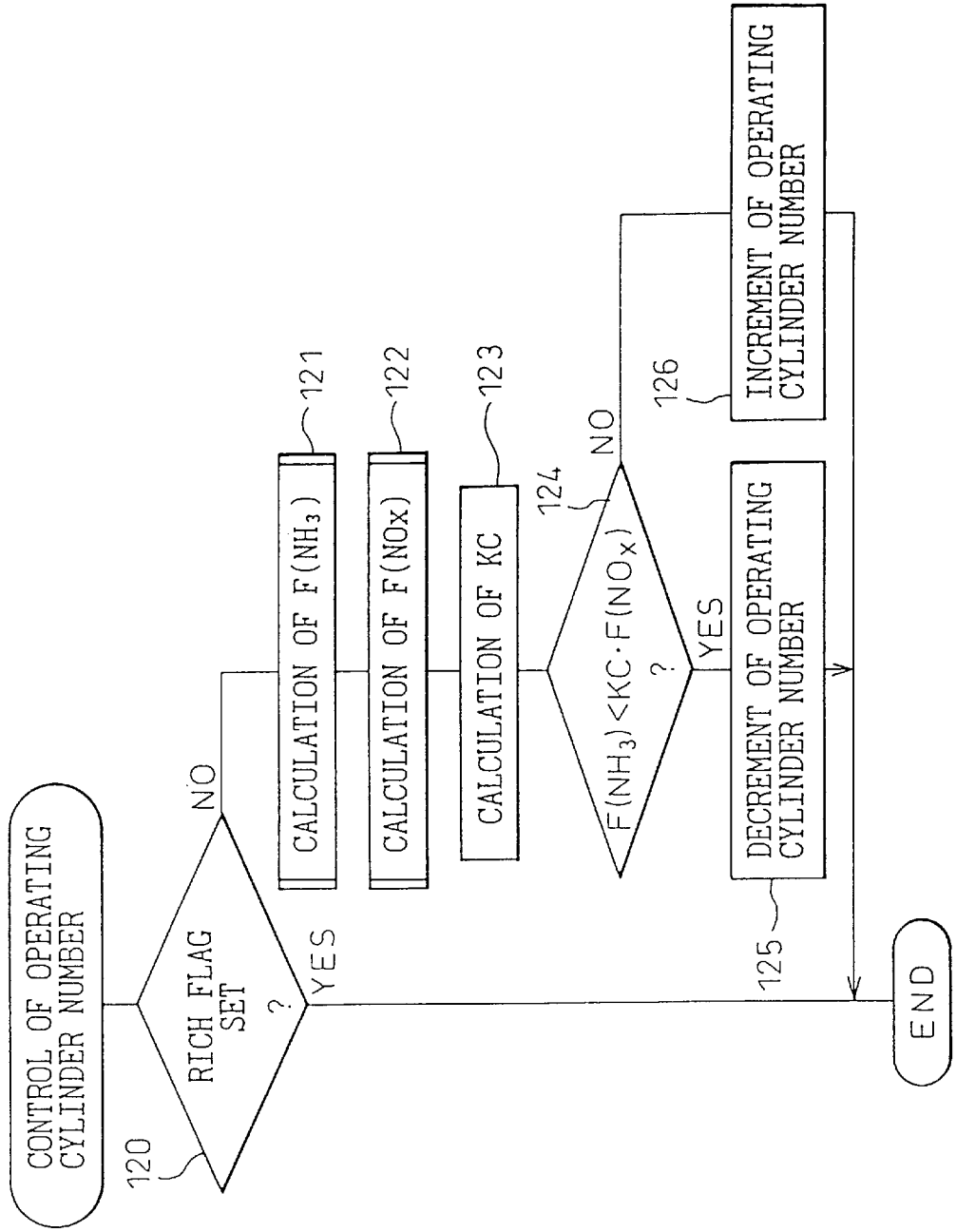
FIG. 26 is a flow chart for controlling the operating cylinder number.

The detailed explanation for the embodiment will be made with reference to FIG. 26. The routine shown in FIG. 26 is executed by interruption every predetermined time. Also, in FIG. 26, steps 120 to 124 correspond to the steps 110 to 114, respectively, and the explanation therefor is omitted.

Referring to FIG. 26, if $F(NH_3) < KC \cdot F(NO_x)$ in step 124, that is, if the inflowing $NO_x$ amount is larger than a $NO_x$ amount which can be reduced by the inflowing $NH_3$, the routine goes to step 125, where the number of the cylinder to be operating in the cylinders of the second group 1b is decremented by, for example, 1. Namely, the number of the cylinder to be stopped is incremented by 1. Then, the processing cycle is ended. If $F(NH_3) \geq KC \cdot F(NO_x)$ in step 124, that is, if the inflowing $NO_x$ amount is smaller than a $NO_x$ amount which can be reduced by the inflowing $NH_3$, the routine goes to step 126, where the number of the cylinder to be operating in the cylinders of the second group 1b is incremented by, for example, 1. Namely, the number of the cylinder to be stopped is decremented by 1. Then, the processing cycle is ended.

In this embodiment, it is preferable that the intake or exhaust valves of the cylinder to be stopped are kept closed during the stoppage thereof, to prevent the intake air from flowing into the exhaust manifold 10. If air which does not contribute to the combustion flows into the exhaust manifold 10, the exhaust gas air-fuel ratio of the exhaust gas flowing into the $NH_3$-AO catalyst 14a will deviate from the engine air-fuel ratio of the second group 1b. Additionally, it is preferable that the cylinder to be stopped is not fixed but is changed cyclicly.

In the embodiments explained with reference to FIGS. 25 and 26, the $NH_3$ amount $F(NH_3)$ flowing into the $NH_3$-AO catalyst 14a is obtained, and then the lean air-fuel ratio (A/F)L or the operating cylinder number of the second group 1b is controlled in accordance with $F(NH_3)$. Alternatively, the lean air-fuel ratio or the operating cylinder number suitable for the respective $F(NH_3)$ may be obtained in advance by experiment, and the lean air-fuel ratio or the operating cylinder number may be made equal to the suitable ratio or number.

Figure 27:
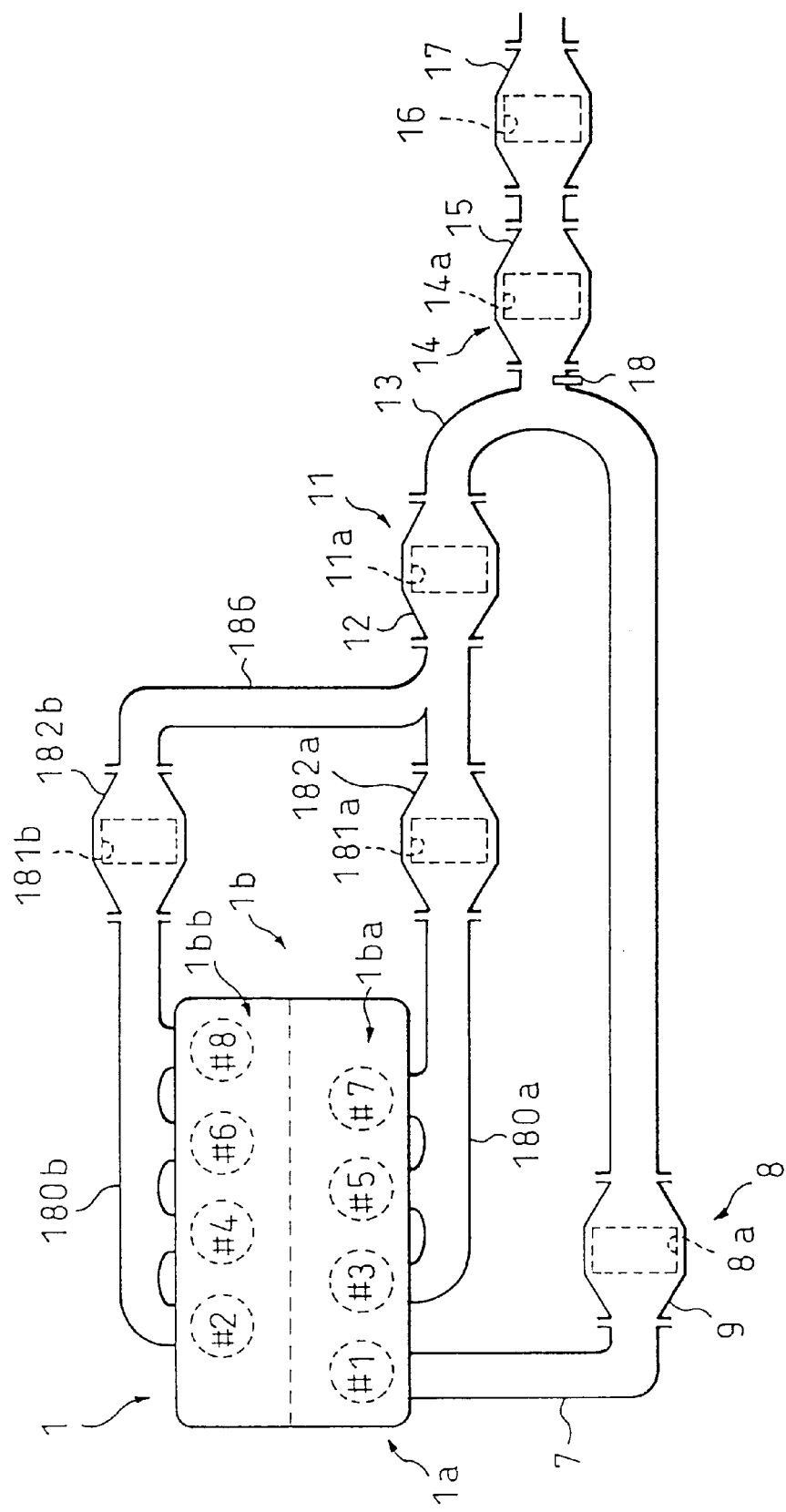
FIG. 27 is a general view of an engine, illustrating an exhaust gas purifying device according to further another embodiment.

FIG. 27 shows another embodiment for the exhaust gas purifying device according to the present invention. In FIG. 27, constituent elements the same as those in the above mentioned embodiments are given the same reference numerals. The engine is provided with an intake passage, fuel injectors, air-fuel ratio sensors, and an electronic control unit same as shown in FIG. 1, but they are not depicted in FIG. 27.

Referring to FIG. 27, the engine 1 has eight cylinders. The first, the third, the fifth, and the seventh cylinders #1, #3, #5, and #7 are aligned in one side of the crank shaft (not shown), and the second, the fourth, the sixth, and the eighth cylinders #2, #4, #6, and #8 are aligned in the other side of the crank shaft. The first cylinder #1, which constitutes the first cylinder group 1a, is connected, via the exhaust duct 7, to the catalytic converter housing the TW catalyst 8a therein. In the second to the eighth cylinders #2 to #8, which constitute the second cylinder group 1b, the third, the fifth, and the seventh cylinders #3, #5, and #7, which constitute a first cylinder subgroup 1ba, are connected, via an exhaust manifold 180a, to a catalytic converter 182a housing a TW catalyst 181a therein. Also, the second, the fourth, the sixth, and the eighth cylinders #2, #4, #6, and #8, which constitute a second cylinder subgroup 1bb, are connected to, via an exhaust manifold 180b, a catalytic converter 182b housing a TW catalyst 181b therein. The converters 182a and 182b are connected, via an interconnecting duct 186, to the catalytic converter 12 housing the $NO_x$-OR catalyst 11a therein. Namely, in this embodiment, the TW catalysts are arranged between the second group 1b and the $NO_x$-OR catalyst 11a. Note that, alternatively, the first and the second subgroups 1ba and 1bb may be constituted by at least one cylinder, respectively.

In this engine again, the first group 1a performs the rich operation continuously, and the second group 1b basically performs the lean operation and temporarily performs the rich operation. When the second group 1b performs the lean operation and the exhaust gas air-fuel ratio of the exhaust gas flowing into the TW catalysts 181a and 181b are made lean, the majority of the inflowing NO is oxidized to $NO_2$ on the TW catalysts 181a and 181b. Thus, most of the $NO_x$ flowing into the $NO_x$-OR catalyst 11a is in the form of $NO_2$.

As mentioned above, when the $NO_x$ is occluded in the $NO_x$-OR catalyst 11a, first, $NO_2$ is converted to $NO_3^-$ and then occluded. Thus, the inflowing NO is first oxidized to $NO_2$ on the $NO_x$-OR catalyst 11a, and then is occluded. In this embodiment, the majority of the inflowing $NO_x$ is in the form of $NO_2$, as mentioned above. Thus, the oxidation of NO is unnecessary, and thereby the inflowing $NO_x$ is quickly occluded in the $NO_x$-OR catalyst 11a. As a result, the volume of the $NO_x$-OR catalyst 11a can be decreased with respect to the embodiment shown in, for example, FIG. 1. Further, good purification of the exhaust gas is maintained, even though the NO oxidation ability of the catalyst 11a becomes lower.

On the other hand, when the second group 1b performs the rich operation and the exhaust gas air-fuel ratio flowing into the TW catalysts 181a and 181b is made rich, $NH_3$ is synthesized from a part of the inflowing $NO_x$ in the TW catalysts 181a and 181b. The $NH_3$ then flows into the $NO_x$-OR catalyst 11a.

As mentioned above, the occluded $NO_x$ is released from the $NO_x$-OR catalyst 11a when the exhaust gas air-fuel ratio of the inflowing exhaust gas is made rich. A part of the released $NO_x$ is reduced by the inflowing HC and CO. However, the inflowing exhaust gas includes $NH_3$, of which the reducing ability is high, and thus the released $NO_x$ can be immediately reduced by $NH_3$. This makes a period in which the second group 1b has to perform the rich operation shorter than the embodiment shown in FIG. 1, and thus the fuel consumption rate is further lowered. Additionally, the volume of the exhaust gas purifying catalyst 14 is decreased.

Next, the exhaust gas purifying method in the warming-up operation in the engine shown in FIG. 27 will be explained with reference to FIG. 28. The routine shown in FIG. 28 is executed by interruption every predetermined time.

Figure 28:
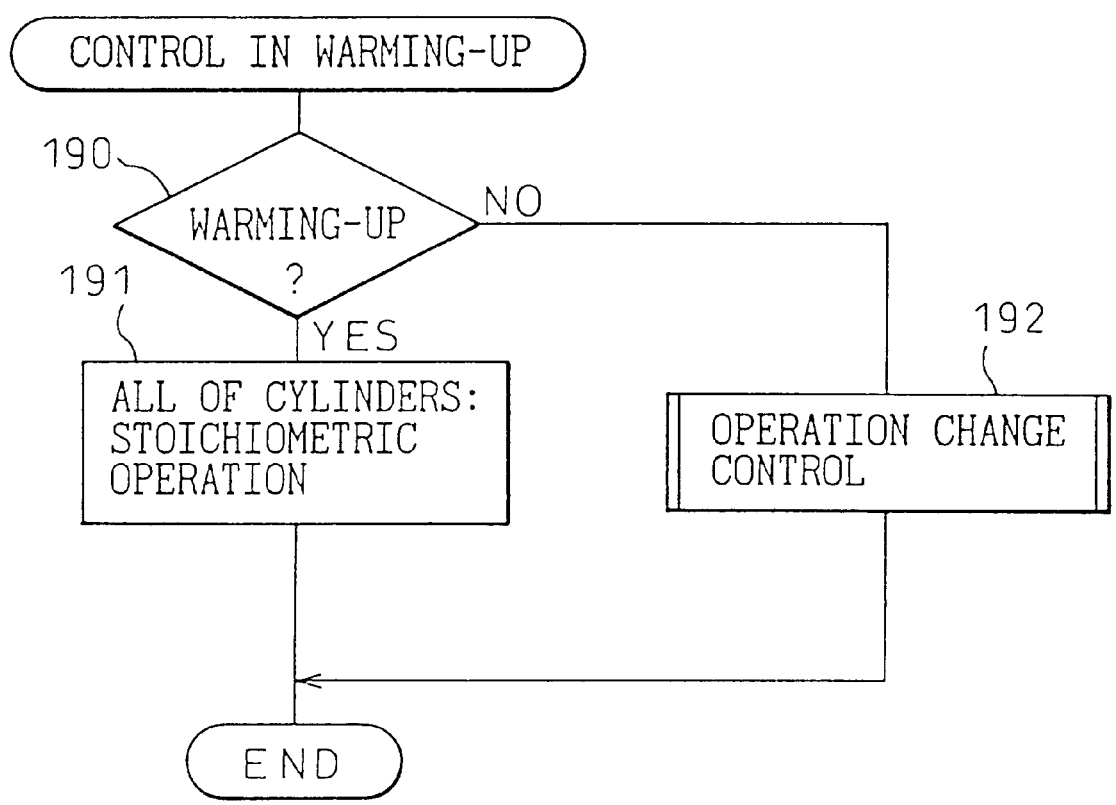
FIG. 28 is a flow chart for control in a warming-up operation in the embodiment shown in FIG. 27.

Referring to FIG. 28, first, in step 190, it is judged whether the warming-up operation is in process. The judgement is executed in accordance with the temperature of the cooling water, the engine oil, the $NO_x$-OR catalyst 11a, the $NH_3$-AO catalyst 14a, the exhaust gas flowing into the catalysts, or the intake air. If it is judged that the warming-up operation is in process, the routine goes to step 191, where the target air-fuel ratio for all the cylinders is made equal to the stoichiometric air-fuel ratio (A/F)S. That is, all cylinders perform the stoichiometric operation.

In the warming-up operation, the temperature of the catalysts may be lower than the activating temperature thereof, and thus there may be a case where the exhaust gas is not purified sufficiently even if the first and the second groups 1a and 1b respectively perform the rich and the lean operations.

The TW catalysts 8a, 181a, and 181b are arranged next to the corresponding cylinder(s), and thus the temperature of these catalysts are able to rise up to the activating temperature thereof, quickly. Further, a TW catalyst purifies $NO_x$, HC, and CO in the inflowing exhaust gas simultaneously and sufficiently, if the exhaust gas air-fuel ratio of the inflowing exhaust gas is made stoichiometric, as shown in FIG. 2. Therefore, in this embodiment, all of the cylinders perform the stoichiometric operation to make the exhaust gas air-fuel ratio of the exhaust gas flowing into the TW catalysts 8a, 181a, and 181b stoichiometric, to thereby ensure good purification of the exhaust gas, in the warming-up operation.

Further, when all of the cylinders perform the stoichiometric operation to purify the exhaust gas on the Tw catalysts 8a, 181a, and 181b, the temperatures of the $NO_x$-OR catalyst 11a and the $NH_3$-AO catalyst 14a, which are arranged downstream of the TW catalysts, quickly rise up to the activating temperature thereof.

In step 190, if the warming-up operation is not in process, that is, if the warming-up operation is finished, the routine goes to step 192, where the operation change control mentioned above, such as the routine shown in FIG. 10 or 19, is executed.

Generally, a TW catalyst has good thermal durability. Thus, a temperature of a catalyst located downstream of the TW catalyst is prevented from rising excessively. Namely, in the embodiment shown in FIG. 27, the temperatures of the $NO_x$-OR catalyst 11a, the $NH_3$-AO catalyst 14a, and the $NH_3$ purifying catalyst 16 are prevented from rising excessively. This enhances the durabilities of the catalysts. The other constructions of the exhaust purifying device and the operation thereof are the same as those in the embodiment explained with reference to in FIGS. 1 to 11, and thus the explanations therefor are omitted.

Figure 29:
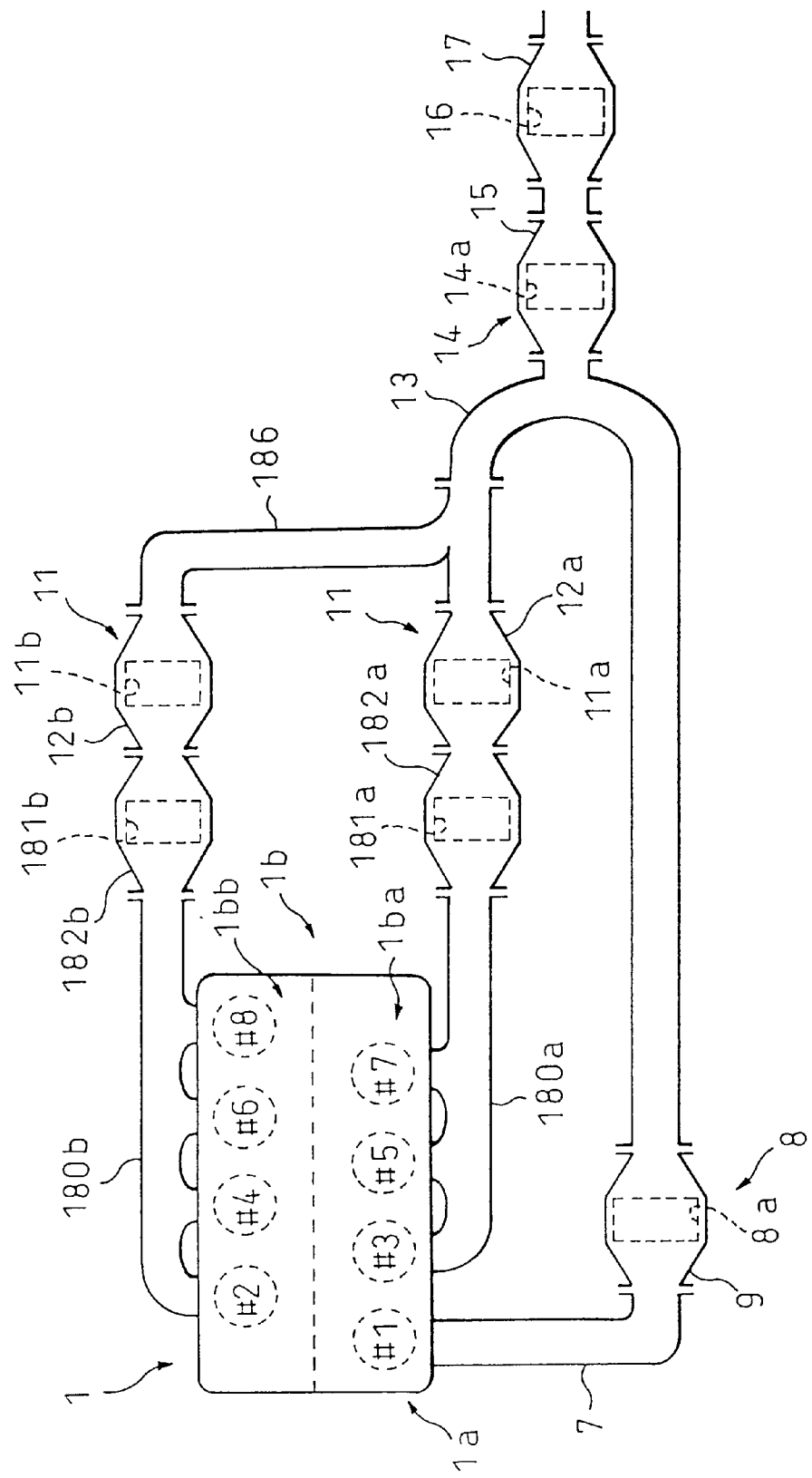
FIG. 29 is a general view of an engine, illustrating an exhaust gas purifying device according to further another embodiment.

FIG. 29 shows further another embodiment for the exhaust gas purifying device according to the present invention. In FIG. 29, constituent elements the same as those in the above mentioned embodiments are given the same reference numerals. The engine is provided with an intake passage, fuel injectors, air-fuel ratio sensors, and an electronic control unit same as shown in FIG. 1, but they are not depicted in FIG. 29.

Referring to FIG. 29, the occlusive material 11 comprises a pair of the $NO_x$-OR catalysts 11a and 11b. Inlets of catalytic converters 12a and 12b housing the corresponding $NO_x$-OR catalysts 11a and 11b therein are connected to the catalytic converters 182a and 182b housing the Tw catalysts 181a and 181b therein, respectively. Outlets of the catalytic converters 12a and 12b are connected, via the interconnecting duct 186, to the catalytic converter 15 housing the $NH_3$-AO catalyst 14a therein. Therefore, the exhaust gas of the first subgroup 1ba of the second group 1b flows via the TW catalyst 181a and the $NO_x$-OR catalyst 11a, and that of the second subgroup 1bb of the second group 1b flows via the TW catalyst 181b and the $NO_x$-OR catalyst 11b, into the $NH_3$-AO catalyst 14a.

The first group 1a continuously performs the rich operation, with the rich air-fuel ratio (A/F)R being about 13.8.

The first subgroup 1ba of second group 1b basically performs the lean operation with the lean air-fuel ratio (A/F)L being about 18.5. When the $NO_x$ amount $Sa(NO_x)$ occluded in the $NO_x$-OR catalyst 11a is larger than a predetermined, upper threshold amount $UTa(NO_x)$, the first subgroup 1ba performs the rich operation with the rich air-fuel ratio (A/F)RR being about 13.8, to release the occluded $NO_x$ from the $NO_x$-OR catalyst 11a. When a predetermined period has past since the first subgroup 1ba starts the rich operation, the first subgroup 1ba resumes the lean operation.

Also, the second subgroup 1bb basically performs the lean operation with the lean air-fuel ratio (A/F)L being about 18.5. When the $NO_x$ amount $Sb(NO_x)$ occluded in the $NO_x$-OR catalyst 11b is larger than a predetermined, upper threshold amount $UTb(NO_x)$, the second subgroup 1bb performs the rich operation with the rich air-fuel ratio (A/F)RR being about 13.8, to release the occluded $NO_x$ from the $NO_x$-OR catalyst 11b. When a predetermined period has past since the second subgroup 1bb starts the rich operation, the second subgroup 1bb resumes the lean operation. This is a basic method for controlling the operation change in the engine shown in FIG. 29.

As mentioned above, when the secondary air is supplied to the exhaust passage, the catalyst temperature may drop to thereby deteriorate the purification of the exhaust gas. Further, if the secondary air supplying device 18 is unnecessary, the structure of the exhaust gas purifying device is simplified. However, if the first and the second subgroups 1ba and 1bb perform the rich operation simultaneously without the secondary air supplying device 18, the exhaust gas air-fuel ratio of the exhaust gas mixture flowing into the $NH_3$-AO catalyst 14a is made rich, which is not desirable. Therefore, in this embodiment, when one of subgroups is performing the rich operation, the other is prohibited from performing the rich operation, and continuously performs the lean operation. In other words, the overlap of the rich operations of the first and the second subgroups 1ba and 1bb is prevented. As long as one of the subgroups 1ba and 1bb performs the lean operation, the exhaust gas air-fuel ratio of the exhaust gas mixture flowing into the $NH_3$-AO catalyst 14a is kept lean, even if the other performs the rich operation. Accordingly, good purification of the exhaust gas on the $NH_3$-AO catalyst 14a is ensured.

Figure 30:
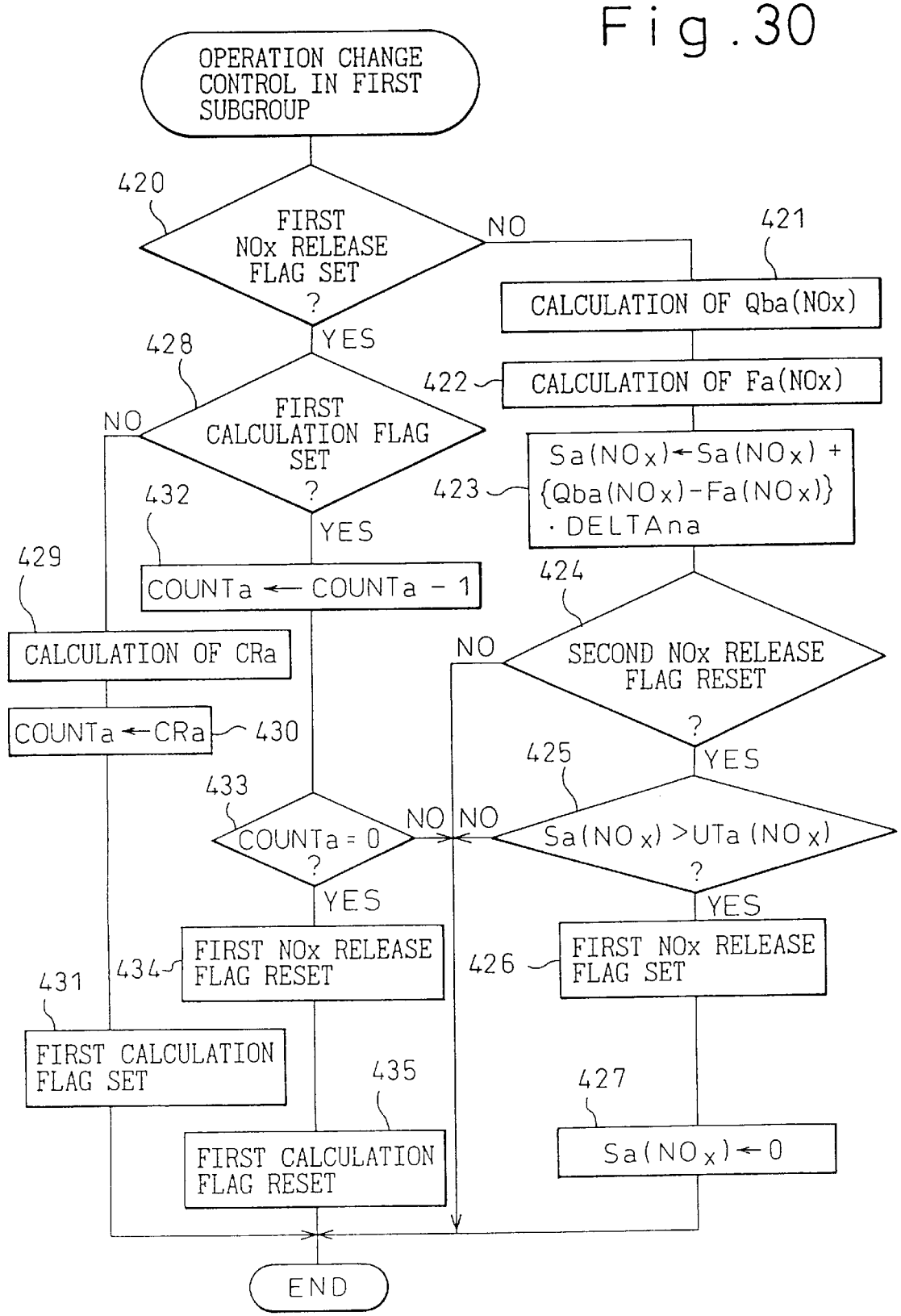
FIG. 30 is a flow chart for executing an operation change control in the first cylinder subgroup according to the embodiment explained with FIG. 29.

FIG. 30 illustrates a routine for executing the operation change control in the first subgroup 1ba, according to the embodiment. The routine is executed by interruption every predetermined time.

Figure 31:
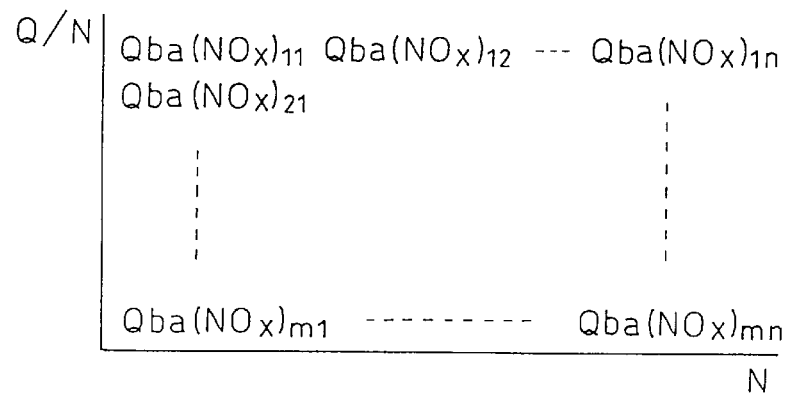
FIG. 31 is a diagram illustrating a $NO_x$ amount exhausted from the first cylinder subgroup per unit time.
Figure 32:
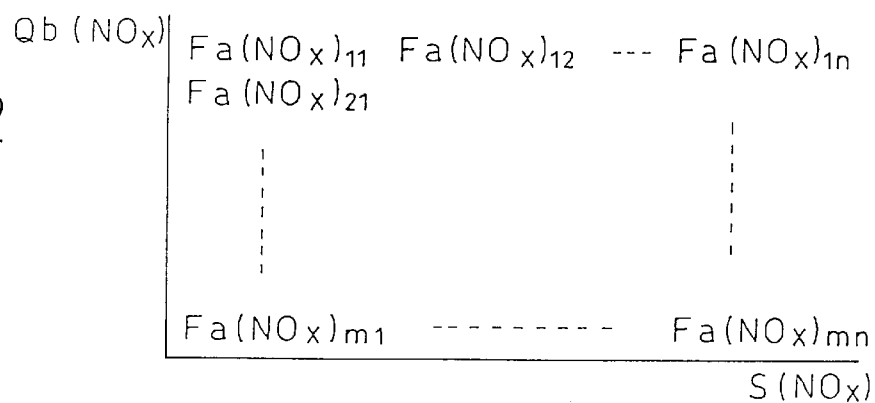
FIG. 32 is a diagram illustrating a $NO_x$ amount passing through the $NO_x$-OR catalyst connected to the first cylinder subgroup per unit time.

Referring to FIG. 30, first, in step 420, it is judged whether a first $NO_x$ release flag is set. The first $NO_x$ release flag is set when the first subgroup 1ba has to perform the rich operation to release the occluded $NO_x$ from the $NO_x$-OR catalyst 11a, and is reset when the first subgroup 1ba has to perform the lean operation. If the first $NO_x$ release flag is reset, the routine goes to step 421, where the $NO_x$ amount exhausted from the first subgroup 1ba per unit time Qba ($NO_x$) is calculated using a map shown in FIG. 31. In the following step 422, the $NO_x$ amount passing through the $NO_x$-OR catalyst 11a per unit time $Fa(NO_x)$ is calculated using a map shown in FIG. 32. In the following step 423, the occluded $NO_x$ amount $Sa(NO_x)$ in the $NO_x$-OR catalyst 11a is calculated using the following equation:

$$Sa(NO_x)=Sa(NO_x)+\{Qba(NO_x)-Fa(NO_x)\}\cdot DELTAna$$

where DELTAna is a time interval from the last processing cycle until the present processing cycle. In the following step 424, it is judged whether a second $NO_x$ release flag is set. The second $NO_x$ release flag is set when the second subgroup 1bb has to perform the rich operation to release the occluded $NO_x$ from the $NO_x$-OR catalyst 11b, and is reset when the second subgroup 1bb has to perform the lean operation. If the second flag is set, that is, if the second subgroup 1bb has to perform the rich operation, the processing cycle is ended. Namely, the first subgroup 1ba continuously performs the lean operation.

If the second $NO_x$ release flag is reset in step 424, the routine goes to step 425, where it is judged whether the occluded $NO_x$ amount $Sa(NO_x)$ is larger than the upper threshold amount $UTa(NO_x)$. If $Sa(NO_x) \leq UTa(NO_x)$, the processing cycle is ended. Namely, if $Sa(NO_x) \leq UTa(NO_x)$, the $NO_x$ occluding capacity of the $NO_x$-OR catalyst 11a is judged to be still large, and thus the first subgroup 1ba continuously performs the lean operation.

If $Sa(NO_x)>UTa(NO_x)$ in step 425, the routine goes to step 426, where the first $NO_x$ release flag is set, and then the processing cycle is ended. Namely, if $Sa(NO_x)>UTa(NO_x)$, the $NO_x$ occluding capacity of the $NO_x$-OR catalyst 11a is judged to become small. Thus, the first subgroup 1ba stops the lean operation and starts the rich operation. In the following step 427, the occluded $NO_x$ amount $Sa(NO_x)$ is reset. Then, the processing cycle is ended.

Figure 33:
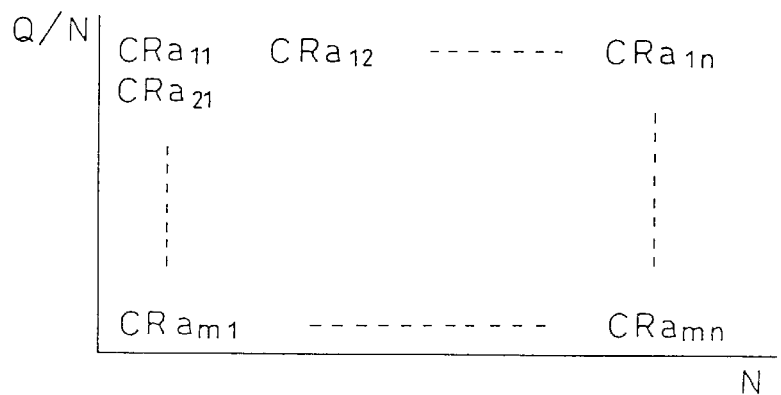
FIG. 33 is a diagram illustrating a rich period value for the first cylinder subgroup.

Contrarily, if the first $NO_x$ release flag is set, the routine goes from step 420 to step 428, where a first calculation flag is set. The first calculation flag is set when a rich period value CRa for the first subgroup 1ba is once calculated, and is reset when a counter value COUNTa, which represents a period in which the first subgroup 1ba is performing the rich operation is made zero. When it is first time for the routine to go to step 428 after the first $NO_x$ release flag is set, the first calculation flag is reset, and thus the routine goes to step 429, where the rich period value CRa is calculated using the map shown in FIG. 33. In the following step 430, the rich period value CRa is memorized as COUNTa. In the following step 431, the first calculation flag is set. Then, the processing cycle is ended.

When the first calculation flag is set, the routine goes from step 428 to step 432, where the counter value COUNTa is decremented by 1. In the following step 433, it is judged whether the counter value COUNTa is zero. If COUNTa is larger than zero, the processing cycle is ended. Namely, if COUNTa>0, the $NO_x$ occluding capacity of the $NO_x$-OR catalyst 11a is judged to be still small, and thus the rich operation of the first subgroup 1ba is continued.

If COUNTa=0 in step 433, the routine goes to step 434, where the first $NO_x$ release flag is reset. Namely, if COUNTa=0, the $NO_x$ occluding capacity of the $NO_x$-OR catalyst 11a is judged to become sufficiently large, and thus the first subgroup 1bs stops the rich operation and starts the lean operation. In the following step 435, the first calculation flag is reset, and then the processing cycle is ended.

Figure 34:
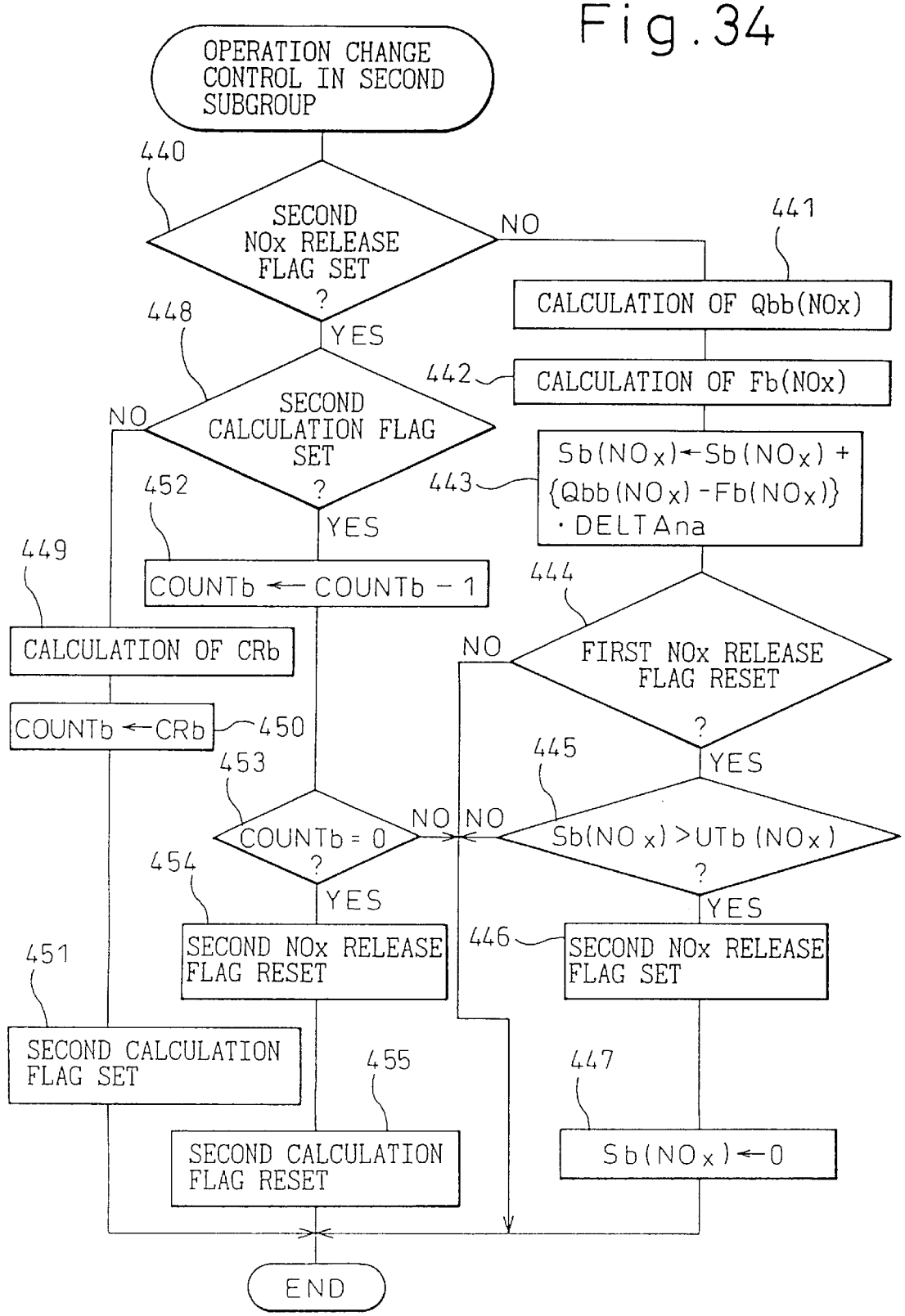
FIG. 34 is a flow chart for executing an operation change control in the second cylinder subgroup according to the embodiment explained with FIG. 29.

FIG. 34 illustrates a routine for executing the operation change control in the second subgroup 1bb, according to the embodiment. The routine is executed by interruption every predetermined time.

Figure 35:
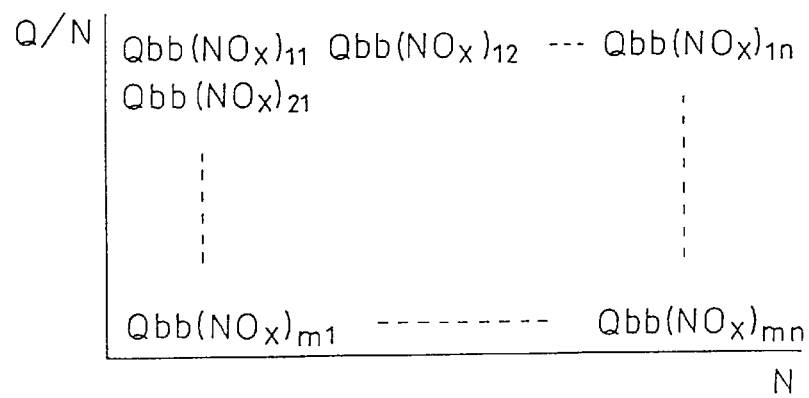
FIG. 35 is a diagram illustrating a $NO_x$ amount exhausted from the second cylinder subgroup per unit time.
Figure 36:
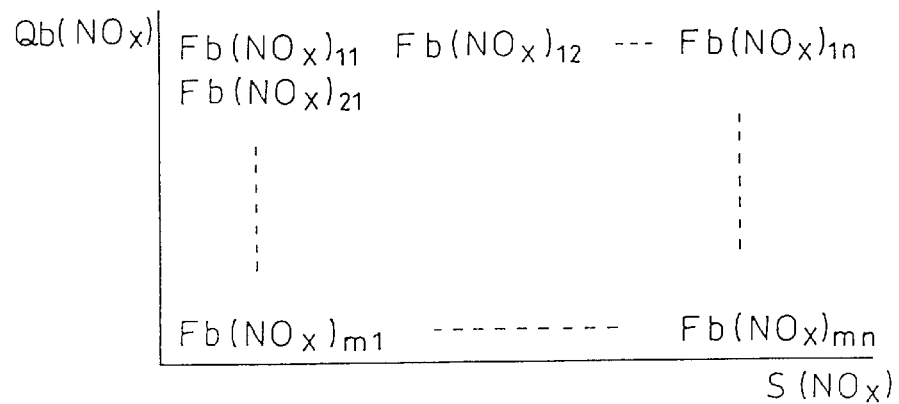
FIG. 36 is a diagram illustrating a $NO_x$ amount passing through the $NO_x$-OR catalyst connected to the second cylinder subgroup per unit time.

Referring to FIG. 34, first, in step 440, it is judged whether a second $NO_x$ release flag is set. The second $NO_x$ release flag is set when the second subgroup 1bb has to perform the rich operation to release the occluded $NO_x$ from the $NO_x$-OR catalyst 11b, and is reset when the second subgroup 1bb has to perform the lean operation. If the second $NO_x$ release flag is reset, the routine goes to step 441, where the $NO_x$ amount exhausted from the second subgroup 1bb per unit time Qbb($NO_x$) is calculated using a map shown in FIG. 35. In the following step 442, the $NO_x$ amount passing through the $NO_x$-OR catalyst 11b per unit time Fb($NO_x$) is calculated using a map shown in FIG. 36. In the following step 443, the occluded $NO_x$ amount Sb($NO_x$) in the $NO_x$-OR catalyst 11b is calculated using the following equation:

$$Sb(NO_x)=Sb(NO_x)+\{Qbb(NO_x)-Fb(NO_x)\}\cdot DELTAna$$

where DELTAna is a time interval from the last processing cycle until the present processing cycle. In the following step 444, it is judged whether the first $NO_x$ release flag is set, which is controlled in the routine shown in FIG. 31. If the first $NO_x$ release flag is set, that is, if the first subgroup 1ba has to perform the rich operation, the processing cycle is ended. Namely, the second subgroup 1bb continuously performs the lean operation.

If the first $NO_x$ release flag is reset in step 444, the routine goes to step 445, where it is judged whether the occluded $NO_x$ amount Sb($NO_x$) is larger than the upper threshold amount UTb($NO_x$). If Sb($NO_x$)≦UTb($NO_x$), the processing cycle is ended. Namely, if Sb($NO_x$)≦UTb($NO_x$), the $NO_x$ occluding capacity of the $NO_x$-OR catalyst 11b is judged to be still large, and thus the second subgroup 1bb continuously performs the lean operation.

If Sb($NO_x$)>UTb($NO_x$) in step 445, the routine goes to step 446, where the second $NO_x$ release flag is set, and then the processing cycle is ended. Namely, if Sb($NO_x$)>UTb($NO_x$), the $NO_x$ occluding capacity of the $NO_x$-OR catalyst 11b is judged to be small. Thus, the second subgroup 1bb stops the lean operation and starts the rich operation. In the following step 447, the occluded $NO_x$ amount Sb($NO_x$) is reset. Then, the processing cycle is ended.

Figure 37:
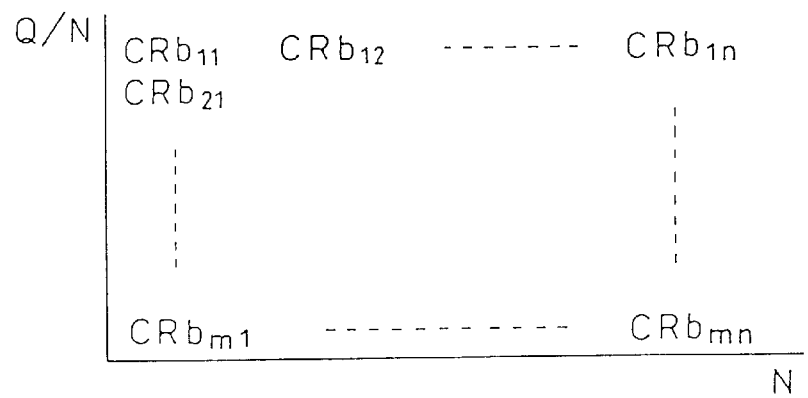
FIG. 37 is a diagram illustrating a rich period value for the second cylinder subgroup.

Contrarily, if the second $NO_x$ release flag is set, the routine goes from step 440 to step 448, where a second calculation flag is set. The second calculation flag is set when a rich period value CRb for the second subgroup 1bb is once calculated, and is reset when a counter value COUNTb, which represents a period in which the second subgroup 1bb is performing the rich operation is made zero. When it is the first time for the routine to go to step 448 after the second $NO_x$ release flag is set, the second calculation flag is reset, and thus the routine goes to step 449, where the rich period value CRb is calculated using the map shown in FIG. 37. In the following step 450, the rich period value CRb is memorized as COUNTb. In the following step 451, the second calculation flag is set. Then, the processing cycle is ended.

When the second calculation flag is set, the routine goes from step 448 to step 452, where the counter value COUNTb is decremented by 1. In the following step 453, it is judged whether the counter value COUNTb is zero. If COUNTb is larger than zero, the processing cycle is ended. Namely, if COUNTb>0, the $NO_x$ occluding capacity of the $NO_x$-OR catalyst 11b is judged to be still small, and thus the rich operation of the second subgroup 1bb is continued.

If COUNTb=0 in step 453, the routine goes to step 454, where the second $NO_x$ release flag is reset. Namely, if COUNTb 0, the $NO_x$ occluding capacity of the $NO_x$-OR catalyst 11b is judged to become sufficiently large, and thus the second subgroup 1bs stops the rich operation and starts the lean operation. In the following step 455, the second calculation flag is reset, and then the processing cycle is ended.

Note that Qba($NO_x$), Qbb($NO_x$), Fa($NO_x$), Fb($NO_x$), CRa, and CRb are stored in the ROM 22 in advance in the form of a map shown in FIGS. 31, 32, 33, 35, 36, and 37, respectively. The other constructions of the exhaust purifying device and the operation thereof are the same as those in the embodiment explained with reference to FIG. 27, and thus the explanations therefor are omitted.

Next, another embodiment for the exhaust gas purifying catalyst 14 will be explained.

The exhaust gas purifying catalyst in the embodiment uses, for example, a honeycomb type substrate made of cordierite, and an alumina layer which act as a carrier for the catalyst is coated on the cell surface of the honeycomb substrate. On this carrier, at least one substance selected from elements belong to the fourth period or the eighth group in the periodic table of elements, such as copper Cu. chrome Cr, vanadium V, titanium Ti, iron Fe, nickel Ni, cobalt Co, platinum Pt, palladium Pd, rhodium Rh and iridium Ir are carried as a catalyst.

If the exhaust gas purifying catalyst formed as in the above mentioned manner is referred as an $NH_3 \cdot NO_x$ purifying catalyst, the $NH_3 \cdot NO_x$ purifying catalyst is capable of converting all of the $NH_3$ component in the exhaust gas flowing into the $NH_3 \cdot NO_x$ purifying catalyst to $N_2$ provided that the exhaust gas is in an oxidizing atmosphere and the temperature of the catalyst is within a specific temperature range as determined by the substance being used as the catalyst. Therefore, when the exhaust gas is in an oxidizing atmosphere containing a $NH_3$ component and flows through the $NH_3 \cdot NO_x$ purifying catalyst in this temperature range, the $NH_3$ component in the exhaust gas is almost completely resolved, and the exhaust gas flows out from the $NH_3 \cdot NO_x$ purifying catalyst contains no $NH_3$ component. In the explanation below, this temperature range in which the $NH_3 \cdot NO_x$ purifying catalyst can resolve all the $NH_3$ component in the exhaust gas is called an optimum temperature range.

When the temperature of the $NH_3 \cdot NO_x$ purifying catalyst is higher than the optimum temperature range, the $NH_3$ component in the exhaust gas flowing into the $NH_3 \cdot NO_x$ purifying catalyst is oxidized by the $NH_3 \cdot NO_x$ purifying catalyst and $NO_x$ components are produced.

Namely, when the temperature of the $NH_3 \cdot NO_x$ purifying catalyst is higher than the optimum temperature range, the oxidizing reaction of the $NH_3$ component, i.e., the above-mentioned reactions (7) and (8) become dominant on the $NH_3 \cdot NO_x$ purifying catalyst, and the amount of $NO_x$ components, mainly NO and $NO_2$, in the exhaust gas flowing out from the $NH_3 \cdot NO_x$, purifying catalyst increases.

Further, when the temperature of the $NH_3 \cdot NO_x$ purifying catalyst is lower than the optimum temperature range, the oxidizing reaction of the $NH_3$ component (7) and (8) becomes lower, and the amount of the $NH_3$ component in the exhaust gas flowing out from the $NH_3 \cdot NO_x$ purifying catalyst increases.

Figure 38:
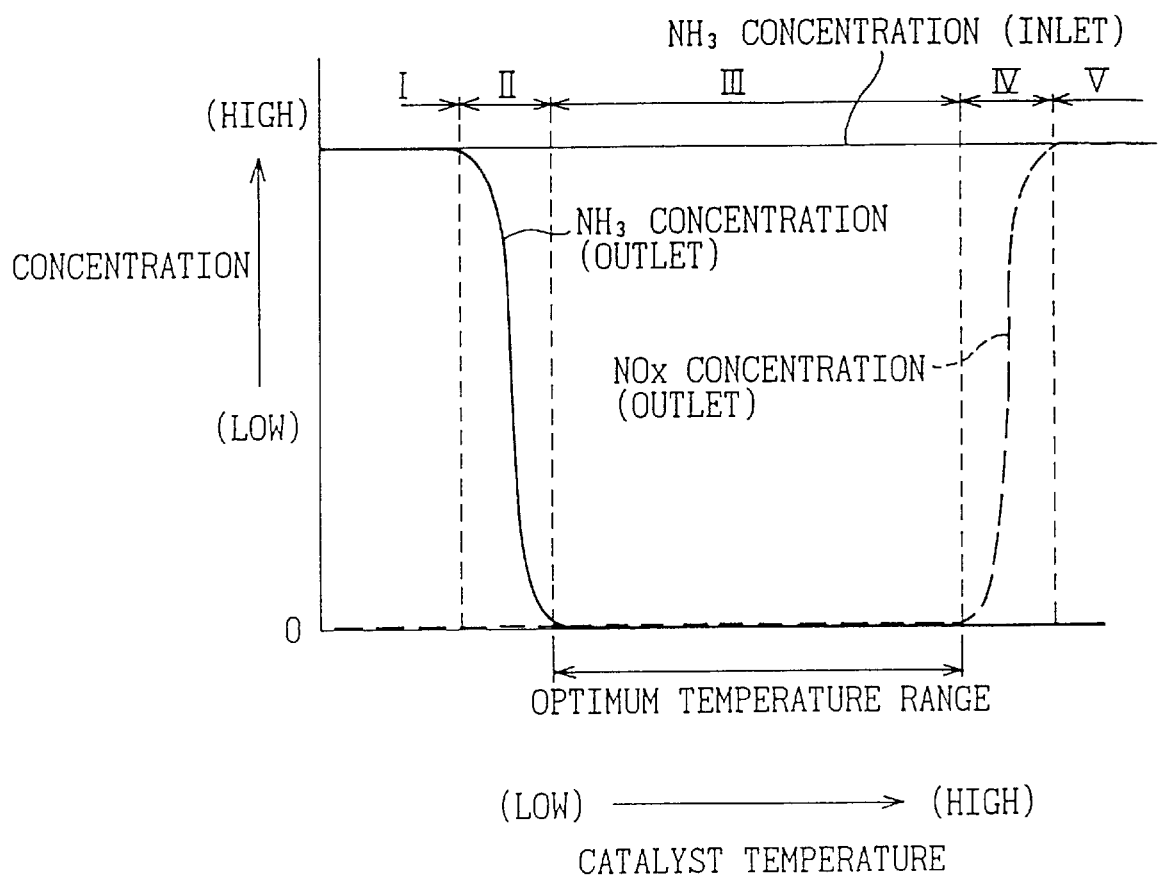
FIG. 38 illustrates a characteristic of the exhaust gas purifying catalyst according to another embodiment.

FIG. 38 schematically illustrates the variation in the characteristics of the $NH_3 \cdot NO_x$ purifying catalyst in accordance with the change in the temperature. FIG. 38 shows the variation in the concentration of the $NH_3$ and $NO_x$ components in the exhaust gas flowing out from the $NH_3 \cdot NO_x$ purifying catalyst in accordance with the temperature of the $NH_3 \cdot NO_x$ purifying catalyst when the exhaust gas flowing into the $NH_3 \cdot NO_x$ purifying catalyst is in an oxidizing atmosphere and the concentration of $NH_3$ in the exhaust gas is maintained at a constant level. The vertical axis and the horizontal axis in FIG. 38 represent the concentration of the respective components in the exhaust gas and the temperature of the $NH_3 \cdot NO_x$ purifying catalyst, respectively. The solid line and the dotted line in FIG. 38 represent the concentrations of the $NH_3$ component and the $NO_x$ components in the exhaust gas flowing out from the $NH_3 \cdot NO_x$ purifying catalyst, respectively.

As shown in FIG. 38, provided that the concentration of the $NH_3$ component in the exhaust gas flowing into the $NH_3 \cdot NO_x$ purifying catalyst is maintained at a constant level, the concentration of the $NH_3$ component in the outflow exhaust gas is substantially the same as the concentration of $NH_3$ in the inflow exhaust gas in the low temperature region (region I in FIG. 38). In this temperature region, the concentration of the $NO_x$ components in the outflow exhaust gas is substantially zero. This means that substantially all of the $NH_3$ component in the exhaust gas passes through the $NH_3 \cdot NO_x$ purifying catalyst without reaction when the temperature is low (region I in FIG. 38).

When the temperature becomes higher than the above low temperature region, the concentration of the $NH_3$ component in the outflow exhaust gas decreases as the temperature increases, while the concentration of the $NO_x$ components is substantially the same (region II in FIG. 38). Namely, in this temperature region, the amount of $NH_3$ component in the exhaust gas which is converted to $N_2$ component increases as the temperature increases.

When the temperature further increases, as shown in region III in FIG. 38, the concentration of $NH_3$ component in the outflow exhaust gas further decreases and the concentration of both the $NH_3$ and $NO_x$ components becomes substantially zero. Namely, in this temperature region (region III in FIG. 38), all of the $NH_3$ component in the exhaust gas flowing into the $NH_3 \cdot NO_x$ purifying catalyst is resolved (i.e., converted to $N_2$ component) by the $NH_3 \cdot NO_x$ purifying catalyst without forming $NO_x$ components.

However, when the temperature becomes higher than this region, the concentration of the $NO_x$ components in the outflow exhaust gas increases as the temperature increases (region Iv in FIG. 38), and all of the $NH_3$ component in the exhaust gas is converted to $NO_x$ components by the $NH_3 \cdot Nox$ purifying catalyst in a high temperature region (region V in FIG. 38).

In this specification, the optimum temperature range of the $NH_3 \cdot NO_x$ purifying catalyst is defined as a temperature range in which all of the $NH_3$ component in the exhaust gas is converted to a $N_2$ component without forming any $NO_x$ component, i.e., such as the temperature range indicated by the temperature region III in FIG. 38.

The optimum temperature range of the $NH_3 \cdot NO_x$ purifying catalyst changes according the substance used as catalytic component, and generally starts at a relatively low temperature compared with, for example, the activating temperature of the TW catalyst. For example, when a substance such as platinum Pt, rhodium Rh, or palladium Pd is used, the optimum temperature range is approximately 100 to 400° C. (preferably 100 to 300° C. and most preferably 100 to 250° C. in case of platinum Pt, and preferably 150 to 400° C. and most preferably 150 to 300° C. in case of rhodium Rh or palladium Pd). When a substance such as copper Cu, chrome Cr, or iron, for example, is used, the optimum temperature range is approximately 150 to 650° C. (preferably 150 to 500° C.). Therefore, if the $NH_3 \cdot NO_x$ purifying catalyst is formed as a tandem compound type catalyst using both types of the catalytic component, i.e., if the catalytic components such as platinum Pt are carried on the downstream part of the substrate and the catalytic components such as chrome Cr are carried on the upstream part of the substrate, the optimum temperature range of the $NH_3 \cdot NO_x$ purifying catalyst can be widened as a whole.

The reason why the $NH_3 \cdot NO_x$ purifying catalyst converts substantially all of the $NH_3$ component in the exhaust gas to the $N_2$ component without producing any $NO_x$ components only in the specific temperature range is not clear at present. However, it is considered that this phenomena is due to the following reason.

Namely, when the temperature of the $NH_3 \cdot NO_x$ purifying catalyst is in the optimum temperature range, the above mentioned denitrating reactions (9) and (10) occur on the $NH_3 \cdot NO_x$ purifying catalyst, in addition to the above mentioned oxidizing reactions (7) and (8). Due to these denitrating reactions (9) and (10), the $NO_x$ components produced by the oxidizing reactions (7) and (8) are immediately converted to the $N_2$ component. Namely, in the optimum temperature range, a portion of the $NH_3$ in the exhaust gas flowing into the $NH_3 \cdot NO_x$ purifying catalyst is converted to $NO_x$ by the oxidizing reactions (7) and (8), and this $NO_x$ immediately reacts with the remaining $NH_3$ in the exhaust gas and is converted to $N_2$ by the denitrating reactions (9) and (10). By these sequential reactions, substantially all of the $NH_3$ in the exhaust gas is converted to $N_2$ when the temperature of the catalyst is within the optimum temperature range.

When the temperature of the $NH_3 \cdot NO_x$ purifying catalyst is above the optimum temperature range, the oxidizing reactions (7) and (8) become dominant in the catalyst and the portions of $NH_3$ which is oxidized by the catalyst increases. Thus, the denitrating reactions (9) and (10) hardly occur in the catalyst due to the shortage of $NH_3$ component in the exhaust gas, and the $NO_x$ produced by the oxidizing reactions (7) and (8) flows out from the $NH_3 \cdot NO_x$ purifying catalyst without being reduced by the denitrating reactions (9) and (10).

On the other hand, when the temperature of $NH_3 \cdot NO_x$ purifying catalyst is below the optimum temperature range, the oxidizing reactions (7) and (8) hardly occur due to the low temperature. This causes the $NH_3$ in the exhaust gas to pass through the $NH_3 \cdot NO_x$ purifying catalyst without being oxidized by the $NO_x$ due to the shortage of the $NO_x$ in the exhaust gas.

As explained above, the optimum temperature range of the $NH_3 \cdot NO_x$ purifying catalyst is a temperature range in which the oxidizing reactions of the $NH_3$ (7) and (8) and the denitrating reactions of the $NO_x$ (9) and (10) balance each other in such a manner that the $NO_x$ produced by the oxidation of the $NH_3$ immediately reacts with $NH_3$ in the exhaust gas without causing any surplus $NO_x$ and $NH_3$. Consequently, the optimum temperature range of the $NH_3 \cdot NO_x$ purifying catalyst is determined by the oxidizing ability of the catalyst and its temperature dependency. Therefore, when the catalyst component having high oxidizing ability, such as platinum Pt, is used, the optimum temperature range becomes lower than that when the catalyst component having relatively low oxidizing ability, such as chrome Cr is used.

As explained above, though the mechanism of the phenomenon is not completely clarified, the $NH_3 \cdot NO_x$ purifying catalyst actually converts all of the $NH_3$ in the exhaust gas under an oxidizing atmosphere when the temperature is within the optimum temperature range. Further, when the $NH_3 \cdot NO_x$ purifying catalyst is used in the optimum temperature range the following facts were found in connection with the above phenomenon:

(a) When the exhaust gas flowing into the $NH_3 \cdot NO_x$ purifying catalyst is in an oxidizing atmosphere, i.e., when the exhaust gas air-fuel ratio of the inflowing exhaust gas is lean compared to the stoichiometric air-fuel ratio, substantially all of the $NH_3$ in the exhaust gas is converted to $N_2$ without producing any $NO_x$. This occurs when the exhaust gas is in an oxidizing atmosphere (a lean air-fuel ratio), but regardless of the degree of leanness of the exhaust gas air-fuel ratio of the inflowing exhaust gas.

(b) When the exhaust gas flowing into the $NH_3 \cdot NO_x$ purifying catalyst contains $NO_x$ in addition to $NH_3$, all of the $NO_x$ in the exhaust gas as well as the $NH_3$ is converted to $N_2$, and the concentration of the $NO_x$ components in the exhaust gas becomes zero. In this case, the ratio of the concentrations of the $NO_x$ components and the $NH_3$ component is not necessarily stoichiometrical for the denitrating reactions (9) and (10) (i.e., 4:3, or 1:1). It is only required that the exhaust gas contains an amount of $NH_3$ more than the amount required for reducing the $NO_x$ ($NO_2$ and NO) in the exhaust gas. As explained above, since the surplus $NH_3$ in the exhaust gas is all converted to $N_2$ when the exhaust gas is in an oxidizing atmosphere, no surplus $NH_3$ is contained in the exhaust gas flowing out from the $NH_3 \cdot NO_x$ purifying catalyst even in this case.

(c) When the exhaust gas flowing into the $NH_3 \cdot NO_x$ purifying catalyst contains HC and CO components, all of the HC and CO components are oxidized by the $NH_3 \cdot NO_x$ purifying catalyst, provided that the exhaust gas air-fuel ratio of the inflowing exhaust gas is lean compared to the stoichiometric air-fuel ratio, and no HC and CO components are contained in the exhaust gas flowing out from the $NH_3 \cdot NO_x$ purifying catalyst.

However, when the exhaust gas flowing into the $NH_3 \cdot NO_x$ purifying catalyst contains both the $NH_3$ and $NO_x$, it was found that the temperature region Iv in FIG. 38, i.e., the temperature region in which the concentration of $NO_x$ components in the outflow exhaust gas increases as the temperature of the catalyst increases, moves to the lower temperature side compared to that when the exhaust gas flowing into the $NH_3 \cdot NO_x$ purifying catalyst contains only the $NH_3$ components. This is because, when the exhaust gas contains $NO_x$ in addition to $NH_3$, the $NO_x$ in the inflow exhaust gas in addition to the $NO_x$ produced by the oxidizing reaction of $NH_3$ must be reduced by the $NH_3$ in the exhaust gas. Consequently, the shortage of $NH_3$ is apt to occur in the relatively low temperature region. Therefore, when the exhaust gas contains both the $NH_3$ and the $NO_x$, the optimum temperature range of the $NH_3 \cdot NO_x$ purifying catalyst becomes narrower.

In relation to above (b), a conventional denitrating catalyst, such as a vanadia-titania $V_2O_5$—$TiO_2$ type catalyst also has a capability for resolving $NH_3$ and $NO_x$ in the exhaust gas with a certain conditions. However, in case of the conventional denitrating catalyst, the amounts of $NH_3$ and $NO_x$ components must be strictly stoichiometrical in order to react $NH_3$ with $NO_x$ without causing any surplus $NH_3$ and $NO_x$. Namely, when both the $NO_2$ and NO are contained in the exhaust gas, the amount (moles) of the $NH_3$ in the exhaust gas must be strictly equal to the total of the moles of $NO_2$ in the exhaust gas multiplied by ¾ and the moles of NO in the exhaust gas to react $NH_3$ and $NO_x$ without causing any surplus $NH_3$ and $NO_x$. However, in case of the $NH_3 \cdot NO_x$ purifying catalyst in the embodiment, if the amount of the $NH_3$ is more than stoichiometrical compared to the amount of $NO_x$, and if the exhaust gas air-fuel ratio of the inflowing exhaust gas is lean, all of the $NH_3$ and $NO_x$ are converted to $N_2$ without causing any surplus $NH_3$ and $NO_x$. This is an important difference between the $NH_3 \cdot NO_x$ purifying catalyst in the present invention and the conventional denitrating catalyst.

As explained in FIG. 38, though the $NH_3 \cdot NO_x$ purifying catalyst converts all of the $NH_3$ in the exhaust gas in the optimum temperature range, some $NH_3$ passes through when the temperature is below the optimum temperature range. In order to prevent this outflow of $NH_3$ in the low temperature region, an acidic inorganic substance may be used. It is known in the art that an acidic inorganic substance (which includes Broensted acids such as zeolite, silica $SiO_2$, silica-alumina $SiO_2$—$Al_2O_3$, and titania $TiO_2$ as well as Lewis acids including oxides of transition metals such as copper Cu, cobalt Co, nickel Ni and iron Fe) absorb $NH_3$ when the temperature is low. Therefore, one or more of these acidic inorganic substances may be carried on the substrate of the $NH_3 \cdot NO_x$ purifying catalyst, or the substrate itself may be formed by a porous material made of such acidic inorganic substances to prevent the outflow of $NH_3$ in the low temperature region. In this case, the $NH_3$ component which is not converted to an $N_2$ component in the temperature region below the optimum temperature range is absorbed by the acidic inorganic substances in the $NH_3 \cdot NO_x$ purifying catalyst, and the amount of the outflow of the $NH_3$ from the $NH_3 \cdot NO_x$ purifying catalyst in the low temperature region can be reduced. The $NH_3$ absorbed by the acidic inorganic substances are released when the temperature of the $NH_3 \cdot NO_x$ purifying catalyst becomes high, or when the concentration of $NH_3$ component in the exhaust gas becomes low. Therefore, the $NH_3$ absorbed by the acidic inorganic substance is converted to $N_2$ by the $NH_3 \cdot NO_x$ purifying catalyst when it is desorbed from the acidic inorganic substance. When the temperature of the exhaust gas flowing into the $NH_3 \cdot NO_x$ purifying catalyst changes in a wide range, therefore, it is suitable to use these acidic inorganic substances to prevent the outflow of $NH_3$ in low temperature region.

Further, as long as such desorption occurs, the adsorbed $NH_3$ amount in the acidic inorganic substance does not increase. As a result, the $NH_3 \cdot NO_x$ purifying catalyst is prevented from being saturated with $NH_3$, that is, $NH_3$ is prevented from flowing out from the $NH_3 \cdot NO_x$ purifying catalyst without being purified. This means that there is no need to arrange the $NH_3$ purifying catalyst downstream of the $NH_3 \cdot NO_x$ purifying catalyst, and this simplifies the structure of the exhaust gas purifying catalyst.

Figure 39:
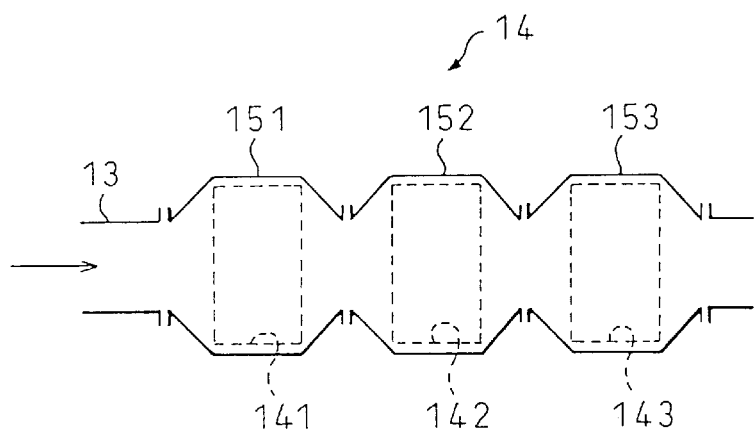
FIG. 39 illustrates another embodiment of the exhaust gas purifying catalyst.

Next, another embodiment of the exhaust gas purifying catalyst 14 will be explained with reference to FIG. 39. In FIG. 39, constituent elements the same as those in the above-mentioned embodiments are given the same reference numerals.

Referring to FIG. 39, the exhaust gas purifying catalyst 14 is provided with three catalysts arranged in series. The catalysts are, from upstream side, in turn, the Cu zeolite catalyst 141, the Pt—Cu zeolite catalyst 142, and the precious metal catalyst 143. Note that the catalysts 141, 142, and 143 are housed in corresponding catalytic converter 151, 152, and 153. Further, the inlet of the converter 151 is connected to the outlet of the interconnecting duct 13.

According to the inventors of the present invention, it has been found that the upper limit temperature of the optimum temperature range under the oxidizing atmosphere of the precious metal catalyst 143 is highest in the catalysts 141, 142, and 143, that of the Pt—Cu zeolite catalyst 142 is next to that of the precious metal catalyst 143, and that of the Cu zeolite catalyst 141 is lowest. On the other hand, an exhaust gas temperature at an outlet of an catalyst may become higher than that at an inlet, due to the reaction occurring on the catalyst. Thus, the Cu zeolite catalyst 141, the Pt—Cu zeolite catalyst 142, and the precious metal catalyst 143 are arranged in turn, from the upstream side, in this embodiment. This prevents unusual deterioration of the catalysts, while ensuring good purification of the exhaust gas.

Figure 40:
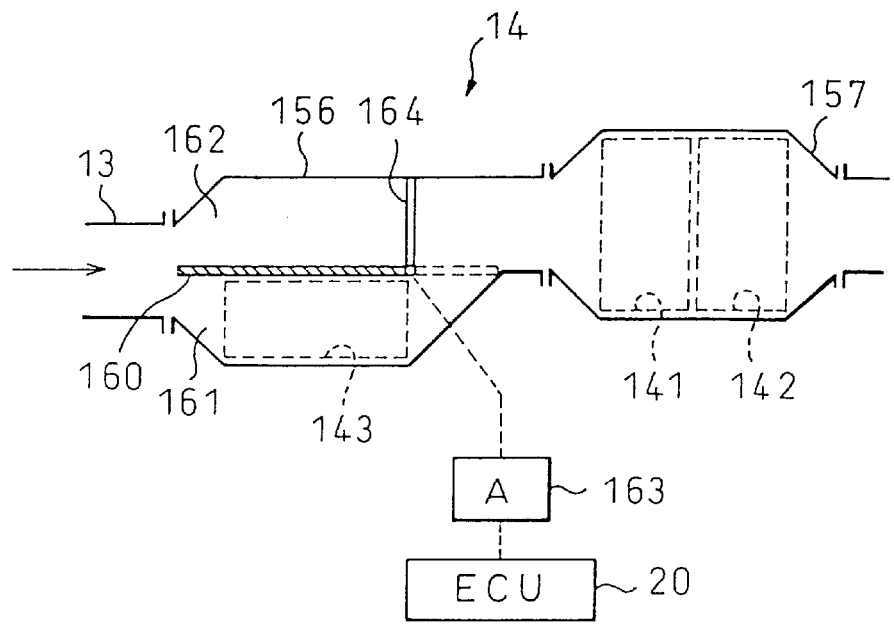
FIG. 40 illustrates another embodiment of the exhaust gas purifying catalyst.

Next, another embodiment of the exhaust gas purifying catalyst 14 will be explained with reference to FIG. 40. In FIG. 40, constituent elements the same as those in the above-mentioned embodiments are given the same reference numerals. Further, an electronic control unit same as shown in FIG. 1 is also provided in this embodiment, but it is depicted simply by a box, in FIG. 40.

Referring to FIG. 40, the exhaust gas purifying catalyst 14 is provided with the precious metal catalyst 143 housed in the catalytic converter 156, and the Cu zeolite catalyst 141 and the Pt—Cu zeolite catalyst 142 housed in the common catalytic converter 157, which is arranged downstream of the converter 157. The Cu zeolite catalyst 141 and the Pt—Cu zeolite catalyst 142 are carried on a common substrate, and are arranged in series, in turn, with respect to the exhaust gas flow. Formed in the catalytic converter 156 are first and second passages 161 and 162, separated by a separating wall 160. The inlets of the first and second passages 161 and 162 are connected to the outlet of the interconnecting duct 13, and the outlets are connected to the inlet of the catalytic converter 157 via an exhaust gas control valve 164. As shown in FIG. 40, the precious metal catalyst 143 is arranged in the first passage 161.

The exhaust gas control valve 164 is arranged in the catalytic converter 156, and is driven by an actuator 163 of a solenoid or vacuum type. When the exhaust gas control valve 164 is positioned at a position shown by the solid line in FIG. 40, the first passage 161 is opened and the second passage 162 is closed, and thereby the interconnecting passage 13 communicates with the catalytic converter 157 via the first passage 161. When the exhaust gas control valve 164 is positioned to a position shown by the broken line in FIG. 40, the first passage 161 is closed and the second passage 162 is opened, and thereby the interconnecting passage 13 communicates with the catalytic converter 157 via the second passage 162. Note that the actuator 163 is connected, via a drive circuit, to the output port of the ECU 20, and is controlled in accordance with the output signals from the ECU 20.

Next, the control of the exhaust gas control valve will be explained with reference to FIG. 41. The routine shown in FIG. 41 is executed by interruption every predetermined time.

Figure 41:
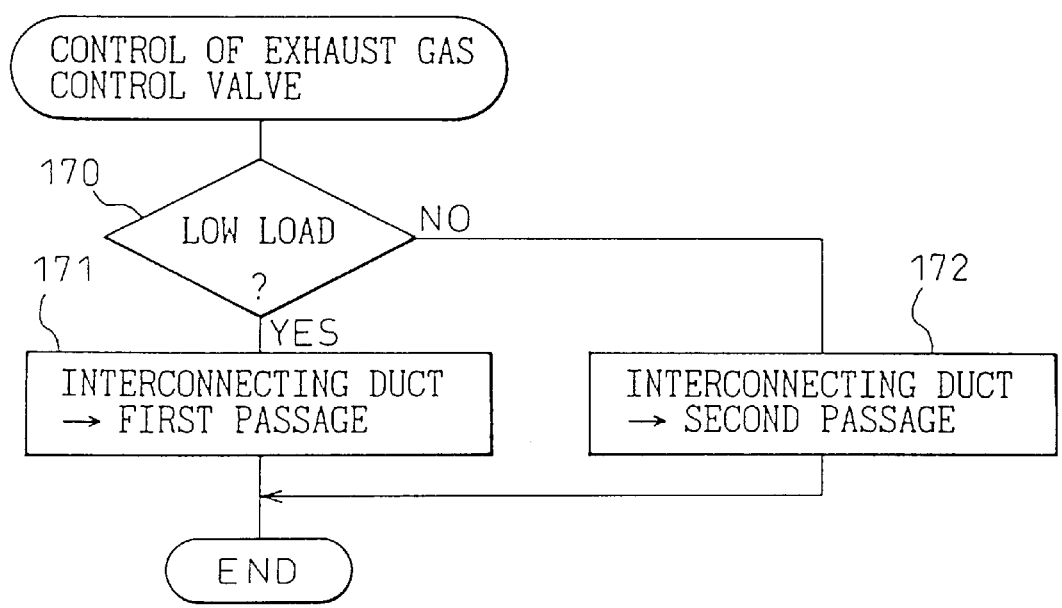
FIG. 41 is a flow chart for controlling an exhaust gas control valve in the embodiments shown in FIG. 40.

Referring to FIG. 41, first, in step 170, it is judged whether the low load operation, including the idling operation, is in process at this time. If the low load operation is in process, the routine goes to step 171, where the exhaust gas control valve 164 is positioned to the position shown by the solid line in FIG. 40, and thus the interconnecting duct 13 is connected to the first passage 161. Namely, the exhaust gas from the duct 13 contacts, in turn, the precious metal catalyst 143, the Cu zeolite catalyst 141, and the Pt—Cu zeolite catalyst 142.

In the low load engine operation, the temperature of the exhaust gas flowing into the exhaust gas purifying catalyst 14 is low. Thus, if the low load operation is continued for a long period, the temperatures of the Cu zeolite catalyst 141 and the Pt—Cu zeolite catalyst 142 may become lower and the purification ability of the catalysts 141 and 142 may be lowered. Therefore, in this embodiment, the exhaust gas, first, makes contact with the precious metal, in the low load operation, to prevent the temperature of the exhaust gas from dropping as much as possible, to thereby ensure the purification ability of the catalysts 141, 142, and 143. As a result, the exhaust gas is purified sufficiently by the catalysts 141, 142, and 143.

Contrarily, if the low load operation is not in process, that is, if the middle or high load operation is in process, in step 170, the routine goes to step 172, where the exhaust gas control valve 164 is positioned to the position shown by the broken line in FIG. 40, and thus the interconnecting duct 13 is connected to the second passage 162. Namely, the exhaust gas from the duct 13 bypasses the precious metal catalyst 143, and then contacts with, in turn, the Cu zeolite catalyst 141 and the Pt—Cu zeolite catalyst 142.

When the exhaust gas of which the temperature is high flows into the precious metal catalyst 143, the oxidizing reactions (9) and (10) mentioned above become dominant thereon, and the large amount of $NO_x$ may flow out therefrom. Such a large amount of $NO_x$ may not be purified on the following Cu zeolite catalyst 141 and Pt—Cu zeolite catalyst 142. Therefore, in this embodiment, during the middle or high load operation where the exhaust gas temperature is relatively high, the exhaust gas bypasses the precious metal catalyst 143, and contacts the Cu zeolite catalyst 141 and Pt—Cu zeolite catalyst 142, to thereby prevent $NO_x$ from flowing out from the exhaust gas purifying catalyst 14.

While, in this embodiment, the exhaust gas control valve 164 is controlled in accordance with the engine load, the valve 164 may be controlled in accordance with the temperature of the inflowing exhaust gas or each catalyst, or with the engine operating condition such as the engine speed.

Figure 42:
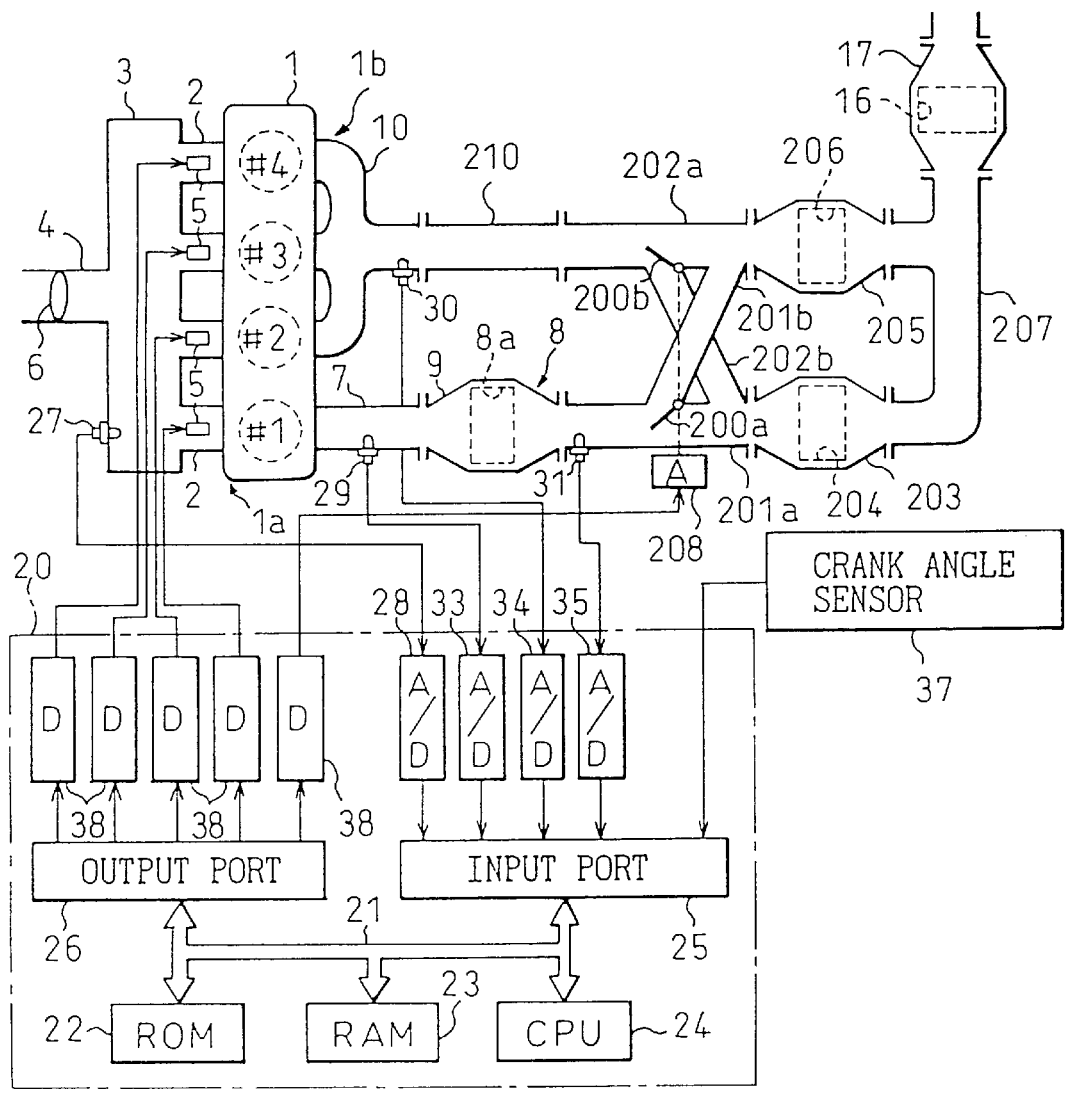
FIG. 42 is a general view of an engine, illustrating an exhaust gas purifying device according to still another embodiment.

FIG. 42 illustrates another embodiment of the exhaust gas purifying device. In FIG. 42, constituent elements the same as those in the above-mentioned embodiments are given the same reference numerals.

Referring to FIG. 42, the first cylinder group 1a is connected, via the exhaust duct 7, to the catalytic converter 9 housing the TW catalyst 8a therein, and the converter 9 is selectively connected, via an $NH_3$ switching valve 200a, to either a first $NH_3$ introducing duct 201a or a second $NH_3$ introducing duct 201b. Also, the second cylinder group 1b is connected, via the exhaust manifold 10, to an exhaust duct 210, and the duct 210 is selectively connected, via a $NO_x$ switching valve 200b, to either a first $NO_x$ introducing duct 202a or a second $NO_x$ introducing duct 202b. The first $NH_3$ introducing duct 201a and the second $NO_x$ introducing duct 202b are connected to a common catalytic converter 203 housing an $NH_3$-AO catalyst 204 therein. The second $NH_3$ introducing duct 201b and the first $NO_x$ introducing duct 202a are connected to a common catalytic converter 205 housing a $NO_x$-OR catalyst 206 therein. The converters 203 and 205 are connected, via an interconnecting duct 207, to the common catalytic converter 17 housing the $NH_3$ purifying catalyst 16.

The $NH_3$ switching valve 200a and the $NO_x$ switching valve 200b are controlled by a common actuator 208 of solenoid or vacuum type. The actuator 208 drives the switching valves 200a and 200b simultaneously, to connect the TW catalyst 8a to either the first or the second $NH_3$ introducing duct 201a, 201b, selectively, and to connect the exhaust duct 210 to either the first or the second $NO_x$ introducing duct 202a, 202b, selectively. Note that the actuator 208 is connected, via the drive circuit 32, to the output port 26 of the ECU 20, and is controlled in accordance with the output signals from the ECU 20.

In this embodiment, the $NH_3$-AO catalyst 204 is formed as the $NH_3$-AO catalyst 14a in the above-mentioned embodiments, and the $NO_x$-OR catalyst 206 is formed as the $NO_x$-OR catalyst 11a in the above-mentioned embodiments. Alternatively, the $NH_3$-AO catalyst 204 may be formed as the $NH_3 \cdot NO_x$ purifying catalyst including the acidic inorganic substance, as explained with reference to FIG. 38.

In this embodiment, the first group 1a continuously performs the rich operation to make the exhaust gas air-fuel ratio of the exhaust gas flowing into the TW catalyst 8a rich continuously. Therefore, the exhaust gas including $NH_3$, of which the exhaust gas air-fuel ratio is rich flows into the first or the second $NH_3$ introducing duct 201a, 201b. Also, the second group 1b continuously performs the lean operation to make the exhaust gas air-fuel ratio of the exhaust gas flowing out from the exhaust duct 210 lean continuously. Therefore, the exhaust gas including $NO_x$, of which the exhaust gas air-fuel ratio is lean flows into the first or the second $NO_x$ introducing duct 202a, 202b. Note that the target air-fuel ratio (A/F)T for the first and the second groups 1a and 1b are set as in a manner to set the rich and the lean air-fuel ratios (A/F)R and (A/F)L, mentioned above.

Figure 43A:
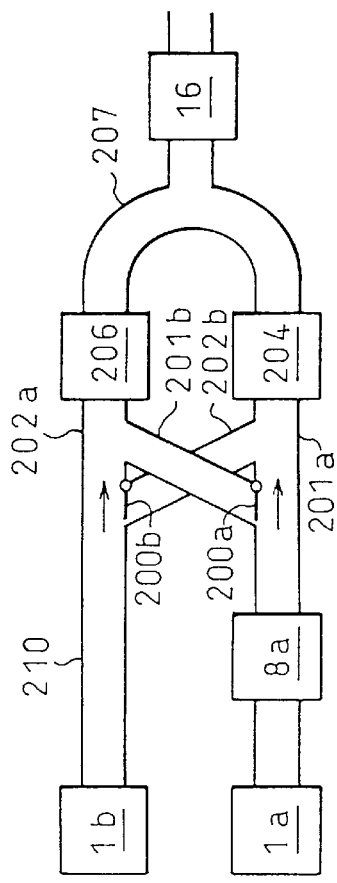
Figure 43B:
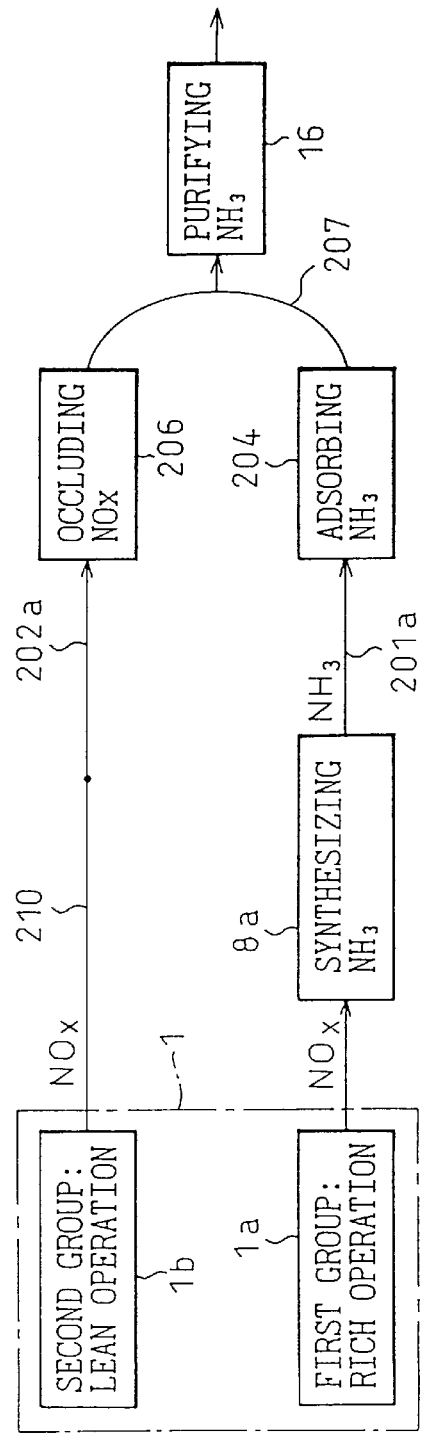

In this embodiment, the exhaust gas of the engine 1 is purified by performing an adsorbing and occluding process and a desorbing, releasing, and purifying process, alternately and repeatedly. First, the adsorbing and occluding process will be explained with reference to FIGS. 43A and 43B.

In the adsorbing and occluding process, the $NH_3$ switching valve 200a opens the first $NH_3$ introducing duct 201a and closes the second $NH_3$ introducing duct 201b. At the same time, the $NO_x$ switching valve 200b opens the first $NO_x$ introducing duct 202a and closes the second $NO_x$ introducing duct 202b. As a result, the TW catalyst 8a is connected, via the first $NH_3$ duct 201a, to the $NH_3$-AO catalyst 204 and the duct 210 is connected, via the first $NO_x$ duct 202a, to the $NO_x$-OR catalyst 206. Such a connecting condition of the TW catalyst 8a and the duct 210 is referred to as a first connecting condition.

Namely, in the adsorbing and occluding process, the exhaust gas including $NH_3$, of which the exhaust gas air-fuel ratio is rich flows into the $NH_3$-AO catalyst 204. Substantially all of $NH_3$ in the exhaust gas is adsorbed in the $NH_3$-AO catalyst 204. In this condition, even if $NH_3$ flows out from the $NH_3$-AO catalyst 204 without being adsorbed, the $NH_3$ is purified on the following $NH_3$ purifying catalyst 16. On the other hand, the exhaust gas including $NO_x$, of which the exhaust gas air-fuel ratio is lean flows into the $NO_x$-OR catalyst 206. Substantially all of $NO_x$ in the exhaust gas is occluded in the $NO_x$-OR catalyst 206. Accordingly, $NH_3$ and $NO_x$ are prevented from flowing downstream of the $NH_3$ purifying catalyst 16, in the adsorbing and occluding process.

Contrarily, in the desorbing, releasing, and purifying process, as shown in FIGS. 44A and 44B, the $NH_3$ switching valve 200a closes the first $NH_3$ introducing duct 201a and opens the second $NH_3$ introducing duct 201b. At the same time, the $NO_x$ switching valve 200b closes the first $NO_x$ introducing duct 202a and opens the second $NO_x$ introducing duct 202b. As a result, the TW catalyst 8a is connected, via the second $NH_3$ duct 201b, to the $NO_x$-OR catalyst 206 and the duct 210 is connected, via the second $NO_x$ duct 202b, to the $NH_3$-AO catalyst 204. Such a connecting condition of the TW catalyst 8a and the duct 210 is referred to as a second connecting condition.

Namely, in the desorbing, releasing, and purifying process, the exhaust gas including $NO_x$ without including $NH_3$, of which the exhaust gas air-fuel ratio is lean, flows into the $NH_3$-AO catalyst 204. As a result, the adsorbed $NH_3$ is desorbed from the $NH_3$-AO catalyst 204, and the desorbed $NH_3$ reduces or purifies the inflowing $NO_x$. In this condition, even if the desorbed $NH_3$ amount is excessive to the inflowing $NO_x$ amount, the excess $NH_3$ is purified on the following $NH_3$ purifying catalyst 16. On the other hand, the exhaust gas including $NH_3$, of which the exhaust gas air-fuel ratio is rich flows into the $NO_x$-OR catalyst 206. As a result, the occluded $NO_x$ is released from the $NO_x$-OR catalyst 206, and the released $NO_x$ is reduced or purified by the inflowing $NH_3$. In this condition, even if the inflowing $NH_3$ amount is excessive to the released $NO_x$ amount, the excess $NH_3$ is purified on the following $NH_3$ purifying catalyst 16. Accordingly, $NH_3$ and $NO_x$ are prevented from flowing downstream of the $NH_3$ purifying catalyst 16, regardless whether in the adsorbing and occluding process, or in the desorbing, releasing, and purifying process.

In this way, performing the adsorbing and occluding process, and the desorbing, releasing, and purifying process alternately and repeatedly, provide good purification of the exhaust gas. Further, the second group 1b continuously performs the lean operation, in this embodiment, and this makes the fuel consumption rate lower.

When the $NH_3$ switching valve 200a and the $NO_x$ switching valve 200b are controlled and the connecting conditions of the TW catalyst 8a and the duct 210 are made the first connecting condition, the adsorbing and occluding process is performed, and when they are made the second connecting condition, the desorbing, releasing, and purifying process is performed. A switching control of the processes, that is, a switching control of the connecting conditions may be executed at any timing, as long as the saturation of the $NH_3$-AO catalyst 204 and the $NO_x$-OR catalyst 206 are prevented. However, a frequent switching of the connecting condition is undesirable. Thus, in this embodiment, the $NH_3$ amount $S1(NH_3)$ adsorbed in the $NH_3$-AO catalyst 204, or the $NO_x$ amount $S1(NO_x)$ occluded in the $NO_x$-OR catalyst 206 is found, and the switching control of the connecting condition is executed in accordance with $S1(NH_3)$ or $S1(NO_x)$.

Namely, in the adsorbing and occluding process, when the at least one of the adsorbing $NH_3$ amount $S1(NH_3)$ and the occluding $NO_x$ amount $S1(NO_x)$ becomes larger than the corresponding upper threshold amount $UT1(NH_3)$, $UT1(NO_x)$, the desorbing, releasing, and purifying process is started. Also, in the desorbing, releasing, and purifying process, when the at least one of the adsorbing $NH_3$ amount $S1(NH_3)$ and the occluding $NO_x$ amount $S1(NO_x)$ becomes smaller than the corresponding lower threshold amount $LT1(NH_3)$, $LT1(NO_x)$, the adsorbing and occluding process is started. Accordingly, the exhaust gas is sufficiently purified without frequent switching in the connecting conditions, while preventing the saturation of the $NH_3$-AO catalyst 204 and the $NO_x$-OR catalyst 206.

Figure 45:
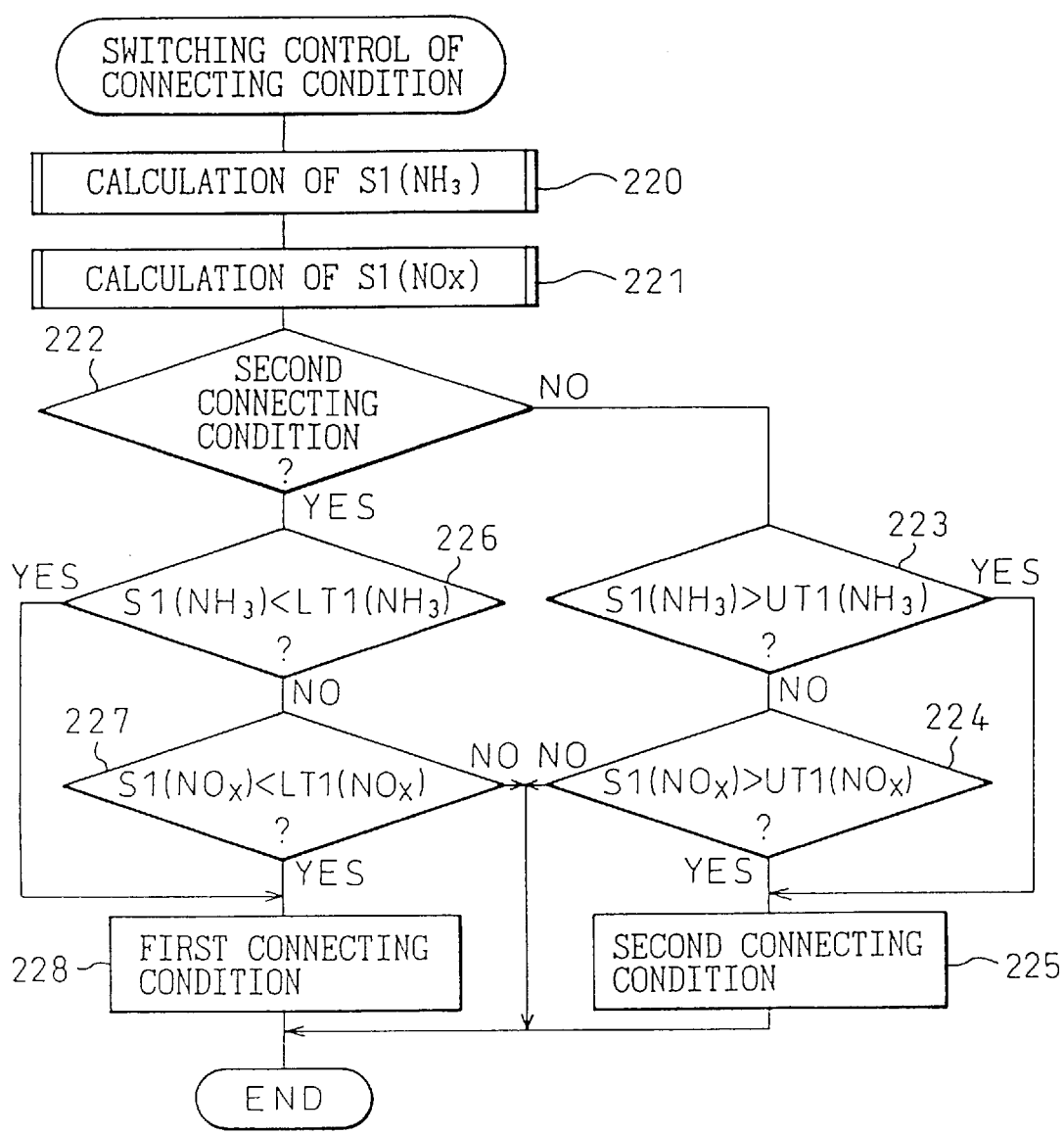
FIG. 45 is a flow chart for executing a switching control of connecting conditions according to the embodiment shown in FIG. 42.

FIG. 45 illustrates a routine for executing the switching control of the connecting conditions or the processes, according to the embodiment. The routine is executed by interruption every predetermined time.

Referring to FIG. 45, first, in step 220, the adsorbed $NH_3$ amount $S1(NH_3)$ is calculated (explained below). In the following step 221, the occluded $NO_x$ amount $S1(NO_x)$ is calculated (explained below). In the following step 222, it is judged whether the current connecting condition is the second connecting condition, that is, the desorbing, releasing, and purifying process is in process. If the current connecting condition is the first connecting condition, that is, the adsorbing and occluding process is in process, the routine goes to step 223, where it is judged whether S1(NH$_3$) is larger than the predetermined, upper threshold amount UT1(NH$_3$). If S1(NH$_3$)>UT1(NH$_3$), the routine jumps to step 225. If S1(NH$_3$)≦UT1(NH$_3$), the routine goes to step 224.

In the step 224, it is judged whether S1(NO$_x$) is larger than the predetermined, upper threshold amount UT1(NO$_x$). If S1(NO$_x$)≦UT1(NO$_x$), the processing cycle is ended. Namely, the first connecting condition or the adsorbing and occluding process is continued. If S1(NO$_x$)>UT1(NO<), the routine goes to step 225. Thus, the routine goes to step 225, when S1(NH$_3$)>UT1(NH$_3$) or when S1(NO$_x$)>UT1(NO$_x$). In the step 225, the connecting condition is changed to the second connecting condition, and the desorbing, releasing, and purifying process is started. Then, the processing cycle is ended.

If the current connecting condition is the second connecting condition, that is, the desorbing, releasing, and purifying process is in process, in step 222, the routine goes to step 226, where it is judged whether S1(NH$_3$) is smaller than the predetermined, lower threshold amount LT1(NH$_3$). If S1(NH$_3$)<LT1(NH$_3$), the routine jumps to step 228. If S1(NH$_3$)≧LT1(NH$_3$), the routine goes to step 227. In the step 227, it is judged whether S1(NO$_x$) is smaller than the predetermined, lower threshold amount LT1(NO$_x$). If S1(NO$_x$)≧LT1(NO$_x$), the processing cycle is ended. Namely, the second connecting condition or the desorbing, releasing, and purifying process is continued. If S1(NO$_x$)<LT1(NO$_x$), the routine goes to step 228. Thus, the routine goes to step 228, when S1(NH$_3$)<LT1(NH$_3$) or when SL(NO$_x$)<LT1(NO$_x$). In step 228, the connecting condition is changed to the first connecting condition, and the adsorbing and occluding process is started. Then, the processing cycle is ended.

In the step 220 in the routine shown in FIG. 45, when the connecting condition is the first connecting condition and the adsorbing and occluding process is in process, the adsorbed NH$_3$ amount S1(NH$_3$) is calculated by integrating the product of the NO$_x$ amount Qa(NO$_x$) exhausted from the first group 1a per unit time and the NH$_3$ synthesizing efficiency ETA, over time. The exhausted NO$_x$ amount Qa(NO$_x$) and the efficiency ETA are obtained using the maps shown in FIGS. 13B and 14, respectively. When the connecting condition is the second connecting condition and the desorbing, releasing, and purifying process is in process, the adsorbed NH$_3$ amount S1(NH$_3$) is calculated by integrating the NH$_3$ amount D(NH$_3$) desorbed from the NH$_3$-AO catalyst 204 per unit time, with time. The desorbed NH$_3$ amount D(NH$_3$) is obtained using the map shown in FIG. 16B.

In the step 221 in the routine shown in FIG. 45, when the connecting condition is the first connecting condition and the adsorbing and occluding process is in process, the occluded NO$_x$ amount S1(NO$_x$) is calculated by integrating the NO$_x$ amount Qb(NO$_x$) exhausted from the second group 1b per unit time, with time. The exhausted NO$_x$ amount Qb(NO$_x$) is obtained using the map shown in FIG. 6B. When the connecting condition is the second connecting condition and the desorbing, releasing, and purifying process is in process, the occluded NO$_x$ amount S1(NO$_x$) is calculated by integrating the NO$_x$ amount D(NO$_x$) released from the NO$_x$-OR catalyst 206 per unit time, over time. The released NO$_x$ amount D(NO$_x$) is obtained using the map shown in FIG. 8B.

Figure 46:
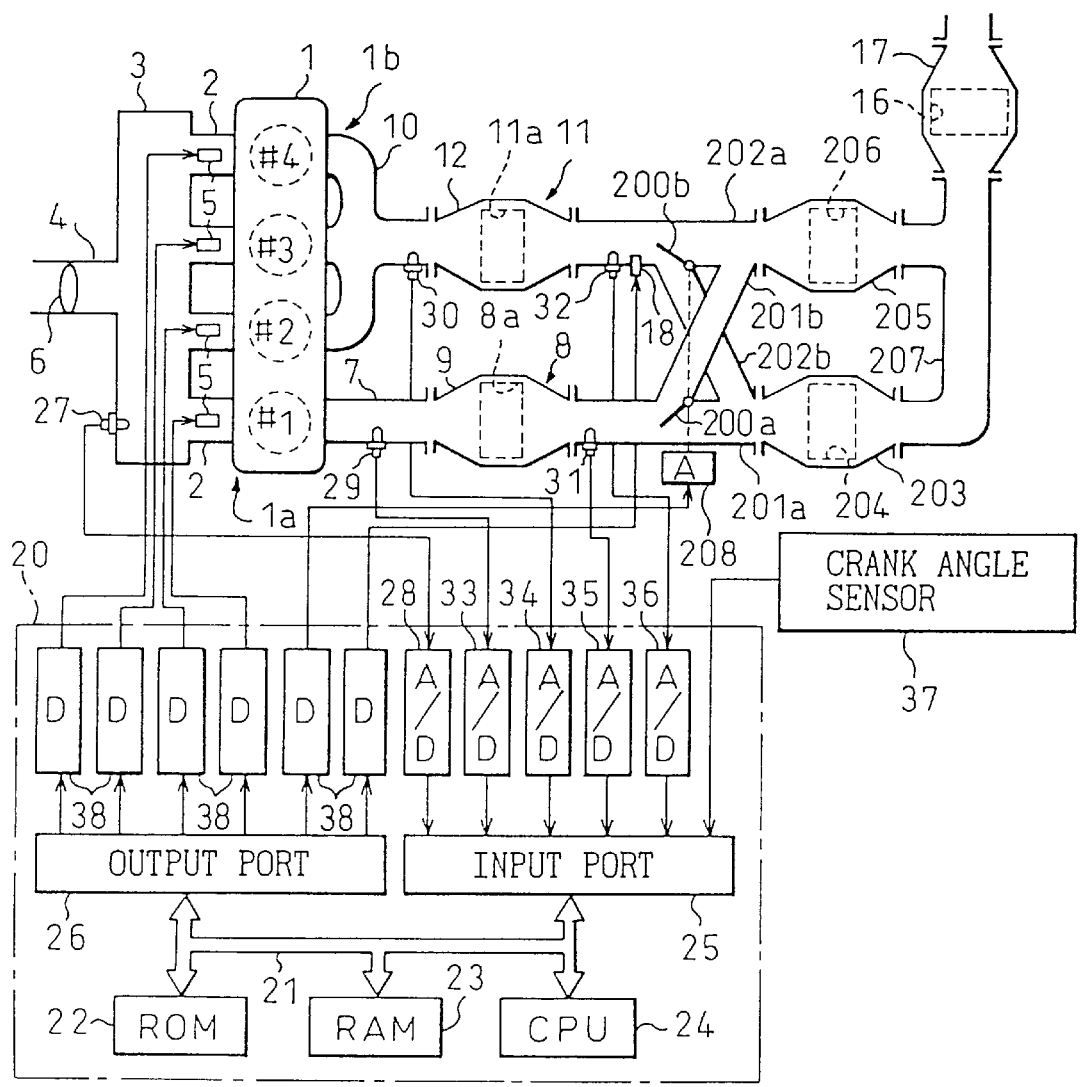
FIG. 46 is a general view of an engine, illustrating an exhaust gas purifying device according to still another embodiment.

FIG. 46 illustrates another embodiment of the exhaust gas purifying device. In FIG. 46, constituent elements the same as those in the above-mentioned embodiments are given the same reference numerals.

Referring to FIG. 46, this embodiment is different from the above embodiment shown in FIG. 42 in the point that the occlusive material is provided in the exhaust passage between the exhaust manifold 10 and the NO$_x$ switching valve 200b, and that the secondary air supplying device 18 is provided in the exhaust passage between the occlusive material 11 and the NO$_x$ switching valve 200b. Thus, the exhaust gas from the second group 1b, first, contacts the occlusive material 11, and then contacts the NH$_3$-AO catalyst 204 or the NO$_x$-OR catalyst 206.

As in the embodiment explained above with reference to FIG. 1, the occlusive material 11 is for preventing the large amount of NO$_x$ from flowing into the NH$_3$-AO catalyst 204 or the NO$_x$-OR catalyst 206. Note that, as the occlusive material 11, the NO$_x$-OR catalyst 11a is used.

In this embodiment again, the adsorbing and occluding process, and the desorbing, releasing, and purifying process are performed alternately and repeatedly. In the desorbing, releasing, and purifying process, the exhaust gas exhausted from the second group 1b and including NO$_x$ flows, via the second NO$_x$ introducing duct 202b, into the NH$_3$-AO catalyst 204. In this case, if a large amount of NO$_x$ flows into the NH$_3$-AO catalyst 204, the NO$_x$ may be excessive to the NH$_3$ desorbed from the NH$_3$-AO catalyst 204, and the excess NO$_x$ may flow out from the NH$_3$-AO catalyst 204 without being purified. Also, in the adsorbing and occluding process, the exhaust gas exhausted from the second group 1b flows, via the first NO$_x$ introducing duct 202a, into the NO$_x$-OR catalyst 206. In this case, if a large amount of NO$_x$ flows into the NO$_x$-OR catalyst 206, NO$_x$ may flow out from the NH$_3$-AO catalyst 204 without being purified, even though the NO$_x$-OR catalyst 206 has a NO$_x$ occluding ability. Thus, the occlusive material 11 is arranged between the second group 1b and the NH$_3$-AO catalyst 204 and the NO$_x$-OR catalyst 206, to thereby prevent a large amount of NO$_x$ from flowing into the NH$_3$-AO catalyst 204 and the NO$_x$-OR catalyst 206. This prevents NO$_x$ from flowing out from the catalysts 204 and 206.

The switching control of the connecting conditions of the processes are executed in accordance with the adsorbed NH$_3$ amount in the NH$_3$-AO catalyst 204 and the occluded NO$_x$ amount in the NO$_x$-OR catalyst 206, as in the above embodiment explained with reference to FIGS. 42 to 45.

As mentioned above, if the second group 1b continuously performs the lean operation, the occluded NO$_x$ amount in the NO$_x$-OR catalyst 11a becomes larger, and the NO$_x$ occluding capacity becomes smaller. Therefore, the occluded NO$_x$ amount S(NO$_x$) in the NO$_x$-OR catalyst 11 is obtained, and when the occluded NO$_x$ amount (NO$_x$) becomes larger than the upper threshold UT(NO$_x$), the second group 1b performs the rich operation temporarily to make the exhaust gas air-fuel ratio of the exhaust gas flowing into the NO$_x$-OR catalyst 11a rich, to thereby release the occluded NO$_x$ from the NO$_x$-OR catalyst 11a. This ensures the NO$_x$ occluding capacity of the NO$_x$-OR catalyst 11a. When the occluded NO$_x$ amount S(NO$_x$) becomes smaller than the lower threshold LT(NO$_x$), the second group 1b resumes the lean operation.

When the second group 1b performs the rich operation, the exhaust gas including NO$_x$, of which the exhaust gas air-fuel ratio is rich, flows out from the NO$_x$-OR catalyst 11a. On the other hand, the temporary rich operation in the second group 1b to release the occluded NO$_x$ from the NO$_x$-OR catalyst 11a is performed regardless the connecting conditions. Thus, the exhaust gas including NO$_x$, of which the exhaust gas air-fuel ratio is rich, flows into the NO$_x$-OR catalyst 206 in the adsorbing and occluding process, and into the NH$_3$-AO catalyst 204 in the desorbing, releasing, and purifying process. However, if the exhaust gas of which the exhaust gas air-fuel ratio is rich flows into the NO$_x$-OR catalyst 206 in the adsorbing and occluding process, the occluded NO$_x$ is released from the NO$_x$-OR catalyst 206, which is not desirable. If the exhaust gas of which the exhaust gas air-fuel ratio is rich flows into the NH$_3$-AO catalyst 204, NO$_x$ and NH$_3$ will not be purified on the NH$_3$-AO catalyst 204 sufficiently, even if NH$_3$ is desorbed from the catalyst 204.

Thus, in this embodiment, the secondary air supply device 18 supplies the secondary air when the second group 1b performs the rich operation, and thereby the exhaust gas air-fuel ratio of the exhaust gas flowing into the NH$_3$-AO catalyst 204 or the NO$_x$-OR catalyst 206 is kept lean. Further, the secondary air also keeps the exhaust gas air-fuel ratio of the exhaust gas flowing into the NH$_3$ purifying catalyst 16 lean. Accordingly, good purification of the exhaust gas on the catalysts is ensured.

Figure 47:
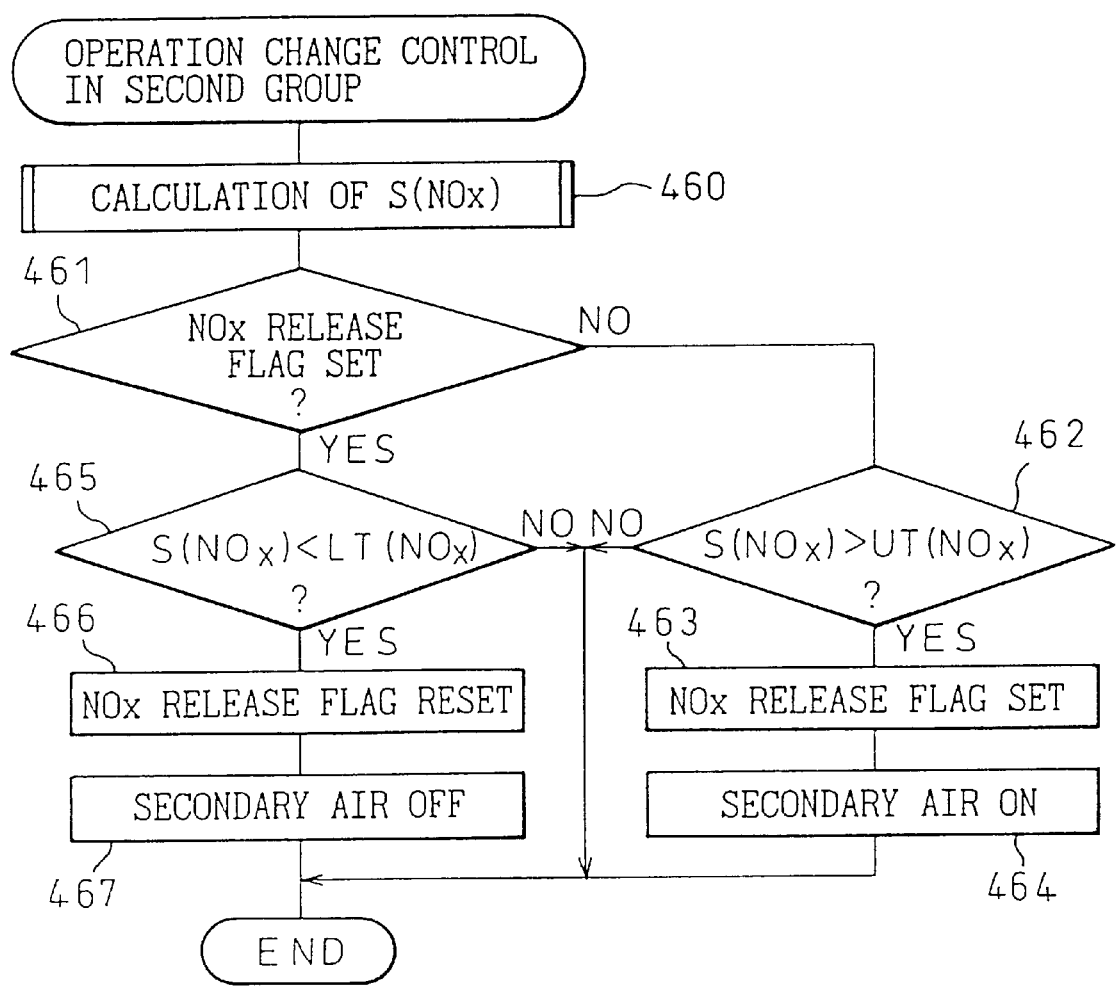
FIG. 47 is a flow chart for executing an operation change control in the second cylinder group according to the embodiment explained with FIG. 46.

FIG. 47 illustrates a routine for executing the operation change control of the second group 1b, according to the embodiment. The routine is executed by interruption every predetermined time.

Referring to FIG. 47, first, in step 460, the occluded NO$_x$ amount S(NO$_x$) in the NO$_x$-OR catalyst 11a is calculated. The method for calculating S(NO$_x$) is the same as that in the embodiments explained above, and thus the explanation thereof is omitted. In the following step 461, it is judged whether a NO$_x$ flag is set. The NO$_x$ flag is set when the second group 1b has to perform the rich operation to release the occluded NO$_x$ from the NO$_x$-OR catalyst 11a, and is reset when the second group 1b has to perform the lean operation. If the NO$_x$ release flag is reset, that is, the second group 1b has to perform the lean operation, the routine goes to step 462, where it is judged whether the occluded NO$_x$ amount S(NO$_x$) is larger than the upper threshold UT(NO$_x$). If S(NO$_x$)≦UT(NO$_x$), the processing cycle is ended. Namely, if S(NO$_x$)≦UT(NO$_x$), the NO$_x$ occluding capacity of the NO$_x$-OR catalyst h1a is judged to be still large, and thus the lean operation of the second group 1b is continued.

If S(NO$_x$)>UT(NO$_x$), the routine goes to step 463, where the NO$_x$ release flag is set. Namely, if S(NO$_x$)>UT(NO$_x$), the NO$_x$ occluding capacity of the NO$_x$-OR catalyst 11a is judged to become small. Thus, the second group 1b stops the lean operation and starts the rich operation. In the following step 464, the supply of the secondary air by the secondary air supply device 18 is started. Then, the processing cycle is ended.

If the NO$_x$ release flag is set in step 461, the routine goes to step 465, where it is judged whether the occluded NO$_x$ amount S(NO$_x$) is smaller than the lower threshold LT(NO$_x$). If S(NO$_x$)≧LT(NO$_x$), the processing cycle is ended. Namely, if S(NO$_x$)≧LT(NO$_x$), the NO$_x$ occluding capacity of the NO$_x$-OR catalyst 11a is judged to be still small, and thus the rich operation of the second group 1b is continued.

If S(NO$_x$)<LT(NO$_x$), the routine goes to step 466, where the NO$_x$ release flag is reset. Namely, if S(NO$_x$)<LT(NO$_x$), the NO$_x$ occluding capacity of the NO$_x$-OR catalyst 11a is judged to become sufficient. Thus, the second group 1b stops the rich operation and starts the lean operation. In the following step 467, the supply of the secondary air by the secondary air supply device 18 is stopped. Then, the processing cycle is ended.

Note that the other constructions of the exhaust purifying device and the operation thereof are the same as those in the embodiment explained with reference to in FIGS. 42 to 45, and thus the explanations therefor are omitted.

Figure 48:
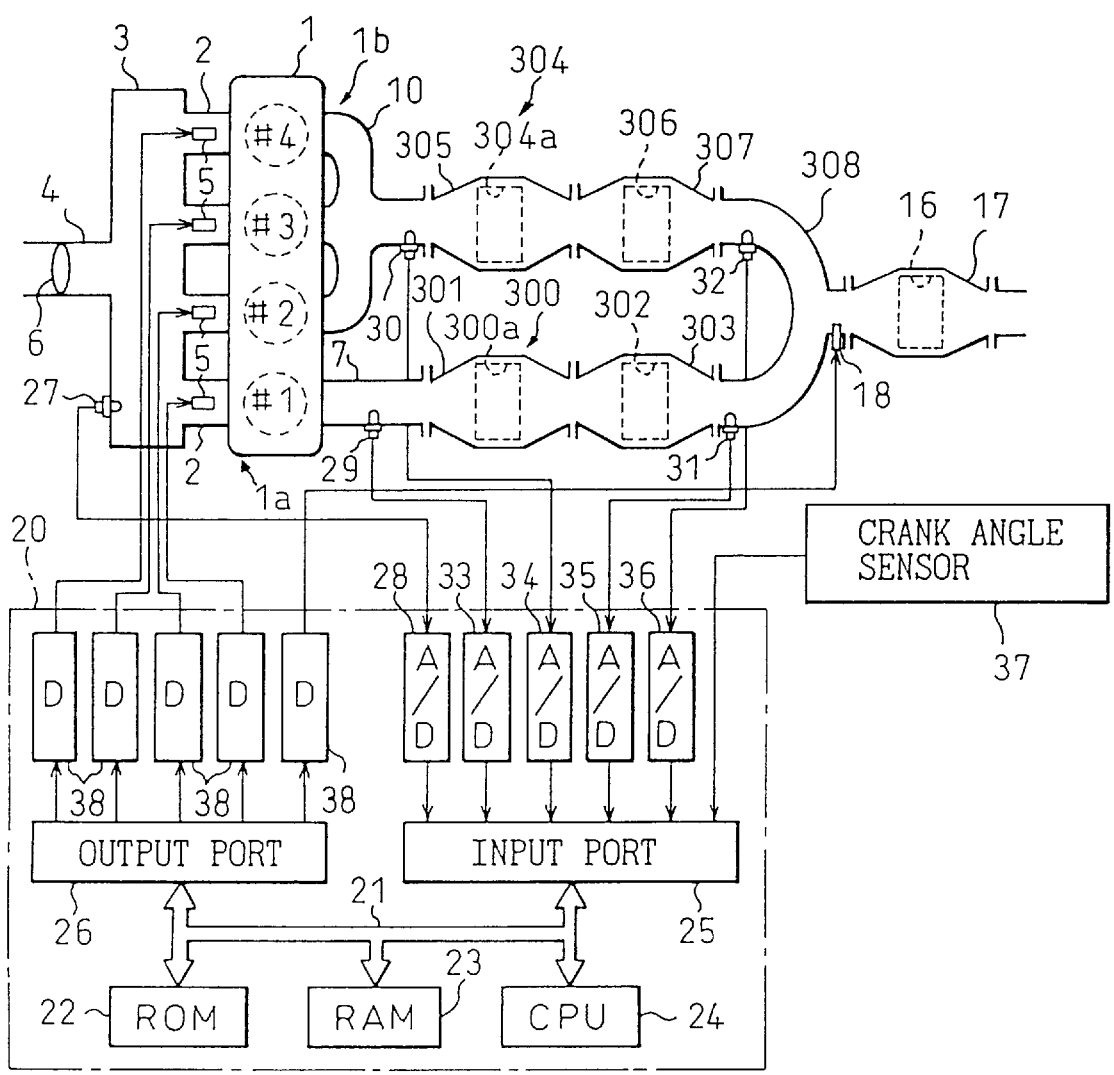
FIG. 48 is a general view of an engine, illustrating an exhaust gas purifying device according to still another embodiment.

FIG. 48 illustrates another embodiment of the exhaust gas purifying device. In FIG. 48, constituent elements the same as those in the above-mentioned embodiments are given the same reference numerals.

Referring to FIG. 48, the first group 1a is connected to a catalytic converter 301 housing a first NH$_3$ synthesizing catalyst 300 therein, and the converter 301 is connected to a catalytic converter 303 housing an NH$_3$-AO catalyst 302 therein. The second group 1b is connected to a catalytic converter 305 housing a second NH$_3$ synthesizing catalyst 304 therein, and the converter 305 is connected to a catalytic converter 307 housing a NO$_x$-OR catalyst 306 therein. The converters 303, 307 are connected, via an interconnecting duct 308, to the catalytic converter 17 housing the NH$_3$ purifying catalyst 16. Further, as shown in FIG. 48, the air-fuel ratio sensor 31 for controlling the engine air-fuel ratio of the first group 1a is arranged in the interconnecting duct 308 just downstream of the NH$_3$-AO catalyst 302, and the air-fuel ratio sensor 32 for controlling the engine air-fuel ratio of the second group 1b is arranged in the interconnecting duct 308 just downstream of the NO$_x$-OR catalyst 306.

The first and the second NH$_3$ synthesizing catalysts 300a and 304a are provided with the TW catalysts, respectively. The TW catalysts 300a and 304a, the NH$_3$-AO catalyst 302, and the NO$_x$-OR catalyst 306 are formed as in the embodiments mentioned above, and the explanation thereof are omitted.

Figure 49:
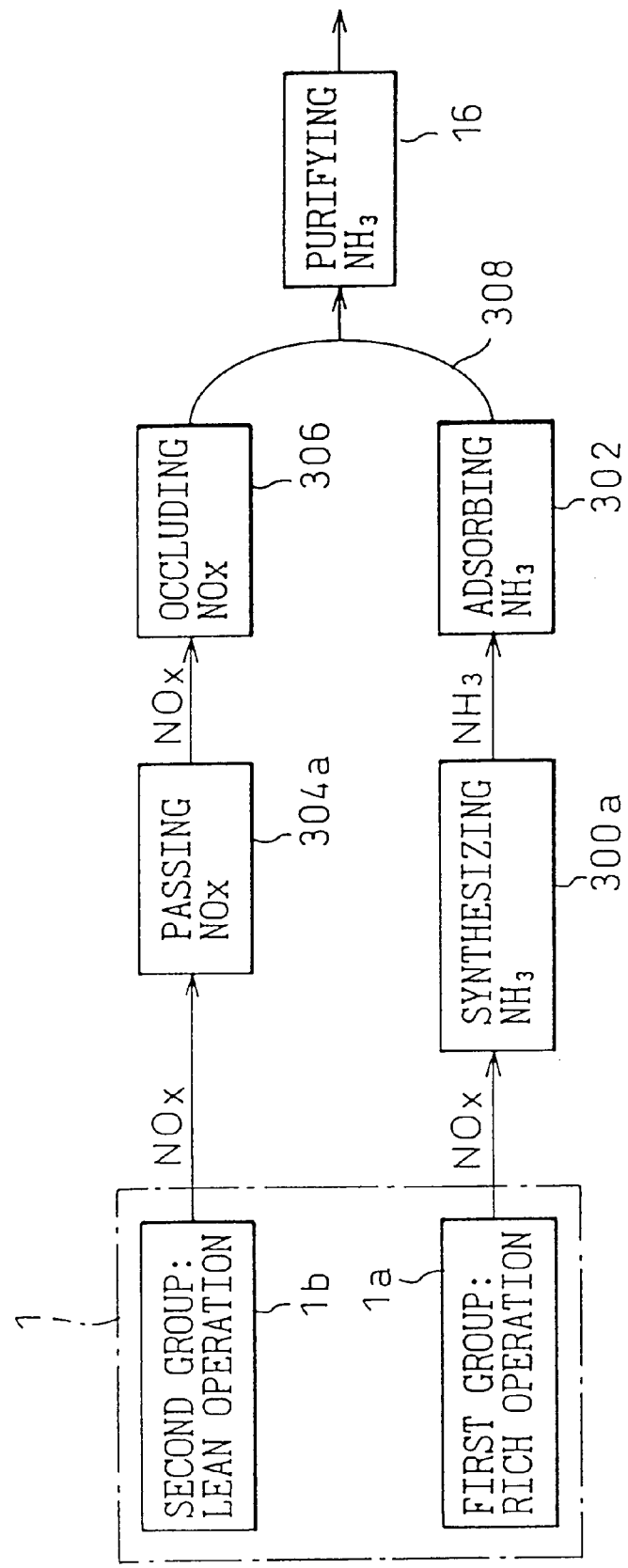
FIGS. 49 and 50 schematically illustrate the exhaust gas purifying method in the engine shown in FIG. 48.

Next, the exhaust gas purifying method in this embodiment will be explained, with reference to FIGS. 49 and 50.

In this embodiment, the adsorbing and occluding process and the desorbing, releasing, and purifying process are performed alternately and repeatedly. First, the adsorbing and occluding process will be explained with reference to FIG. 49.

In the adsorbing and occluding process, the first group 1a performs the rich operation to make the exhaust gas air-fuel ratio of the exhaust gas flowing into the TW catalyst 300a rich. The NO$_x$ exhausted from the first group 1a flows into the TW catalyst 300a and is converted to NH$_3$. The NH$_3$ then flows into the NH$_3$-AO catalyst 302 and is adsorbed therein.

The second group 1b performs the lean operation to make the exhaust gas air-fuel ratio of the exhaust gas flowing into the TW catalyst 304a and the NO$_x$-OR catalyst 306 lean. The NO$_x$ exhausted from the second group 1b passes through the TW catalyst 304a without being converted to NH$_3$, and then flows into the NO$_x$-OR catalyst 306, and is occluded therein. Such a condition of the exhaust gas air-fuel ratio, in which the exhaust gas air-fuel ratio of the exhaust gas flowing into the TW catalyst 300a is made rich and that of the exhaust gas flowing into the TW catalyst 304a is made lean, is referred as a first exhaust gas air-fuel ratio condition.

Figure 50:
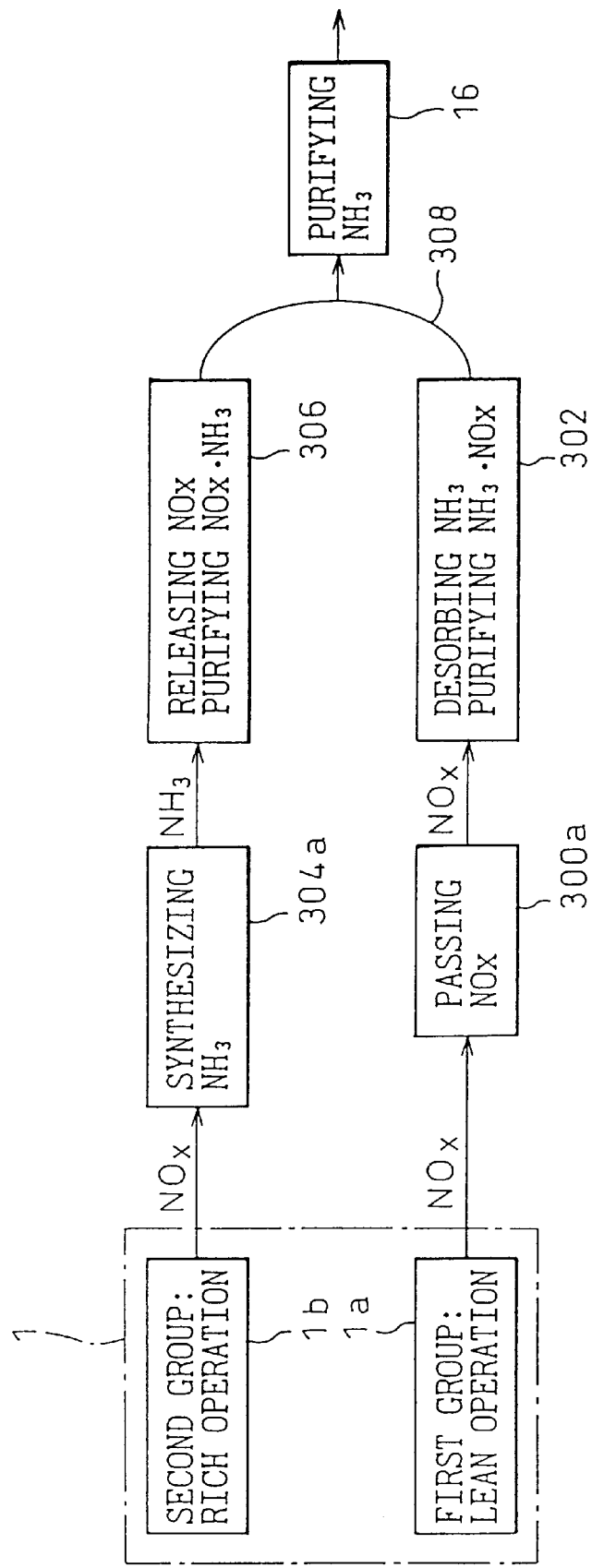

Contrarily, in the desorbing, releasing, and purifying process, as shown in FIG. 50, the first group 1a performs the lean operation to make the exhaust gas air-fuel ratio of the exhaust gas flowing into the TW catalyst 300a lean. The NO$_x$ exhausted from the first group 1a passes through the TW catalyst 300a without being converted to NH$_3$, and then flows into the NH$_3$-AO catalyst 302. As a result, the absorbed NH$_3$ is desorbed therefrom, and is reduced the inflowing NO$_x$. Thus, NO$_x$ and NH$_3$ are purified.

The second group 1b performs the rich operation to make the exhaust gas air-fuel ratio of the exhaust gas flowing into the TW catalyst 304a and the NO$_x$-OR catalyst 306 rich. The NO$_x$ exhausted from the second group 1b flows into the TW catalyst 304a and is converted to NH$_3$. The NH$_3$ then flows into the NH$_3$-AO catalyst 306. The exhaust gas air-fuel ratio of the inflowing exhaust gas is rich, and the occluded NO$_x$ is released from the $NO_x$-OR catalyst 306, the released $NO_x$ is reduced by the inflowing $NH_3$. Such a condition of the exhaust gas air-fuel ratio, in which the exhaust gas air-fuel ratio of the exhaust gas flowing into the TW catalyst 300*a* is made lean and that of the exhaust gas flowing into the TW catalyst 304*a* is made rich, is referred as a second exhaust gas air-fuel ratio condition.

The $NH_3$ flowing out from the $NH_3$-AO catalyst 302 without being adsorbed or purified, or flowing out from the $NO_x$-OR catalyst 306 without being purified, is purified on the following $NH_3$ purifying catalyst 16. Accordingly, $NH_3$ is prevented from flowing out from the $NH_3$ purifying catalyst 16, regardless the process being in process.

Namely, the exhaust gas can be purified by performing the adsorbing and occluding process, and the desorbing, releasing, and purifying process, alternately and repeatedly.

A switching control of the processes, that is, a switching control of the exhaust gas air-fuel ratio conditions may be executed in accordance with the $NH_3$ amount $S2(NH_3)$ adsorbed in the $NH_3$-AO catalyst 302, and/or the $NO_x$ amount $S2(NO_x)$ occluded in the $NO_x$-OR catalyst 306, as in the above embodiment.

Figure 51:
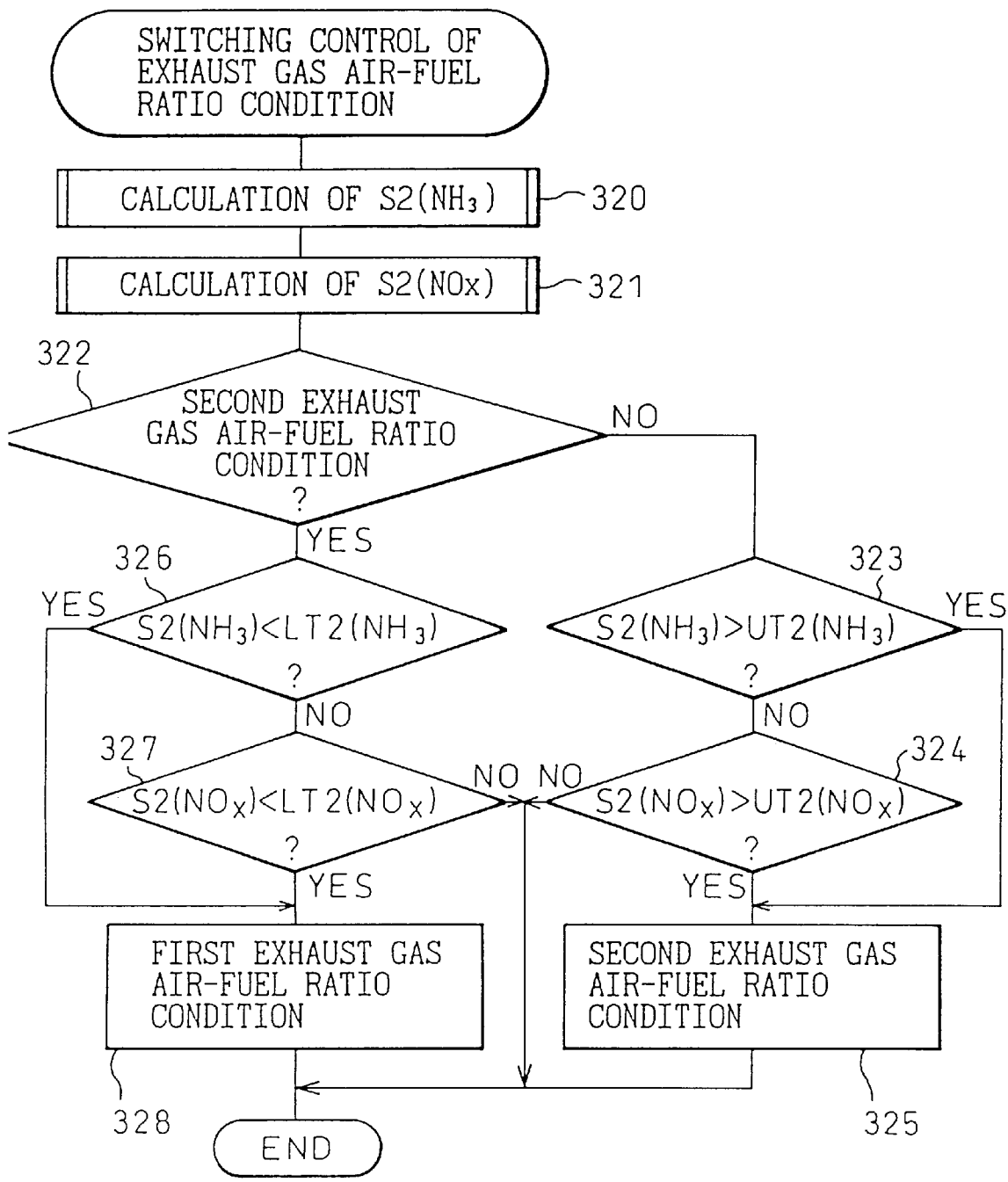
FIG. 51 is a flow chart for executing a switching control of exhaust gas air-fuel ratio conditions, according to the embodiment explained with FIG. 48.

FIG. 51 illustrates a routine for executing the switching control of the exhaust gas air-fuel ratio conditions or the processes, according to the embodiment. The routine is executed by interruption every predetermined time.

Referring to FIG. 51, first, in step 320, the adsorbed $NH_3$ amount $S2(NH_3)$ is calculated, as in the same manner for calculating $S1(NH_3)$. In the following step 321, the occluded $NO_x$ amount $S2(NO_x)$ is calculated, as in the same manner for calculating $S1(NO_x)$. In the following step 322, it is judged whether the current exhaust gas air-fuel ratio condition is the second exhaust gas air-fuel ratio condition, that is, the desorbing, releasing, and purifying process is in process. If the current exhaust gas air-fuel ratio condition is the first exhaust gas air-fuel ratio condition, that is, the adsorbing and occluding process is in process, the routine goes to step 323, where it is judged whether $S2(NH_3)$ is larger than the predetermined upper threshold amount $UT2(NH_3)$. If $S2(NH_3)>UT2(NH_3)$, the routine jumps to step 325. If $S2(NH_3) \leq UT2(NH_3)$, the routine goes to step 324.

In step 324, it is judged whether $S2(NO_x)$ is larger than the predetermined, upper threshold amount $UT2(NO_x)$. If $S2(NO_x) \leq UT2(NO_x)$, the processing cycle is ended. Namely, the first exhaust gas air-fuel ratio condition or the adsorbing and occluding process is continued. If $S2(NO_x)>UT2(NO_x)$, the routine goes to step 325. Thus, the routine goes to step 325, when $S2(NH_3)>UT2(NH_3)$ or when $S2(NO_x)>UT2(NO_x)$. In the step 325, the exhaust gas air-fuel ratio condition is changed to the second exhaust gas air-fuel ratio condition, and the desorbing, releasing, and purifying process is started. Then, the processing cycle is ended.

If the current exhaust gas air-fuel ratio condition is the second exhaust gas air-fuel ratio condition, that is, the desorbing, releasing, and purifying process is in process, in step 322, the routine goes to step 326, where it is judged whether $S2(NH_3)$ is smaller than the predetermined, lower threshold amount $LT2(NH_3)$. If $S2(NH_3)<LT2(NH_3)$, the routine jumps to step 328. If $S2(NH_3) \geq LT2(NH_3)$, the routine goes to step 327. In the step 327, it is judged whether $S2(NO_x)$ is smaller than the predetermined, lower threshold amount $LT2(NO_x)$. If $S2(NO_x) \geq LT2(NO_x)$, the processing cycle is ended. Namely, the second exhaust gas air-fuel ratio condition or the desorbing, releasing, and purifying process is continued. If $S2(NO_x)<LT2(NO_x)$, the routine goes to step 328. Thus, the routine goes to step 328, when $S2(NH_3)<LT2(NH_3)$ or when $S2(NO_x)<LT2(NO_x)$. In the step 328, the exhaust gas air-fuel ratio condition is changed to the first exhaust gas air-fuel ratio condition, and the adsorbing and occluding process is started. Then, the processing cycle is ended.

Figure 52:
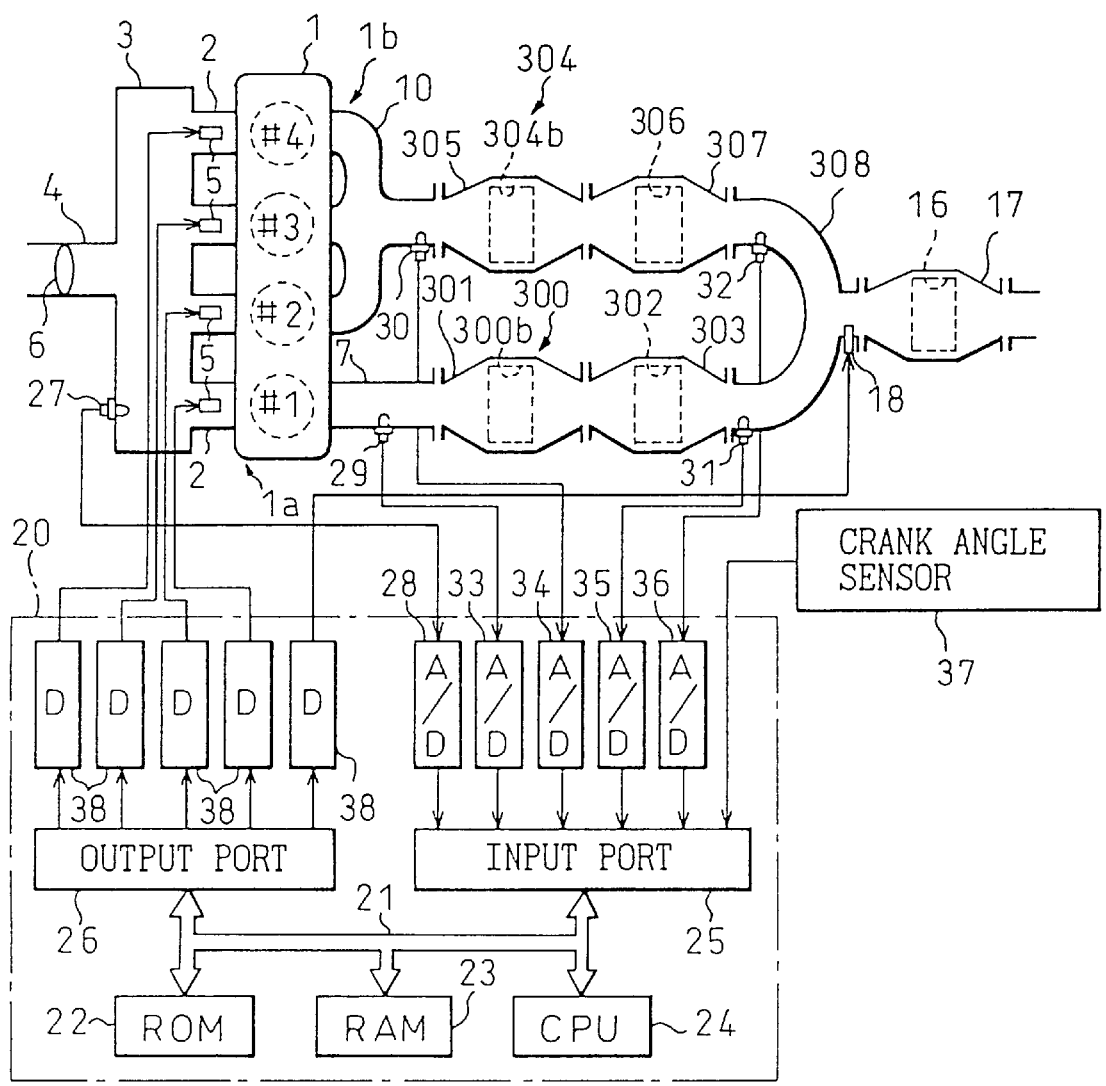
FIG. 52 is a general view of an engine, illustrating an alternative embodiment of the embodiment shown in FIG. 48.

FIG. 52 illustrates another embodiment of the exhaust gas purifying device shown in FIG. 48. In this embodiment, the first and the second $NH_3$ synthesizing catalysts 300 and 304 are formed by the $NO_x$-OR catalysts 300*b* and 304*b*, respectively. This is a difference between the embodiment shown in FIG. 48 and this embodiment.

As mentioned above, the $NO_x$-OR catalyst synthesizes $NH_3$ from the inflowing $NO_x$, when the exhaust gas air-fuel ratio of the inflowing exhaust gas is rich. Thus, the $NO_x$-OR catalysts 300*b* and 304*b* constitute the $NH_3$ synthesizing catalysts 8 and the occlusive materials 11, respectively. To clarify, such $NO_x$-OR catalysts 300*b* and 304*b* are referred to as a $NO_x$ occluding and $NH_3$ synthesizing ($NO_x$—$NH_3$) catalysts, hereinafter.

To perform the adsorbing and occluding process, when the first group 1*a* performs the rich operation and the exhaust gas air-fuel ratio of the exhaust gas flowing into the $NO_x$—$NH_3$ catalyst 300*b* is made rich, the inflowing $NO_x$ is converted to $NH_3$ on the $NO_x$—$NH_3$ catalyst 300*b*, and the $NH_3$ flows into and is adsorbed in the $NH_3$-AO catalyst 302. Also, to perform the adsorbing and occluding process, when the second group 1*b* performs the lean operation and the exhaust gas air-fuel ratio of the exhaust gas flowing into the $NO_x$—$NH_3$ catalyst 304*b* is made lean, some of the inflowing $NO_x$ is partly occluded into the $NO_x$—$NH_3$ catalyst 304*b*, and the other flows into and is occluded in the $NO_x$-OR catalyst 306. Thus, the $NO_x$ amount flowing into the $NO_x$-OR catalyst 306 is suppressed. Further, $NO_x$ is prevented from flowing out from the $NO_x$-OR catalyst 306, in the adsorbing and occluding process.

To perform the desorbing, releasing, and purifying process, when the first group 1*a* performs the lean operation and the exhaust gas air-fuel ratio of the exhaust gas flowing into the $NO_x$—$NH_3$ catalyst 300*b* is made lean, some of the inflowing $NO_x$ is partly occluded into the $NO_x$—$NH_3$ catalyst 300*b*, and the other flows into the $NH_3$-AO catalyst 302 and is reduced by the desorbed $NH_3$ from the $NH_3$-AO catalyst 302. Also, to perform the desorbing, releasing, and purifying process, when the second group 1*b* performs the rich operation and the exhaust gas air-fuel ratio of the exhaust gas flowing into the $NO_x$—$NH_3$ catalyst 304*b* is made rich, the inflowing $NO_x$ is converted to $NH_3$ on the $NO_x$—$NH_3$ catalyst 304*b*. The $NH_3$ flows into the $NO_x$-OR catalyst 306, and reduces $NO_x$ released from the $NO_x$-OR catalyst 306. Thus, the $NO_x$ amount flowing into the $NH_3$-AO catalyst 302 is suppressed. Further, $NO_x$ is prevented from flowing out from the $NH_3$-AO catalyst 302, in the desorbing, releasing, and purifying process.

Accordingly, the exhaust gas can be purified sufficiently by performing the adsorbing and occluding process, and the desorbing, releasing, and purifying process, alternately and repeatedly.

Note that, in the adsorbing and occluding process, the occluded $NO_x$ is released from the $NO_x$—$NH_3$ catalyst 300*b*, because the exhaust gas air-fuel ratio of the inflowing exhaust gas is rich. In the same manner, in the desorbing, releasing, and purifying process, the occluded $NO_x$ is released from the $NO_x$—$NH_3$ catalyst 304*b*. It is considered that the released $NO_x$ is reduced or converted to $NH_3$ on the $NO_x$—$NH_3$ catalyst 300*b* or the $NO_x$—$NH_3$ catalyst 304*b*.

On the other hand, if the adsorbing and occluding process is continued, that is, the first exhaust gas air-fuel ratio condition is continued, the occluded $NO_x$ amount in the $NO_x$—$NH_3$ catalyst 304b becomes larger, and the $NO_x$ occluding capacity becomes smaller. Therefore, in the first exhaust gas air-fuel ratio condition, the second group 1b temporarily performs the lean operation to release the occluded $NO_x$ from the $NO_x$—$NH_3$ catalyst 304b. In the same manner, in the second exhaust gas air-fuel ratio condition, the first group 1a temporarily performs the lean operation to release the occluded $NO_x$ from the $NO_x$—$NH_3$ catalyst 300b. This ensures the $NO_x$ occluding capacity of the $NO_x$—$NH_3$ catalysts 300b and 304b, and preventing the $NH_3$-AO catalyst 302 and the $NO_x$-OR catalyst 306 from flowing into a large amount of $NO_x$.

However, if the second group 1b temporarily performs the rich operation in the first exhaust gas air-fuel ratio condition, the exhaust gas air-fuel ratio of the exhaust gas flowing into the $NH_3$ purifying catalyst 16 is made rich, due to the rich operation of the first group 1a. Also, if the first group 1a temporarily performs the rich operation in the second exhaust gas air-fuel ratio condition, the exhaust gas air-fuel ratio of the exhaust gas flowing into the $NH_3$ purifying catalyst 16 is made rich, due to the rich operation of the second group 1b. Therefore, the secondary air supplying device 18 is provided to keep the exhaust gas air-fuel ratio of the exhaust gas flowing into the $NH_3$ purifying catalyst 16 lean, even when the occluded $NO_x$ is to be released from the $NO_x$—$NH_3$ catalysts 300b and 304b.

In the above-mentioned embodiments, the upper and lower thresholds for the $NO_x$-OR catalysts $UT(NO_x)$, $UT1(NO_x)$, $UT2(NO_x)$, $LT(NO_x)$, $LT1(NO_x)$, $LT2(NO_x)$, the upper and lower thresholds for the $NH_3$-AO catalysts $UT(NH_3)$, $UT1(NH_3)$, $UT2(NH_3)$, $LT(NH_3)$, $LT1(NH_3)$, $LT2(NH_3)$ may be determined in accordance with the characteristic, the component, or the volume of the corresponding catalyst, or the flow rate or the exhaust gas air-fuel ratio of the flowing exhaust gas into the corresponding catalyst, or the engine operating condition. The thresholds may be changed if required.

Further, the deterioration of the catalyst(s) located between the sensors 29 and 31 or between the sensors 30 and 32 may be detected on the basis of the output signals from the sensors 29 and 31 or those from the sensors 30 and 32. Namely, in the embodiment shown in FIG. 1, for example, the deterioration of the TW catalyst 8a can be detected on the basis of the output signals from the sensors 29 and 31. Or, in the embodiment shown in FIG. 39, the deterioration of the $NO_x$-OR catalyst 300b and the $NH_3$-AO catalyst 302 can be detected on the basis of the output signals from the sensors 29 and 31, and that of the $NO_x$—$NH_3$ catalysts 304b and 306 can be detected on the basis of the output signals from the sensors 30 and 32.

Further, an air-fuel ratio sensor may be arranged in the exhaust passage close to the inlet or the outlet of the $NH_3$ purifying catalyst 16 for detecting the exhaust gas air-fuel ratio sensor of the exhaust gas flowing into the catalyst 16, and the secondary air supplying device may be controlled in accordance with the output signals from the sensor to keep the catalyst 16 under the oxidizing atmosphere.

Further, the rich air-fuel ratio (A/F)R with which the first or the second group 1a, 1b performs the rich operation, and the lean air-fuel ratio (A/F)L with which the first or the second group 1a, 1b performs the lean operation may be determined in accordance with the fuel consumption rate, the engine output torque, or the synthesized $NH_3$ amount, etc., in addition to the engine operating condition such as the engine load and the engine speed.

Finally, the first cylinder group 1a may be constructed from the plurality of the cylinders, and the second cylinder groups 1b may be constructed from the single cylinder, while the first group 1a is constructed from the single cylinder and the second group 1b is constructed from three cylinders, in the above-mentioned embodiments. However, lower fuel consumption rate is preferable, and thus the second group 1b, in which the lean operation is basically performed, is preferably constructed from the many cylinders as possible. Note that, when the first group 1a is constructed from the plurality of the cylinders, the target values (A/F)T for the engine air-fuel ratio of the cylinders are made identical to each other.

According to the present invention, it is possible to provide a method and a device for purifying an exhaust gas of an engine which can suppress the amount of $NO_x$ flowing into the exhaust gas purifying catalyst with respect to that of $NH_3$, to thereby purify the exhaust gas sufficiently.

While the invention has been described by reference to specific embodiments chosen for purposes of illustration, it should be apparent that numerous modifications could be made thereto by those skilled in the art without departing from the basic concept and scope of the invention.

We claim:

1. A method for purifying an exhaust gas of an engine having a plurality of cylinders divided into first and second cylinder groups, the method comprising:

making an exhaust gas air-fuel ratio of the exhaust gas of the first cylinder group rich, and introducing the exhaust gas to an $NH_3$ synthesizing catalyst to synthesize $NH_3$, the $NH_3$ synthesizing catalyst synthesizing $NH_3$ from $NO_x$ in the $NH_3$ synthesizing catalyst when the exhaust gas air-fuel ratio of the inflowing exhaust gas is rich;

introducing the exhaust gas of the first cylinder group including $NH_3$ and the exhaust gas of the second cylinder group including $NO_x$, together, to an exhaust gas purifying catalyst; and controlling an amount of $NO_x$ included in the exhaust gas of the second cylinder group and to be introduced to the exhaust gas purifying catalyst to prevent the $NO_x$ amount from being larger than a $NO_x$ amount which can be reduced by the $NH_3$ included in the exhaust gas of the first cylinder group and to be introduced to the exhaust gas purifying catalyst, wherein, on the exhaust gas purifying catalyst, the inflowing $NO_x$ is reduced by the inflowing $NH_3$.

2. A method according to claim 1, wherein the $NO_x$ amount included in the exhaust gas of the second cylinder group and to be introduced to the exhaust gas purifying catalyst is controlled by contacting the exhaust gas with an occlusive material for occluding $NO_x$ in the inflowing exhaust gas.

3. A method according to claim 2, wherein the occlusive material comprises a $NO_x$ occluding and reducing ($NO_x$-OR) catalyst, occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich, and wherein the method further comprises controlling the exhaust gas air-fuel ratio of the exhaust gas flowing into the $NO_x$-OR catalyst to make the exhaust gas air-fuel ratio lean to occlude the inflowing $NO_x$ partly in the $NO_x$-OR catalyst, and the exhaust gas air-fuel ratio rich to release the occluded $NO_x$ from the $NO_x$-OR catalyst and reduce the $NO_x$, alternately and repeatedly.

4. A method according to claim 3, further comprising estimating an amount of $NO_x$ occluded in the $NO_x$-OR catalyst, wherein the exhaust gas air-fuel ratio of the exhaust gas flowing into the $NO_x$-OR catalyst is made lean and rich alternately and repeatedly, in accordance with the estimated occluded $NO_x$ amount.

5. A method according to claim 3, further comprising introducing the exhaust gas of the second cylinder group to a three way (TW) catalyst, prior to introducing the exhaust gas to the $NO_x$-OR catalyst.

6. A method according to claim 3, wherein the second cylinder group has a plurality of cylinders divided into a plurality of cylinder subgroups, each subgroup being connected to the exhaust gas purifying catalyst via corresponding $NO_x$-OR catalysts, wherein the exhaust gas air-fuel ratio of the exhaust gas flowing into each $NO_x$-OR catalyst is controlled to keep the exhaust gas air-fuel ratio of the exhaust gas flowing from the $NO_x$-OR catalysts to the exhaust gas purifying catalyst lean.

7. A method according to claim 3, wherein the exhaust gas air-fuel ratio of the exhaust gas flowing into the $NO_x$-OR catalyst is controlled by controlling the engine air-fuel ratio of the second cylinder group.

8. A method according to claim 3, wherein the $NO_x$-OR catalyst includes: at least one substance selected from alkali metals such as potassium, sodium, lithium, and cesium, alkali earth metals including barium and calcium, rare earth metals including lanthanum and yttrium, and transition metals including iron and copper; and precious metals such as palladium, platinum, iridium, and rhodium.

9. A method according to claim 1, wherein the $NO_x$ amount included in the exhaust gas of the second cylinder group and to be introduced to the exhaust gas purifying catalyst is controlled by controlling the $NO_x$ amount exhausted from the second cylinder group.

10. A method according to claim 9, wherein the engine air-fuel ratio of the second cylinder group is controlled to control the exhausted $NO_x$ amount.

11. A method according to claim 9, wherein the number of the operating cylinder(s) in the second cylinder group is controlled to control the exhausted $NO_x$ amount.

12. A method according to claim 1, further comprising introducing the exhaust gas of the first and the second cylinder groups, together, to an adsorbent for adsorbing $NH_3$ in the inflowing exhaust gas therein, prior to or simultaneously introducing the exhaust gas to the exhaust gas purifying catalyst.

13. A method according to claim 12, wherein the $NH_3$ synthesizing catalyst synthesizes almost no $NH_3$ from $NO_x$ in the $NH_3$ synthesizing catalyst when the exhaust gas air-fuel ratio of the inflowing exhaust gas is lean, wherein the adsorbent comprises an $NH_3$ adsorbing and oxidizing ($NH_3$-AO) catalyst adsorbing $NH_3$ in the inflowing exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the inflowing exhaust gas includes $NO_x$ therein and the exhaust gas air-fuel ratio of the inflowing exhaust gas is lean, wherein the method further comprises controlling the exhaust gas air-fuel ratio of the exhaust gas flowing into the $NH_3$ synthesizing catalyst to make the exhaust gas air-fuel ratio lean temporarily to stop feeding $NH_3$ to the $NH_3$-AO catalyst, to thereby decrease the amount of $NH_3$ adsorbed in the $NH_3$-AO catalyst.

14. A method according to claim 13, further comprising estimating an amount of $NH_3$ adsorbed in the $NH_3$-AO catalyst, wherein the exhaust gas air-fuel ratio of the exhaust gas flowing into the $NH_3$ synthesizing catalyst is made lean in accordance with the estimated adsorbed $NH_3$ amount.

15. A method according to claim 13, wherein the $NH_3$-AO catalyst comprises a solid acid including zeolite, silica, silica-alumina, and titania, carrying a transition metal including copper, chrome, vanadium, titanium, iron, nickel, and one of cobalt and a precious metal including platinum, palladium, rhodium and iridium.

16. A method according to claim 1, wherein the exhaust gas air-fuel ratio of the exhaust gas flowing the $NH_3$ synthesizing catalyst is controlled by controlling the engine air-fuel ratio of the first cylinder group.

17. A method according to claim 1, wherein the exhaust gas purifying catalyst performs the purifying operation thereof when the exhaust gas air-fuel ratio of the inflowing exhaust gas is lean, and wherein the method further comprises keeping the exhaust gas air-fuel ratio of the exhaust gas mixture flowing into the exhaust gas purifying catalyst lean.

18. A method according to claim 17, wherein the exhaust gas air-fuel ratio of the exhaust gas mixture flowing into the exhaust gas purifying catalyst is kept lean by supplying a secondary air into the exhaust gas flowing into the exhaust gas purifying catalyst.

19. A method according to claim 1, wherein the $NH_3$ synthesizing catalyst is a three-way (TW) catalyst including at least one precious metal such as palladium, platinum, iridium, and rhodium.

20. A method according to claim 1, wherein the exhaust gas purifying catalyst comprises a plurality of catalysts arranged, in series, in the interconnecting passage.

21. A method according to claim 20, further comprising guiding the exhaust gas to be introduced into the exhaust gas purifying catalyst to force the exhaust gas to contact all the catalysts when the temperature of the inflowing exhaust gas is low, and to force the exhaust gas to bypass at least one of the catalysts when the temperature of the inflowing exhaust gas is high.

22. A method according to claim 1, further comprising introducing the exhaust gas, exhausted from the exhaust gas purifying catalyst, to an $NH_3$ purifying catalyst for purifying $NH_3$ in the inflowing exhaust gas.

23. A device for purifying an exhaust gas of an engine having a plurality of cylinders divided into first and second cylinder groups, and first and second exhaust passage connected to the first and the second cylinder groups, respectively, the device comprising:

an $NH_3$ synthesizing catalyst arranged in the first exhaust passage, the $NH_3$ synthesizing catalyst synthesizing $NH_3$ from $NO_x$ in the $NH_3$ synthesizing catalyst when the exhaust gas air-fuel ratio of the inflowing exhaust gas is rich;

an interconnecting exhaust passage interconnecting the first passage downstream of the $NH_3$ synthesizing catalyst and the second exhaust passage;

an exhaust gas purifying catalyst arranged in the interconnecting passage for reducing the inflowing $NO_x$ by the inflowing $NH_3$;

first exhaust gas air-fuel ratio control means for controlling the exhaust gas air-fuel ratio of the exhaust gas flowing into the $NH_3$ synthesizing catalyst;

means for controlling the first exhaust gas air-fuel ratio control means to make the exhaust gas air-fuel ratio of the exhaust gas flowing into the $NH_3$ synthesizing catalyst rich to synthesize $NH_3$; and $NO_x$ amount control means for controlling an amount of $NO_x$ flowing from the second exhaust passage into the exhaust gas purifying catalyst to prevent the $NO_x$ amount from being larger than a $NO_x$ amount which can be reduced by the $NH_3$ flowing from the first exhaust passage into the exhaust gas purifying catalyst, wherein, on the exhaust gas purifying catalyst, the inflowing $NO_x$ is reduced by the inflowing $NH_3$.

24. A device according to claim 23, wherein the $NO_x$ amount control means comprises an occlusive material arranged in the second exhaust passage for occluding $NO_x$ in the inflowing exhaust gas.

25. A device according to claim 24, wherein the occlusive material comprises a $NO_x$ occluding and reducing ($NO_x$-OR) catalyst, occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich, and wherein the device further comprises second exhaust gas air-fuel ratio control means for controlling the exhaust gas air-fuel ratio of the exhaust gas flowing into the $NO_x$-OR catalyst, and $NO_x$ occlusion control means for controlling the second exhaust gas air-fuel ratio control means to make the exhaust gas air-fuel ratio of the exhaust gas flowing into the $NO_x$-OR catalyst lean to occlude the inflowing $NO_x$ partly in the $NO_x$-OR catalyst, and the exhaust gas air-fuel ratio rich to release the occluded $NO_x$ from the $NO_x$-OR catalyst and reduce the $NO_x$, alternately and repeatedly.

26. A device according to claim 25, further comprising occluded $NO_x$ amount estimating means for estimating an amount of $NO_x$ occluded in the $NO_x$-OR catalyst, wherein the $NO_x$ occlusion control means makes the exhaust gas air-fuel ratio of the exhaust gas flowing into the $NO_x$-OR catalyst lean and rich alternately and repeatedly, in accordance with the estimated occluded $NO_x$ amount.

27. A device according to claim 25, further comprising a three way (TW) catalyst arranged in the second exhaust passage upstream of the $NO_x$-OR catalyst.

28. A device according to claim 25, wherein the second cylinder group has a plurality of the cylinders divided into a plurality of cylinder subgroups, each subgroup being connected to the exhaust gas purifying catalyst via corresponding $NO_x$-OR catalysts, wherein the $NO_x$ occlusion control means controls the exhaust gas air-fuel ratio of the exhaust gas flowing into each $NO_x$-OR catalyst to keep the exhaust gas air-fuel ratio of the exhaust gas flowing from the second passage to the exhaust gas purifying catalyst lean.

29. A device according to claim 25, wherein the second exhaust gas air-fuel ratio control means controls the exhaust gas air-fuel ratio of the exhaust gas flowing into the $NO_x$-OR catalyst by controlling the engine air-fuel ratio of the second cylinder group.

30. A device according to claim 25, wherein the $NO_x$-OR catalyst includes: at least one substance selected from alkali metals such as potassium, sodium, lithium, and cesium, alkali earth metals including barium and calcium, rare earth metals including lanthanum and yttrium, and transition metals including iron and copper; and precious metals including palladium, platinum, iridium, and rhodium.

31. A device according to claim 23, wherein the $NO_x$ amount control means comprises an exhausted $NO_x$ amount control means for controlling a $NO_x$ amount exhausted from the second cylinder group into the second exhaust passage, the $NO_x$ amount control means controlling the $NO_x$ amount flowing from the second exhaust passage into the exhaust gas purifying catalyst by controlling the $NO_x$ amount exhausted from the second cylinder group.

32. A device according to claim 31, wherein the exhausted $NO_x$ amount control means controls the engine air-fuel ratio of the second cylinder group to thereby control the exhausted $NO_x$ amount.

33. A device according to claim 31, wherein the exhausted $NO_x$ amount control means controls the number of the operating cylinder(s) in the second cylinder group to thereby control the exhausted $NO_x$ amount.

34. A device according to claim 23, further comprising an adsorbent arranged in the interconnecting passage in or downstream of the exhaust gas purifying catalyst for adsorbing $NH_3$ in the inflowing exhaust gas therein.

35. A device according to claim 34, wherein the $NH_3$ synthesizing catalyst synthesizes almost no $NH_3$ from $NO_x$ in the $NH_3$ synthesizing catalyst when the exhaust gas air-fuel ratio of the inflowing exhaust gas is lean, wherein the adsorbent comprises an $NH_3$ adsorbing and oxidizing ($NH_3$-AO) catalyst adsorbing $NH_3$ in the inflowing exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the inflowing exhaust gas includes $NO_x$ therein and the exhaust gas air-fuel ratio of the inflowing exhaust gas is lean, wherein the device further comprises means for controlling the first exhaust gas air-fuel ratio control means to make the exhaust gas air-fuel ratio of the exhaust gas flowing into the $NH_3$ synthesizing catalyst lean temporarily to stop feeding $NH_3$ to the $NH_3$-AO catalyst, to thereby decrease the amount of $NH_3$ adsorbed in the $NH_3$-AO catalyst.

36. A device according to claim 35, further comprising adsorbed $NH_3$ amount estimating means for estimating an amount of $NH_3$ adsorbed in the $NH_3$-AO catalyst, wherein the exhaust gas air-fuel ratio of the exhaust gas flowing into the $NH_3$ synthesizing catalyst is made lean in accordance with the estimated adsorbed $NH_3$ amount.

37. A device according to claim 35, wherein the $NH_3$-AO catalyst comprises a solid acid including zeolite, silica, silica-alumina, and titania, carrying a transition metal including copper, chrome, vanadium, titanium, iron, nickel, and cobalt or a precious metal including platinum, palladium, rhodium and iridium.

38. A device according to claim 23, wherein the first exhaust gas air-fuel ratio control means controls the exhaust gas air-fuel ratio of the exhaust gas passing the $NH_3$ synthesizing catalyst by controlling the engine air-fuel ratio of the first cylinder group.

39. A device according to claim 23, wherein the exhaust gas purifying catalyst performs the purifying operation thereof when the exhaust gas air-fuel ratio of the inflowing exhaust gas is lean, and wherein the device further comprises keeping-lean means for keeping the exhaust gas air-fuel ratio of the exhaust gas mixture flowing into the exhaust gas purifying catalyst lean.

40. A device according to claim 39, wherein the keeping-lean means comprises a secondary air supplying means arranged in the interconnecting passage upstream of the exhaust gas purifying catalyst for supplying a secondary air into the exhaust gas flowing into the exhaust gas purifying catalyst.

41. A device according to claim 23, wherein the $NH_3$ synthesizing catalyst is a three-way (TW) catalyst including at least one precious metal such as palladium, platinum, iridium, and rhodium.

42. A device according to claim 23, wherein the exhaust gas purifying catalyst comprises a plurality of catalysts arranged, in series, in the interconnecting passage.

43. A device according to claim 42, further comprising guide means for guiding the exhaust gas flowing through the interconnecting passage to force the exhaust gas to contact all of the catalysts when the temperature of the inflowing exhaust gas is low, and to force the exhaust gas to bypass at least one of the catalysts when the temperature of the inflowing exhaust gas is high.

44. A device according to claim 23, further comprising an $NH_3$ purifying catalyst arranged in the interconnecting passage downstream of the exhaust gas purifying catalyst for purifying $NH_3$ in the inflowing exhaust gas.

45. A method for purifying an exhaust gas of an engine having a plurality of cylinders divided into first and second cylinder groups, the method comprising:

making the exhaust gas air-fuel ratio of the exhaust gas of the first cylinder group rich, and introducing the exhaust gas to an $NH_3$ synthesizing catalyst to synthesize $NH_3$, to form the exhaust gas including $NH_3$ of which the exhaust gas air-fuel ratio is rich, the $NH_3$ synthesizing catalyst synthesizing $NH_3$ from $NO_x$ in the $NH_3$ synthesizing catalyst when the exhaust gas air-fuel ratio of the inflowing exhaust gas is rich;

making the exhaust gas air-fuel ratio of the exhaust gas of the second cylinder group lean, to form the exhaust gas including $NO_x$ of which the exhaust gas air-fuel ratio is lean;

performing a first introducing condition where the exhaust gas including $NH_3$ of which the exhaust gas air-fuel ratio is rich is introduced to an $NH_3$ adsorbing and oxidizing ($NH_3$-AO) catalyst and the exhaust gas including $NO_x$ of which the exhaust gas air-fuel ratio is lean is introduced to a $NO_x$ occluding and reducing ($NO_x$-OR) catalyst, the $NH_3$-AO catalyst adsorbing $NH_3$ in the inflowing exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the inflowing exhaust gas includes $NO_x$ therein and the exhaust gas air-fuel ratio of the inflowing exhaust gas is lean, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich;

performing a second introducing condition where the exhaust gas including $NH_3$ of which the exhaust gas air-fuel ratio is rich is introduced to the $NO_x$-OR catalyst and the exhaust gas including $NO_x$ of which the exhaust gas air-fuel ratio is lean is introduced to the $NH_3$-AO catalyst; and performing the first and the second introducing conditions alternately and repeatedly.

46. A method according to claim 45, further comprising estimating an amount of $NO_x$ occluded in the $NO_x$-OR catalyst, wherein the introducing conditions are changed in accordance with the estimated occluded $NO_x$ amount.

47. A method according to claim 45, further comprising estimating an amount of $NH_3$ adsorbed in the $NH_3$-AO catalyst, wherein the introducing conditions are changed in accordance with the estimated adsorbed $NH_3$ amount.

48. A method according to claim 45, further comprising suppressing an amount of $NO_x$ in the exhaust gas including $NO_x$ of which the exhaust gas air-fuel ratio is lean.

49. A method according to claim 48, wherein the $NO_x$ amount in the exhaust gas including $NO_x$ of which the exhaust gas air-fuel ratio is lean is suppressed by introducing the exhaust gas to an additional $NO_x$ occluding and reducing ($NO_x$-OR) catalyst.

50. A method according to claim 49, further comprising controlling the exhaust gas air-fuel ratio of the exhaust gas flowing into the additional $NO_x$-OR catalyst to make the exhaust gas air-fuel ratio rich temporarily to release the occluded $NO_x$ from the additional $NO_x$-OR catalyst.

51. A method according to claim 45, wherein the engine is provided with: a first $NH_3$ introducing passage being able to introduce the exhaust gas including $NH_3$ of which the exhaust gas air-fuel ratio is rich to the $NH_3$-AO catalyst; a second $NH_3$ introducing passage being able to introduce the exhaust gas including $NH_3$ of which the exhaust gas air-fuel ratio is rich to the $NO_x$-OR catalyst; a first $NO_x$ introducing passage being able to introduce the exhaust gas including $NO_x$ of which the exhaust gas air-fuel ratio is lean to the $NO_x$-OR catalyst; a second $NO_x$ introducing passage being able to introduce the exhaust gas including $NO_x$ of which the exhaust gas air-fuel ratio is lean to the $NH_3$-AO catalyst; an $NH_3$ switching valve selectively introducing the exhaust gas including $NH_3$ of which the exhaust gas air-fuel ratio is rich to one of the first and the second $NH_3$ introducing passages; and a $NO_x$ switching valve selectively introducing the exhaust gas including $NO_x$ of which the exhaust gas air-fuel ratio is lean to one of the first and the second $NO_x$ introducing passages, and wherein the $NH_3$ and $NO_x$ switching valves are controlled to introduce the exhaust gas including $NH_3$ of which the exhaust gas air-fuel ratio is rich to the first $NH_3$ introducing passage and introduce the exhaust gas including $NO_x$ of which the exhaust gas air-fuel ratio is lean to the first $NO_x$ introducing passage when the first introducing condition is to be performed, and to introduce the exhaust gas including $NH_3$ of which the exhaust gas air-fuel ratio is rich to the second $NH_3$ introducing passage and introduce the exhaust gas including $NO_x$ of which the exhaust gas air-fuel ratio is lean to the second $NO_x$ introducing passage when the second introducing condition is to be performed.

52. A method according to claim 45, wherein the $NH_3$ synthesizing catalyst is a three-way (TW) catalyst including at least one precious metal such as palladium, platinum, iridium, and rhodium.

53. A method according to claim 45, wherein the $NH_3$-AO catalyst comprises a solid acid including zeolite, silica, silica-alumina, and titania, carrying a transition metal including copper, chrome, vanadium, titanium, iron, nickel, and cobalt or a precious metal including platinum, palladium, rhodium and iridium.

54. A method according to claim 45, wherein the $NO_x$-OR catalyst includes: at least one substance selected from alkali metals including potassium, sodium, lithium, and cesium, alkali earth metals including barium and calcium, rare earth metals including lanthanum and yttrium, and transition metals including iron and copper; and precious metals including palladium, platinum, iridium, and rhodium.

55. A method according to claim 45, further comprising introducing at least one of the exhaust gas discharged from the $NH_3$-AO catalyst and that from the $NO_x$-OR catalyst to an $NH_3$ purifying catalyst for purifying $NH_3$ in the inflowing exhaust gas.

56. A device for purifying an exhaust gas of an engine having a plurality of cylinders divided into first and second cylinder groups, and first and second exhaust passage connected to the first and the second cylinder groups, respectively, the device comprising:

an $NH_3$ synthesizing catalyst arranged in the first exhaust passage, the $NH_3$ synthesizing catalyst synthesizing $NH_3$ from $NO_x$ in the $NH_3$ synthesizing catalyst when the exhaust gas air-fuel ratio of the inflowing exhaust gas is rich;

an $NH_3$ adsorbing and oxidizing ($NH_3$-AO) catalyst selectively connected to one of the first exhaust passage downstream of the $NH_3$ synthesizing catalyst and the second exhaust passage, the $NH_3$-AO catalyst adsorbing $NH_3$ in the inflowing exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the inflowing exhaust gas includes $NO_x$ therein and the exhaust gas air-fuel ratio of the inflowing exhaust gas is lean;

a $NO_x$ occluding and reducing ($NO_x$-OR) catalyst selectively connected to one of the first exhaust passage downstream of the $NH_3$ synthesizing catalyst and the second exhaust passage, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich;

first exhaust gas air-fuel ratio control means for controlling the exhaust gas air-fuel ratio of the exhaust gas flowing into the $NH_3$ synthesizing catalyst;

second exhaust gas air-fuel ratio control means for controlling the exhaust gas air-fuel ratio of the exhaust gas flowing through the second exhaust passage;

means for controlling the first exhaust gas air-fuel ratio control means to make the exhaust gas air-fuel ratio of the exhaust gas flowing into the $NH_3$ synthesizing catalyst rich to synthesize $NH_3$;

means for controlling the second exhaust gas air-fuel ratio control means to make the exhaust gas air-fuel ratio of the exhaust gas flowing through the second exhaust passage lean;

first connecting condition performing means for performing a first connecting condition where the first exhaust passage downstream of the $NH_3$ synthesizing catalyst is connected to the $NH_3$-AO catalyst and the second exhaust passage is connected to the $NO_x$-OR catalyst;

second connecting condition performing means for performing a second connecting condition where the first exhaust passage downstream of the $NH_3$ synthesizing catalyst is connected to the $NO_x$-OR catalyst and the second exhaust passage is connected to the $NH_3$-AO catalyst; and connecting condition control means for controlling the first and the second connecting condition performing means to perform the first and the second connecting conditions alternately and repeatedly.

57. A device according to claim 56, further comprising occluded $NO_x$ amount estimating means for estimating an amount of $NO_x$ occluded in the $NO_x$-OR catalyst, wherein the connecting conditions are changed in accordance with the estimated occluded $NO_x$ amount.

58. A device according to claim 56, further comprising adsorbed $NH_3$ amount estimating means for estimating an amount of $NH_3$ adsorbed in the $NH_3$-AO catalyst, wherein the connecting conditions are changed in accordance with the estimated adsorbed $NH_3$ amount.

59. A device according to claim 56, further comprising suppressing means for suppressing an $NO_x$ amount exhausted from the second exhaust passage.

60. A device according to claim 59, wherein the suppressing means comprises an additional $NO_x$ occluding and reducing ($NO_x$-OR) catalyst arranged in the second exhaust passage.

61. A device according to claim 60, further comprising means for controlling the exhaust gas air-fuel ratio of the exhaust gas flowing into the additional $NO_x$-OR catalyst to make the exhaust gas air-fuel ratio rich temporarily to release the occluded $NO_x$ from the additional $NO_x$-OR catalyst.

62. A device according to claim 56, further comprising: a first $NH_3$ introducing passage being able to connect the first exhaust passage downstream of the $NH_3$ synthesizing catalyst to the $NH_3$-AO catalyst; a second $NH_3$ introducing passage being able to connect the first exhaust passage downstream of the $NH_3$ synthesizing catalyst to the $NO_x$-OR catalyst; a first $NO_x$ introducing passage being able to connect the second exhaust passage to the $NO_x$-OR catalyst; a second $NO_x$ introducing passage being able to connect the second exhaust passage to the $NH_3$-AO catalyst; an $NH_3$ switching valve selectively connecting the first exhaust passage downstream of the $NH_3$ synthesizing catalyst to one of the first and the second $NH_3$ introducing passages; and a $NO_x$ switching valve selectively connecting the second exhaust passage to one of the first and the second $NO_x$ introducing passages, wherein the connecting condition control means controls the $NH_3$ and $NO_x$ switching valves to connect the first exhaust passage downstream of the $NH_3$ synthesizing catalyst to the first $NH_3$ introducing passage and connect the second exhaust passage to the first $NO_x$ introducing passage when the first connecting condition is to be performed, and to connect the first exhaust passage downstream of the $NH_3$ synthesizing catalyst to the second $NH_3$ introducing passage and connect the second exhaust passage to the second $NO_x$ introducing passage when the second connecting condition is to be performed.

63. A device according to claim 56, wherein the $NH_3$ synthesizing catalyst is a three-way (TW) catalyst including at least one precious metal such as palladium, platinum, iridium, and rhodium.

64. A device according to claim 56, wherein the $NH_3$-AO catalyst comprises a solid acid including zeolite, silica, silica-alumina, and titania, carrying a transition metal including copper, chrome, vanadium, titanium, iron, nickel, and cobalt or a precious metal including platinum, palladium, rhodium and iridium.

65. A device according to claim 56, wherein the $NO_x$-OR catalyst includes: at least one substance selected from alkali metals including potassium, sodium, lithium, and cesium, alkali earth metals including barium and calcium, rare earth metals including lanthanum and yttrium, and transition metals including iron and copper; and precious metals including palladium, platinum, iridium, and rhodium.

66. A device according to claim 56, further comprising an $NH_3$ purifying catalyst arranged downstream of at least one of the $NH_3$-AO catalyst and the $NO_x$-OR catalyst for purifying $NH_3$ in the inflowing exhaust gas.

67. A method for purifying an exhaust gas of an engine having a plurality of cylinders divided into first and second cylinder groups, the method comprising:

introducing the exhaust gas of the first cylinder group to a first $NH_3$ synthesizing catalyst and an $NH_3$ adsorbing and oxidizing ($NH_3$-AO) catalyst, in turn, the $NH_3$ synthesizing catalyst synthesizing $NH_3$ from $NO_x$ in the $NH_3$ synthesizing catalyst when the exhaust gas air-fuel ratio of the inflowing exhaust gas is rich, and synthesizing almost no $NH_3$ from $NO_x$ in the $NH_3$ synthesizing catalyst when the exhaust gas air-fuel ratio of the inflowing exhaust gas is lean, and the $NH_3$-AO catalyst adsorbing $NH_3$ in the inflowing exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the inflowing exhaust gas includes $NO_x$ therein and the exhaust gas air-fuel ratio of the inflowing exhaust gas is lean;

introducing the exhaust gas of the second cylinder group to a second $NH_3$ synthesizing catalyst and a $NO_x$ occluding and reducing ($NO_x$-OR) catalyst, in turn, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich;

performing a first exhaust gas air-fuel ratio condition where the exhaust gas air-fuel ratio of the exhaust gas flowing into the first $NH_3$ synthesizing catalyst and the $NH_3$-AO catalyst is made rich, and that of the exhaust gas flowing into the second $NH_3$ synthesizing catalyst and the $NO_x$-OR catalyst is made lean;

performing a second exhaust gas air-fuel ratio condition where the exhaust gas air-fuel ratio of the exhaust gas flowing into the first $NH_3$ synthesizing catalyst and the $NH_3$-AO catalyst is made lean, and that of the exhaust gas flowing into the second $NH_3$ synthesizing catalyst and the $NO_x$-OR catalyst is made rich; and performing the first and the second exhaust gas air-fuel ratio conditions alternately and repeatedly.

68. A method according to claim 67, further comprising estimating an amount of $NO_x$ occluded in the $NO_x$-OR catalyst, wherein the exhaust gas air-fuel ratio conditions are changed in accordance with the estimated occluded $NO_x$ amount.

69. A method according to claim 67, further comprising estimating an amount of $NH_3$ adsorbed in the $NH_3$-AO catalyst, wherein the exhaust gas air-fuel ratio conditions are changed in accordance with the estimated adsorbed $NH_3$ amount.

70. A method according to claim 67, wherein the engine air-fuel ratio of the first cylinder group is controlled to control the exhaust gas air-fuel ratio of the exhaust gas flowing into the first $NH_3$ synthesizing catalyst and the $NH_3$-AO catalyst.

71. A method according to claim 67, wherein the engine air-fuel ratio of the second cylinder group is controlled to control the exhaust gas air-fuel ratio of the exhaust gas flowing into the second $NH_3$ synthesizing catalyst and the $NO_x$-OR catalyst.

72. A method according to claim 67, wherein the $NH_3$ synthesizing catalyst is a three-way (TW) catalyst including at least one precious metal such as palladium, platinum, iridium, and rhodium.

73. A method according to claim 67, wherein the $NH_3$ synthesizing catalyst is a $NO_x$-OR catalyst including: at least one substance selected from alkali metals including potassium, sodium, lithium, and cesium, alkali earth metals including barium and calcium, rare earth metals including lanthanum and yttrium, and transition metals such as iron and copper; and precious metals including palladium, platinum, iridium, and rhodium.

74. A method according to claim 67, wherein the $NH_3$-AO catalyst comprises a solid acid including zeolite, silica, silica-alumina, and titania, carrying a transition metal including copper, chrome, vanadium, titanium, iron, nickel, and cobalt or a precious metal including platinum, palladium, rhodium and iridium.

75. A method according to claim 67, wherein the $NO_x$-OR catalyst includes: at least one substance selected from alkali metals including potassium, sodium, lithium, and cesium, alkali earth metals including barium and calcium, rare earth metals including lanthanum and yttrium, and transition metals including iron and copper; and precious metals including palladium, platinum, iridium, and rhodium.

76. A method according to claim 67, further comprising introducing at least one of the exhaust gas discharged from the $NH_3$-AO catalyst and that from the $NO_x$-OR catalyst to an $NH_3$ purifying catalyst for purifying $NH_3$ in the inflowing exhaust gas.

77. A device for purifying an exhaust gas of an engine having a plurality of cylinders divided into first and second cylinder groups, and first and second exhaust passage connected to the first and the second cylinder groups, respectively, the device comprising:

a first $NH_3$ synthesizing catalyst arranged in the first exhaust passage and a second $NH_3$ synthesizing catalyst arranged in the second exhaust passage, each $NH_3$ synthesizing catalyst synthesizing $NH_3$ from $NO_x$ in the $NH_3$ synthesizing catalyst when the exhaust gas air-fuel ratio of the inflowing exhaust gas is rich, and synthesizing almost no $NH_3$ from $NO_x$ in the $NH_3$ synthesizing catalyst when the exhaust gas air-fuel ratio of the inflowing exhaust gas is lean;

an $NH_3$ adsorbing and oxidizing ($NH_3$-AO) catalyst arranged in the first exhaust passage downstream of the first $NH_3$ synthesizing catalyst, the $NH_3$-AO catalyst adsorbing $NH_3$ in the inflowing exhaust gas therein, and causing a reaction of $NH_3$ and $NO_x$ in the $NH_3$-AO catalyst to purify the $NH_3$ and the $NO_x$ and to decrease an amount of $NH_3$ adsorbed in the $NH_3$-AO catalyst when the inflowing exhaust gas includes $NO_x$ therein and the exhaust gas air-fuel ratio of the inflowing exhaust gas is lean;

a $NO_x$ occluding and reducing ($NO_x$-OR) catalyst arranged in the second exhaust passage downstream of the second $NH_3$ synthesizing catalyst, the $NO_x$-OR catalyst occluding $NO_x$ in the inflowing exhaust gas therein when the exhaust gas air-fuel ratio of the inflowing exhaust gas is lean, and releasing the occluded $NO_x$ therefrom and reducing the $NO_x$ when the exhaust gas air-fuel ratio of the inflowing exhaust gas is rich;

a first exhaust gas air-fuel ratio control means for controlling the exhaust gas air-fuel ratio of the exhaust gas flowing into the first $NH_3$ synthesizing catalyst and the $NH_3$-AO catalyst;

a second exhaust gas air-fuel ratio control means for controlling the exhaust gas air-fuel ratio of the exhaust gas flowing into the second $NH_3$ synthesizing catalyst and the $NO_x$-OR catalyst;

first exhaust gas air-fuel ratio condition performing means for controlling the first and the second exhaust gas air-fuel ratio control means to perform a first exhaust gas air-fuel ratio condition where the exhaust gas air-fuel ratio of the exhaust gas flowing into the first $NH_3$ synthesizing catalyst and the $NH_3$-AO catalyst is made rich, and that of the exhaust gas flowing into the second $NH_3$ synthesizing catalyst and the $NO_x$-OR catalyst is made lean;

second exhaust gas air-fuel ratio condition performing means for controlling the first and the second exhaust gas air-fuel ratio control means to perform a second exhaust gas air-fuel ratio condition where the exhaust gas air-fuel ratio of the exhaust gas flowing into the first $NH_3$ synthesizing catalyst and the $NH_3$-AO catalyst is made lean, and that of the exhaust gas flowing into the second $NH_3$ synthesizing catalyst and the $NO_x$-OR catalyst is made rich; and exhaust gas air-fuel ratio condition control means for controlling the first and the second exhaust gas air-fuel ratio condition performing means to perform the first and the second exhaust gas air-fuel ratio conditions alternately and repeatedly.

78. A device according to claim 77, further comprising occluded $NO_x$ amount estimating means for estimating an amount of $NO_x$ occluded in the $NO_x$-OR catalyst, wherein the exhaust gas air-fuel ratio conditions are changed in accordance with the estimated occluded $NO_x$ amount.

79. A device according to claim 77, further comprising adsorbed $NH_3$ amount estimating means for estimating an amount of $NH_3$ adsorbed in the $NH_3$-AO catalyst, wherein the exhaust gas air-fuel ratio conditions are changed in accordance with the estimated adsorbed $NH_3$ amount.

80. A device according to claim 77, wherein the first exhaust gas air-fuel ratio control means controls the engine air-fuel ratio of the first cylinder group to control the exhaust gas air-fuel ratio of the exhaust gas flowing into the first $NH_3$ synthesizing catalyst and the $NH_3$-AO catalyst.

81. A device according to claim 77, wherein the second exhaust gas air-fuel ratio control means controls the engine air-fuel ratio of the second cylinder group to control the exhaust gas air-fuel ratio of the exhaust gas flowing into the second $NH_3$ synthesizing catalyst and the $NO_x$-OR catalyst.

82. A device according to claim 77, wherein the $NH_3$ synthesizing catalyst is a three-way (TW) catalyst including at least one precious metal such as palladium, platinum, iridium, and rhodium.

83. A device according to claim 77, wherein the $NH_3$ synthesizing catalyst is a $NO_x$-OR catalyst including: at least one substance selected from alkali metals including potassium, sodium, lithium, and cesium, alkali earth metals including barium and calcium, rare earth metals including lanthanum and yttrium, and transition metals including iron and copper; and precious metals including palladium, platinum, iridium, and rhodium.

84. A device according to claim 77, wherein the $NH_3$-AO catalyst comprises a solid acid including zeolite, silica, silica-alumina, and titania, carrying a transition metal including copper, chrome, vanadium, titanium, iron, nickel, and cobalt or a precious metal including platinum, palladium, rhodium and iridium.

85. A device according to claim 77, wherein the $NO_x$-OR catalyst includes: at least one substance selected from alkali metals including potassium, sodium, lithium, and cesium, alkali earth metals including barium and calcium, rare earth metals including lanthanum and yttrium, and transition metals including iron and copper; and precious metals including palladium, platinum, iridium, and rhodium.

86. A device according to claim 77, further comprising an $NH_3$ purifying catalyst arranged downstream of at least one of the $NH_3$-AO catalyst and the $NO_x$-OR catalyst for purifying $NH_3$ in the inflowing exhaust gas.

* * * * *